(12) United States Patent
Archard et al.

(10) Patent No.: US 12,491,730 B2
(45) Date of Patent: *Dec. 9, 2025

(54) PAINT TRAY

(71) Applicant: Tovarna LLC, Arvada, CO (US)

(72) Inventors: John Archard, Arvada, CO (US); Charles Cooper, Arvada, CO (US)

(73) Assignee: Tovarna LLC, Arvada, CO (US)

( * ) Notice: Subject to any disclaimer, the term of this patent is extended or adjusted under 35 U.S.C. 154(b) by 198 days.

This patent is subject to a terminal disclaimer.

(21) Appl. No.: 18/139,040

(22) Filed: Apr. 25, 2023

(65) Prior Publication Data

US 2023/0256773 A1 Aug. 17, 2023

Related U.S. Application Data

(63) Continuation-in-part of application No. 16/988,262, filed on Aug. 7, 2020, now Pat. No. 11,667,147.

(60) Provisional application No. 62/972,463, filed on Feb. 10, 2020, provisional application No. 62/922,409, filed on Aug. 8, 2019.

(51) Int. Cl.

| | |
|---|---|
| B44D 3/12 | (2006.01) |
| B05C 17/02 | (2006.01) |
| B44D 3/14 | (2006.01) |
| B65D 1/34 | (2006.01) |
| B65D 21/02 | (2006.01) |
| B65D 25/42 | (2006.01) |
| B67C 9/00 | (2006.01) |

(52) U.S. Cl.
CPC ............... B44D 3/126 (2013.01); B65D 1/34 (2013.01); B65D 21/0233 (2013.01); B65D 25/42 (2013.01)

(58) Field of Classification Search
CPC ............ A47G 23/0633; B05C 17/0245; B44D 3/126; B44D 3/12; B65D 1/34; B65D 21/0233; B65D 25/42
USPC ................. 141/319, 366, 375, 364; 220/570, 220/495.02; 222/566
See application file for complete search history.

(56) References Cited

U.S. PATENT DOCUMENTS

| | | | | |
|---|---|---|---|---|
| 496,537 | A * | 5/1893 | Purrington | G03G 15/0882 248/213.2 |
| 1,788,262 | A * | 1/1931 | Wiebusch | A01J 9/08 248/213.2 |
| 2,698,450 | A * | 1/1955 | Mack | B44D 3/126 15/264 |

(Continued)

FOREIGN PATENT DOCUMENTS

| | | |
|---|---|---|
| EP | 1827873 B1 | 7/2009 |
| WO | 2018152568 A1 | 8/2018 |

*Primary Examiner* — Gideon R Weinerth
(74) *Attorney, Agent, or Firm* — NOD Law PC

(57) ABSTRACT

A fluid tray is disclosed, the fluid tray comprising a base, a rim, a plurality of sidewalls arranged between an edge of the base and the rim and extending in an upward direction from the base, a reservoir defined by the base and the sidewalls, at least one container securing mechanism integrated or coupled to the rim or at least one sidewall, and at least one drainage spout, and wherein the at least container securing mechanism and the drainage spout operate to drain a fluid from a container into the reservoir when the container is in a substantially vertical position above the reservoir and the container is coupled to the fluid tray using one of the at least one container securing mechanism.

21 Claims, 39 Drawing Sheets

(56) References Cited

U.S. PATENT DOCUMENTS

| | | | | |
|---|---|---|---|---|
| 2,807,290 | A * | 9/1957 | Hearn | A47G 23/0266 |
| | | | | 248/302 |
| 2,833,319 | A * | 5/1958 | Justus | A47J 37/108 |
| | | | | 141/375 |
| 3,590,416 | A | 7/1971 | Henningsen | |
| 3,747,756 | A * | 7/1973 | Wheeler | B07C 7/04 |
| | | | | D15/138 |
| 3,819,064 | A * | 6/1974 | Chandler | A61J 7/02 |
| | | | | 222/572 |
| 3,829,926 | A * | 8/1974 | Salladay | B44D 3/126 |
| | | | | 222/572 |
| 4,852,759 | A * | 8/1989 | Williams | B44D 3/128 |
| | | | | D32/53.1 |
| 5,472,111 | A | 12/1995 | Renfrew | |
| 5,533,228 | A * | 7/1996 | Jarecki | B44D 3/127 |
| | | | | 220/570 |
| 5,735,399 | A * | 4/1998 | Ste. Marie | B44D 3/126 |
| | | | | 220/555 |
| 5,816,549 | A * | 10/1998 | Anderson | B44D 3/126 |
| | | | | 248/210 |
| 6,394,152 | B1 * | 5/2002 | Martin | B44D 3/08 |
| | | | | 141/351 |
| 6,715,647 | B1 * | 4/2004 | Ivins | B44D 3/126 |
| | | | | 141/319 |
| 6,802,431 | B2 * | 10/2004 | Schinkel | B44D 3/126 |
| | | | | 220/570 |
| 9,085,379 | B2 | 7/2015 | Cummins | |
| 9,440,485 | B2 | 9/2016 | Krusoe | |
| 9,573,413 | B2 * | 2/2017 | Krusoe | B44D 3/12 |
| 9,854,929 | B1 * | 1/2018 | Anderson | B65D 25/38 |
| 10,281,082 | B2 * | 5/2019 | McMahon, III | B67D 3/0051 |
| 11,667,147 | B2 * | 6/2023 | Archard | B05C 17/0245 |
| | | | | 220/570 |
| 11,919,682 | B1 * | 3/2024 | Stem | B44D 3/126 |
| 2005/0252920 | A1 * | 11/2005 | Cumming | B44D 3/126 |
| | | | | 206/229 |
| 2006/0064843 | A1 * | 3/2006 | Maria Cornelissen | |
| | | | | B05C 17/0245 |
| | | | | 15/257.06 |
| 2007/0012705 | A1 * | 1/2007 | Bergman | B65D 25/2832 |
| | | | | 220/696 |
| 2009/0050632 | A1 * | 2/2009 | Martin | B44D 3/126 |
| | | | | 220/309.1 |
| 2011/0101000 | A1 * | 5/2011 | Cutler, Sr. | B44D 3/126 |
| | | | | 220/570 |
| 2012/0152797 | A1 * | 6/2012 | Gross | B65D 81/261 |
| | | | | 206/557 |
| 2013/0075432 | A1 * | 3/2013 | Staveris | B65D 25/42 |
| | | | | 222/572 |
| 2013/0299436 | A1 * | 11/2013 | Krusoe | B44D 3/126 |
| | | | | 294/159 |
| 2017/0268720 | A1 | 9/2017 | Rogers | |
| 2018/0257424 | A1 * | 9/2018 | Robertson | B44D 3/128 |
| 2021/0039427 | A1 * | 2/2021 | Archard | B44D 3/126 |
| 2024/0425223 | A1 * | 12/2024 | Bennett | B65D 1/34 |

\* cited by examiner

PAINT TRAY

CLAIM OF PRIORITY UNDER 35 U.S.C. § 119

The present Application for patent is a continuation-in-part of U.S. patent application Ser. No. 16/988,262, entitled "Paint Tray", filed Aug. 7, 2020, which claims priority to Provisional Application No. 62/972,463, entitled "Paint Tray" filed Feb. 10, 2020, and Provisional Application No. 62/922,409, filed Aug. 8, 2019, with one or more inventors being the same as the present invention, and all of which are hereby expressly incorporated by reference herein and for all practical purposes.

FIELD OF THE DISCLOSURE

The present disclosure relates generally to paint trays. In particular, but not by way of limitation, the present disclosure relates to systems, methods and apparatuses for a paint saving paint tray.

BACKGROUND

Paint trays are ubiquitous in the home building and construction industry. In some cases, paint trays are used in conjunction with paint rollers, where paint is first poured into a tray from a paint container or tin. Further, paint rollers are rolled over the bottom of the tray in order to spread the paint over the roller and remove any excess paint prior to painting.

The description provided in the background section should not be assumed to be prior art merely because it is mentioned in or associated with the background section. The background section may include information that describes one or more aspects of the subject technology.

SUMMARY OF THE DISCLOSURE

Conventional paint trays suffer some drawbacks, one of them being paint waste. In particular, conventional paint trays lack a convenient mechanism for pouring excess paint from a paint tray back into the paint container. Besides paint waste, conventional paint trays are cumbersome and messy, especially during transfer of paint from a container to the tray.

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as a paint tray. In some cases, the paint tray may be configured to be used with a paint container, also referred to as container, paint can, can, or tin. Furthermore, for the purposes of this disclosure, paint tray may also be referred to as tray. In some cases, the paint tray may be configured to be used with a roller, brush, or another tool used for applying paint. Additionally, while generally described in reference to paints, the tray discussed in this disclosure may be utilized for any other liquid or fluid, such as stains (e.g., wood stains), curing compounds, sealers, waterproofing chemicals, adhesives, floor hardeners, etc., to name a few non-limiting examples.

In order to address the deficiencies in the current technology, disclosed herein is a system, method, and apparatus for minimizing paint waste. The present disclosure is generally directed to a paint saving paint tray configured for coupling to a paint container. In some examples, the coupling may be bidirectional. That is, either one of the paint tray or the paint container may be the receiving receptacle. In some examples, depending on the coupling direction, the paint tray may be adapted to receive paint that is being drained from the paint container. In some other examples, the paint tray may be adapted to drain paint held in its reservoir into the paint container, for instance, in the case that there is any excess paint remaining after use.

Some embodiments of the disclosure may be characterized as a paint tray. The paint tray may comprise a base having one or more edges and one or more sidewalls integrated with one or more edges of the base. The one or more sidewalls may extend in an upward direction from the base. The paint tray may further include a reservoir for holding paint with the reservoir defined by the base and the one or more sidewalls. The paint tray may further comprise a paint container securing mechanism that is one of integrated and coupled to at least one sidewall of the one or more sidewalls and may also comprise a drainage spout integrated to one of the one or more sidewalls. In some cases, the paint container securing mechanism and drainage spout may operate to drain paint from a paint container into the reservoir upon coupling the paint container to the paint tray. Such a coupling may comprise using the paint container securing mechanism and placing a paint container opening in a vertical position above the reservoir. In other cases, the paint container securing mechanism and drainage spout may operate to drain paint from the paint tray into the paint container upon coupling the paint tray to the paint container via placement of the reservoir in a vertical position above the paint container opening.

In some embodiments, the paint container securing mechanism comprises one or more notches, notches with snap features, hooks, v-shaped notches, grooves, teeth, prongs, and/or lips. Additionally or alternatively, the paint container securing mechanism may comprise two or more notches, wherein adjacent notches are spaced apart by a pre-configured distance. In some embodiments, using the paint container securing mechanism comprises coupling the paint container securing mechanism to at least one of a rim and a groove of the paint container.

In some embodiments, the paint container securing mechanism further comprises a bendable tab for engaging with a wire handle of the paint container. In some embodiments, the at least one sidewall further comprises a scooped section extending upwardly away from the base and outwardly from the at least one sidewall, wherein the scooped extension may facilitate a flow of paint from the paint container into the paint tray by supporting the paint container in an inverted pouring position over the paint tray.

In some embodiments, the scooped section comprises a radius and the paint container comprises an outer surface. Further, the radius may be of a size for receiving the paint container, so that a portion of the outer surface of the paint container is one of generally and substantially flush with at least a portion of the scooped section. Additionally or alternatively, the at least one sidewall may comprise two or more teeth adapted to engage with a rim of the paint container, wherein the two or more teeth facilitate stably supporting the paint container in the inverted pouring position over the paint tray.

In some embodiments, the paint tray may comprise a snap mechanism, wherein the snap mechanism comprises at least one lip and one groove. In some cases, the snap mechanism may be shaped to receive a rim of the paint container, wherein the snap mechanism provides a stable support for the paint tray on the rim of the paint container or a stable support for the paint container on the paint tray. In some embodiments, the paint tray further comprises at least one removeable liner, wherein the at least one removeable liner covers at least a portion of the base and the one or more sidewalls.

In some embodiments, the base of the paint tray may be shaped to receive one or more other paint trays, wherein the one or more other paint trays are stacked within each other. In some embodiments, the paint reservoir may be shaped to allow a paint roller access to paint in the paint reservoir when the paint container is draining into the paint tray.

In some embodiments, the paint tray may further comprise one or more lips, wherein the one or more lips are formed at or near a junction of two sidewalls. The two sidewalls may include the at least one sidewall, the one or more lips may be adapted to engage with a rim of the paint container, and the one or more lips may facilitate stable support of the paint container at an angle sufficient to permit flow of paint from the paint container into the paint tray or may facilitate stable support of the paint tray at an angle sufficient to permit flow of paint from the paint tray into the paint container. In some cases, at least one of the two sidewalls comprises one or more notches or grooves for interfacing with a wire handle of the paint container.

Other embodiments of the disclosure may also be characterized as a method for draining a paint container into a paint tray. One such method comprises providing a paint tray, with the paint tray comprising a base, one or more sidewalls integrated with one or more edges of the base and the one or more sidewalls extending in an upward direction from the base. The paint tray further comprises a reservoir for holding paint, the reservoir defined by the base and the one or more sidewalls, a paint container securing mechanism one of integrated and coupled to at least one sidewall of the one or more sidewalls, and a drainage spout integrated to one of the one or more sidewalls. In some embodiments, the method may further comprise: placing a paint container opening in a vertical position above the reservoir, wherein the paint container is in an inverted orientation over the paint tray at an angle sufficient to permit flow of paint from the paint container into the paint tray. Additional steps may comprise securing the paint tray to the paint container via the paint container securing mechanism and allowing the paint container to drain into the paint tray via the drainage spout.

Still other embodiments of the disclosure can be characterized as a method for draining a paint tray into a paint container. Such a method comprises providing a paint tray, with the paint tray comprising a base and one or more sidewalls integrated with one or more edges of the base, the one or more sidewalls extending in an upward direction from the base. The paint tray further comprises a reservoir for holding paint, the reservoir defined by the base and the one or more sidewalls, a paint container securing mechanism one of integrated and coupled to at least one sidewall of the one or more sidewalls, and a drainage spout integrated to one of the one or more sidewalls. In some embodiments, the method may further comprise placing the reservoir in a vertical position above an opening of the paint container, wherein the paint tray is positioned over the paint container at an angle sufficient to permit flow of paint from the paint tray into the paint container, securing the paint tray to the paint container via the paint container securing mechanism, and allowing the paint tray to drain into the paint container via the drainage spout.

Yet other embodiments of the disclosure may be characterized as a paint tray system comprising a first paint tray and a second paint tray, wherein each of the first paint tray and the second paint tray may comprise a base and one or more sidewalls integrated with one or more edges of the base. The one or more sidewalls may extend in an upward direction from the base. The paint trays may further comprise a reservoir for holding paint with the reservoir defined by the base and the one or more sidewalls. The trays may yet further comprise a paint container securing mechanism one of integrated and coupled to at least one sidewall of the one or more sidewalls and a drainage spout integrated to one of the one or more sidewalls. In some embodiments, the respective paint container securing mechanism and respective drainage spout of the first paint tray and the second paint tray may operate to drain paint from a first paint container into the reservoir of the first paint tray upon coupling the first paint container to the first paint tray and drain paint from a second paint container into the reservoir of the second paint tray upon coupling the second paint container to the second paint tray, wherein the coupling may comprise using the respective paint container securing mechanism, and placing a respective paint container opening in a vertical position above the respective reservoir. In some other cases, the respective paint container securing mechanism and respective drainage spout of the first paint tray and the second paint tray may operate to drain paint from the first paint tray into the first paint container upon coupling the first paint tray to the first paint container via placement of the reservoir of the first paint tray in a vertical position above the paint container opening of the first paint container, and drain paint from the second paint tray into the second paint container upon coupling the second paint tray to the second paint container via placement of the reservoir of the second paint tray in a vertical position above the paint container opening of the second paint container.

In some embodiments, the paint tray system may further comprise at least one removable liner covering at least a portion of the base and the one or more sidewalls of each of the first paint tray and the second paint tray.

In some embodiments, at least one respective sidewall of the first paint tray and the second paint tray may further comprise a scooped section extending upwardly away from the respective base and outwardly from the at least one respective sidewall, wherein the scooped section of the first paint tray facilitates flow of paint from the first paint container into the first paint tray by supporting the first paint container in an inverted pouring position over the first paint tray, and wherein the scooped section of the second paint tray facilitates flow of paint from the second paint container into the second paint tray by supporting the second paint container in an inverted pouring position over the second paint tray.

In some embodiments, the respective paint container securing mechanism of each of the first paint tray and the second paint tray may comprise one or more notches, notches with snap features, hooks, v-shaped notches, grooves, teeth, prongs, and lips.

In some embodiments, using the paint container securing mechanism of the first paint tray comprises coupling the paint container securing mechanism of the first paint tray to a rim of the first paint container. Additionally, or alternatively, using the paint container securing mechanism of the second paint tray comprises coupling the paint container securing mechanism of the second paint tray to a rim of the second paint container.

In some aspects, the techniques described herein relate to a fluid tray including, a base; a rim; a plurality of sidewalls, wherein each sidewall of the plurality of sidewalls is arranged between an edge of the base and the rim, and wherein each sidewall of the plurality of sidewalls extends in an upward direction from the base; a reservoir, the reservoir defined by the base and the plurality of sidewalls; at least one container securing mechanism one of integrated and coupled to the rim or at least one sidewall of the plurality of sidewalls; at least one drainage spout; and wherein the at least one container securing mechanism and the at least one drainage spout operate to drain a fluid from a container into the reservoir, wherein the draining is based at least in part on, positioning the container in a vertical or substantially vertical position above the reservoir, and coupling the container to the fluid tray using one of the at least one container securing mechanism.

In some aspects, the techniques described herein relate to a fluid tray, wherein the rim includes a plurality of corners, each corner including an intersection of two adjacent sidewalls of the plurality of sidewalls, and wherein the at least one drainage spout includes a plurality of drainage spouts.

In some aspects, the techniques described herein relate to a fluid tray, wherein: a first drainage spout of the plurality of drainage spouts is one of integrated and coupled to a first corner of the plurality of corners; a second drainage spout of the plurality of drainage spouts is one of integrated and coupled to a second corner of the plurality of corners.

In some aspects, the techniques described herein relate to a fluid tray, wherein the at least one container securing mechanism includes a plurality of container securing mechanisms, and wherein: a first container securing mechanism is one of integrated and coupled to a sidewall of the plurality of sidewalls; and a second container securing mechanism is one of integrated and coupled to the rim.

In some aspects, the techniques described herein relate to a fluid tray, wherein the at least one container securing mechanism further includes a third container securing mechanism, and wherein the third container securing mechanism is one of integrated and coupled to a corner of the plurality of corners.

In some aspects, the techniques described herein relate to a fluid tray, wherein the at least one container securing mechanism includes one or more notches, notches with snap features, hooks, v-shaped notches, grooves, teeth, prongs, and lips.

In some aspects, the techniques described herein relate to a fluid tray, wherein the one or more notches include a plurality of notches, and wherein adjacent notches are spaced apart by a pre-configured distance.

In some aspects, the techniques described herein relate to a fluid tray, wherein the at least one container securing mechanism further includes a bendable tab that is shaped and sized to engage with at least one feature on the fluid container, wherein the at least one feature includes one or more of a wire handle, and a rim or groove on the fluid container.

In some aspects, the techniques described herein relate to a fluid tray, further including at least one scooped section extending upwardly away from the base and arranged such that at least a portion of the at least one scooped section is positioned above the rim, and wherein the at least one scooped section is configured to facilitate flow of a fluid from the container into the fluid tray by supporting the container in a substantially inverted pouring position over the fluid tray.

In some aspects, the techniques described herein relate to a fluid tray, wherein the at least one scooped section includes a plurality of scooped sections and the at least one drainage spout includes a plurality of drainage spouts, and wherein each of the plurality of scooped sections is coupled to one of the plurality of drainage spouts.

In some aspects, the techniques described herein relate to a fluid tray, wherein the rim includes a plurality of corners, each corner including an intersection of two adjacent sidewalls of the plurality of sidewalls, and wherein the plurality of scooped sections includes two or more of: a first scooped section that is one of integrated and coupled to a first corner of the rim; a second scooped section that is one of integrated and coupled to the rim, wherein the second scooped section is positioned between two adjacent corners of the rim; and a third scooped section that is one of integrated and coupled to one sidewall of the plurality of sidewalls.

In some aspects, the techniques described herein relate to a fluid tray, wherein the plurality of scooped sections are configured to facilitate flow of fluids from a plurality of containers, including the container, into the fluid tray by supporting each of the plurality of containers in a substantially inverted pouring position over the fluid tray.

In some aspects, the techniques described herein relate to a fluid tray, wherein each of the plurality of scooped sections includes a radius that is shaped and sized to receive a corresponding one of the plurality of containers so that a portion of an outer surface of a respective container is substantially flush with at least a portion of the corresponding scooped section.

In some aspects, the techniques described herein relate to a fluid tray, wherein one or more of: at least one sidewall of the plurality of sidewalls includes two or more teeth adapted to engage with a rim of the container, and wherein the two or more teeth facilitate stably supporting the container in an inverted pouring position over the fluid tray; and the at least one drainage spout includes one or more notches for engaging with a wire handle of the container via tension of the wire handle on the at least one drainage spout.

In some aspects, the techniques described herein relate to a fluid tray, further including at least one snap mechanism arranged on the rim, and wherein the at least one snap mechanism is, shaped and sized to receive a rim or groove of the container, and adapted to provide a stable support for the fluid tray on the rim or the groove of the container, or a stable support for the container on the fluid tray.

In some aspects, the techniques described herein relate to a fluid tray, further including: a plurality of hooks, wherein each of the plurality of hooks is oriented towards the reservoir and arranged on the rim or at least one sidewall of the plurality of sidewalls; and a removeable liner adapted to interface with the plurality of hooks, and wherein the removeable liner is shaped and sized to cover at least a portion of the reservoir.

In some aspects, the techniques described herein relate to a method for draining a container into a fluid tray, including: providing a fluid tray, the fluid tray including: a base, a plurality of sidewalls, wherein each sidewall is arranged between an edge of the base and a rim of the fluid tray, and wherein each sidewall extends in an upward direction from the base, the rim including a plurality of corners, each corner including an intersection of two adjacent sidewalls of the plurality of sidewalls, a reservoir, the reservoir defined by the base and the plurality of sidewalls, a plurality of container securing mechanisms, wherein each container securing mechanism is one of integrated and coupled to one of the rim, a corner, or at least one sidewall of the plurality of sidewalls, and at least one drainage spout; the method further including: placing an opening of at least one container above the reservoir, such that the at least one container is (1) in an inverted orientation over the fluid tray, and (2) at an angle sufficient to permit flow of at least one fluid from the at least one container into the fluid tray; securing the fluid tray to the at least one container via at least one of the plurality of container securing mechanisms; and draining, via the at least one drainage spout, a portion of the at least one fluid from the at least one container into the fluid tray.

In some aspects, the techniques described herein relate to a method, wherein the at least one drainage spout further includes a plurality of drainage spouts, and wherein the placing includes: placing an opening of a first container above the reservoir, such that the first container is oriented to permit flow of a first fluid from the first container into the fluid tray; and placing an opening of a second container above the reservoir, such that the second container is oriented to permit flow of a second fluid from the second container into the fluid tray; and wherein the first container and the second container are, secured to the fluid tray using different container securing mechanisms of the plurality of container securing mechanisms, and drained via different drainage spouts of the plurality of drainage spouts.

In some aspects, the techniques described herein relate to a method, wherein the first container and the second container include one or more of a different radius, a different cross-sectional area, a different volume, and a different shape, and wherein: securing the first container and the second container to the fluid tray includes: securing the first container using a first container securing mechanism that is shaped and sized to interface with a rim or groove of the first container, and securing the second container using a second container securing mechanism that is shaped and sized to interface with a rim or groove of the second container; and draining the first container and the second container into the fluid tray includes: draining the first container using a first drainage spout that is shaped and sized to allow an outer surface of the first container to remain substantially flush with at least a portion of the first drainage spout, and draining the second container using a second drainage spout that is shaped and sized to allow an outer surface of the second container to remain substantially flush with at least a portion of the second drainage spout.

In some aspects, the techniques described herein relate to a fluid tray including, a base; a rim including a plurality of corners; a plurality of sidewalls, wherein each sidewall is arranged between an edge of the base and the rim of the fluid tray, and wherein each sidewall extends in an upward direction from the base; at least one container securing mechanism one of integrated and coupled to one of the rim, at least one corner of the plurality of corners, or at least one sidewall of the plurality of sidewalls; at least one drainage spout; and a reservoir including a fluid, and wherein, the reservoir is surrounded by the base and the plurality of sidewalls, at least a portion of the fluid drains into a container when the reservoir is placed in a substantially vertical position above an opening of the container and the fluid tray is secured to the container via the at least one container securing mechanism, and the at least the portion of the fluid is drained via one of the at least one drainage spout, a corner of the plurality of corners, or a combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

FIG. 5 is a top view of the paint tray in FIG. 1 and a detail section of the top view of the FIG. 1 paint tray, wherein FIG. 5 depicts the installation of a liner into the paint tray according to an embodiment of the disclosure.

DETAILED DESCRIPTION

Figure 1:
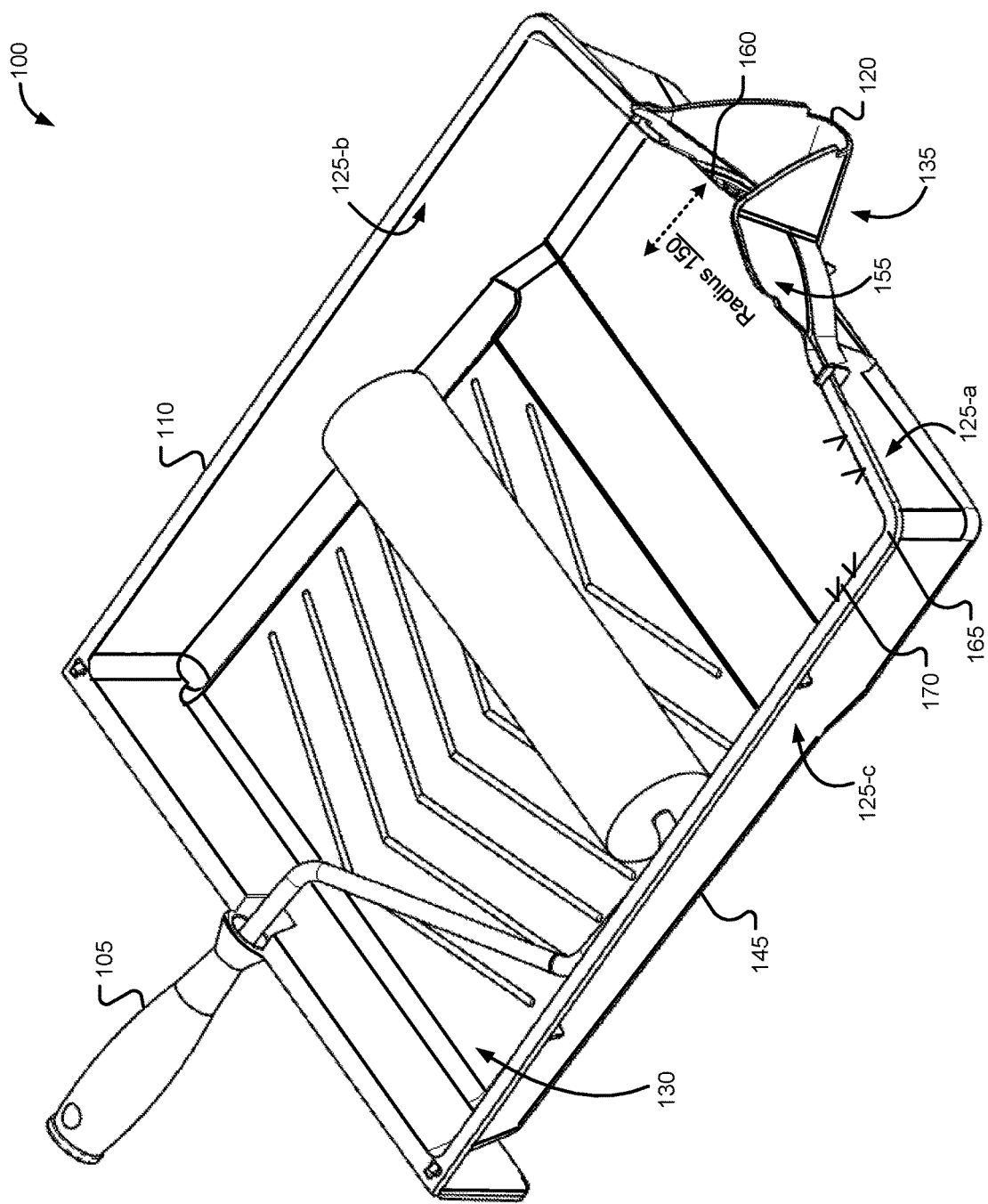
FIG. 1 is a perspective view of a paint tray according to an embodiment of the disclosure.

The word "exemplary" is used herein to mean "serving as an example, instance, or illustration." Any embodiment described herein as "exemplary" is not necessarily to be construed as preferred or advantageous over other embodiments.

The present disclosure generally relates to a paint tray that facilitates transfer of paint from paint containers to paint trays/liners (referred to herein as a "paint tray" or "paint trays", where appropriate) or vice-versa. More specifically, but without limitation, the present disclosure relates to a paint tray that can support a paint container in an upright position (i.e., vertical or at an angle) over a paint reservoir of the paint tray, also referred to herein as a paint tray reservoir, in order to drain paint from the paint container into the paint tray. Furthermore, the paint tray of the present disclosure is adapted to be supported over an opening of the paint container in order to drain excess paint poured into the paint tray reservoir back into the paint container, which may serve to minimize paint wastage.

In some cases, the paint tray of the present disclosure may be used with cylindrical paint containers (e.g., 1 quart, 1 gallon, 2 gallon, 5 gallon, etc.), although paint containers of other shapes, such as cuboidal, spherical, etc., are contemplated in different embodiments. In some cases, the paint container may be made from any suitable material, including metal (e.g., steel, tin, aluminum, stainless-steel, etc.), plastic, Polyvinyl Chloride (PVC), ceramic, glass, etc. In some embodiments, the paint tray may also be made from any similar suitable material, including metal or plastic. The paint tray may comprise one or more securing mechanism in its sidewalls to facilitate hands-free operation once the paint tray and paint container are coupled using said securing mechanism. In some cases, the paint tray may enable the paint tray to be balanced on the paint container and/or the paint container on the paint tray, depending on user preference or task. Furthermore, the paint tray may allow a user to actively use the paint tray while the paint container is draining into the tray. For instance, a user may access paint in the paint reservoir via a roller or brush, while the paint container is secured and coupled to the paint tray, enabling the draining of paint from the paint container into the paint tray.

In some embodiments, the paint tray may comprise one or more sidewalls (e.g., 4 sidewalls) surrounding a base. A paint reservoir may be defined by the one or more sidewalls and the base. It should be noted that, the paint reservoir may or may not occupy the entire interior volume of the paint tray. In some embodiments, the paint tray may comprise securing mechanism in one or more of its sidewalls, junctions or corners formed by intersecting sidewalls, or a combination. In one example, a paint tray may comprise a corner with a lip and securing mechanism along the two sidewalls forming the corner. In this case, the modified corner with the lip may be utilized to secure the paint tray to the rim or groove of a paint container. Further, the securing mechanism along the two sidewalls may be utilized to secure the container's wire handle to the paint tray. In this way, the securing mechanism of the paint tray may allow the paint container to be firmly supported at a pouring angle, while preventing prolonged hands-on manual holding of the paint tray and container during draining.

Some examples of securing mechanism or features utilized in the paint tray may include, but not limited to, notches, notches with snap features, hooks, v-shaped notches, grooves, etc. In some embodiments, securing mechanism on tray sidewalls may be spaced apart by a pre-configured distance (e.g., 7.3, 11.4 millimeters (mm), etc.), which may allow for adjustment of pouring angle and/or compatibility with containers of various sizes (i.e., different radius, height, width, etc.). In one example, the securing mechanism may comprise one or more hooks, where the distance from a first hook to a front edge of a paint can, or alternatively, from a corner of two intersecting sidewalls, may be 131.1 mm. Further, a distance to a second hook may be 142.5 mm, to a third hook may be 149.8 mm, and to a fourth hook may be 161.2 mm. In another example, the distance from a side edge of a paint can, or alternatively, from a corner of two intersecting sidewalls, to a hook or notch on a sidewall may be 114.8 mm. It should be noted that these distances are merely examples, and not intended to be limiting. In other words, different distances between hooks and/or notches from a corner of the paint tray (or alternatively, from the edge of a paint can) may be contemplated in different embodiments, further described below in relation to FIG. 1.

In some embodiments, a paint tray may also support paint containers without wire handles. In some cases, the paint tray may utilize a snap mechanism, where the snap mechanism is adapted to grip the paint container and support it at an angle sufficient to permit flow of paint from the paint container into the tray. In some cases, snap mechanism(s) may be installed at one or more corners, although installations on other portions of the paint tray (e.g., between two sidewall corners) are contemplated in other embodiments. In some circumstances, the snap mechanism may also serve to minimize slippage of the paint container by snapping into the groove or rimmed portion of the container. In some embodiments, the snap mechanism may be formed using one or more lips, grooves, notches, teeth, and/or tabs. In some other cases, the paint tray may comprise a modified lip on each sidewall of a single corner, which may allow inverted placement of a paint container onto the lips on adjacent sidewalls.

Additionally or alternatively, the paint tray may comprise securing mechanism (e.g., snap mechanism, lips, notches, grooves, etc.) of varying sizes on its different corners, which may allow containers of different radii to be drained into the tray. In some cases, the weight distribution of the paint tray may aid in draining multiple paint containers simultaneously (e.g., one container on each corner with securing mechanism). In one example, the base of the paint tray may be made of a different material than the material used to manufacture the sidewalls, which may assist in providing an optimum weight distribution. For instance, the base of the paint tray may be substantially heavier or lighter than the surrounding sidewalls to enable a heavy paint container to be balanced over the paint tray without tipping over. Additionally or alternatively, the base of the paint tray may have a non-uniform weight distribution, for instance, between the end of the tray utilized to support the paint container and the opposite end. In yet other cases, the sidewalls of the paint tray may be of different weights (e.g., sidewall on which paint container is supported or balanced may be of a different weight than an opposing sidewall).

In some embodiments, the paint tray may comprise a modified sidewall, where the modified sidewall includes a scooped extension. In some cases, the scooped extension may also be referred to as a scooped section. The scooped extension may comprise a cylindrical or rounded cross section and may be shaped to match the outer surface of a paint container. In some cases, the scooped extension may be vertically raised with respect to the paint tray. That is, the scooped extension may extend in an upward and outward direction from the sidewall, such that the top of the scooped extension is at a higher elevation than the other sidewalls. In some embodiments, the scooped extension may comprise a bendable tab for securing a container wire handle. The scooped extension may be composed of the same material as the paint tray, although different materials are contemplated in other embodiments. In some cases, the sidewall comprising the scooped extension may comprise one or more teeth or lips for securing an inverted container. While setting up the container for pouring, a user may secure the rim (or groove) of the paint container with the teeth or lips arranged on the inside of the modified sidewall. Further, the user may rest the outer wall of the container on the scooped extension and secure the wire handle (if any) to the bending tab to complete the installation. In some cases, the scooped extension and securing mechanism within the sidewall may allow for an adequate depth of the paint reservoir for use during container suspension and draining.

Additionally or alternatively, the scooped extension may also allow draining of excess paint from the tray into the container. In some embodiments, the scooped extension may be shaped and sized to fit under a lip, or another overhanging portion over the opening of a paint container. In some cases, the paint from the tray may flow over the scooped extension into the container, for instance, upon placement of the paint tray at an appropriate angle (e.g., 45 degrees, 60 degrees, 75 degrees, etc.). In some aspects, the scooped extension may be utilized as a pouring surface while draining paint from the tray into the container. In some cases, the pouring angle may be adjustable, since the angle sufficient to permit flow of paint may vary. In some cases, the minimum angle required to enable flow may be based on the viscosity of the paint, type of paint, material of manufacture of paint reservoir and/or base, quantity of paint in tray, depth of tray, etc. For instance, the angle at which latex based paints, water-based paints, and oil-based paints may start flowing may vary. In some cases, the angle of the scooped extension may be configured to be modified to support different paint types, paint containers, etc. In some other cases, the angle of the paint tray may need to be adjusted depending on paint type and/or paint container dimensions. In yet other cases, the paint container may support the use of scooped extensions of varying radii, sizes, smoothness, etc. Further, the scooped extensions may be removeable and replaceable in some embodiments. In some cases, the scooped extension may also comprise one or more tabs or teeth for clamping, for instance, to the rim of the paint container, which may serve to secure the paint tray in place (i.e., during transfer from tray to container). In some embodiments, the scooped section or extension may also comprise a filter or sieve for catching bristles or other debris introduced into the reservoir, for instance, from the brush or roller. The filter or sieve may be removeable and/or replaceable (e.g., washable, disposable, etc.).

FIG. 1 illustrates a perspective view of a paint tray 100, also referred to herein as a "tray", according to an embodiment of the disclosure. As shown, the paint tray 100 includes one or more sidewalls 125 (e.g., sidewall 125-a, sidewall 125-b, sidewall 125-c), a base 145, a reservoir 130, a roller 105, drainage spout 120, and a peripheral lip 110. In some examples, the reservoir 130 may be formed by the base 145 and the one or more sidewalls 125, where the one or more sidewalls 125 extend in an upward direction from the base 145. The one or more sidewalls may extend away from at least a portion of the base 145 at around (within at least 2-3 degrees of) a 90-degree angle. In some cases, the paint tray 100 may comprise a paint container securing mechanism 170 which may be one of integrated and coupled to at least one sidewall of the one or more sidewalls 125.

In some embodiments, peripheral lip 110 may extend along a substantial portion of the outer upper edge of the paint tray 100. For instance, peripheral lip 110 may be formed integrally along an upper end of the one or more sidewalls 125. Further, peripheral lip 110 may comprise one or more modified corners 165, where the modified corners 165 may include lips, grooves, notches, and/or other securing mechanisms described above. In some other cases, the peripheral lip 110 may also comprise a snap mechanism (e.g., see snap mechanism 475 in FIG. 4), which may be used to secure paint containers without wire handles.

Additionally or alternatively, the peripheral lip 110 may be utilized to secure the paint tray to the paint container at an adequate pouring angle. For instance, the paint container may be placed in an inverted position onto the peripheral lip 110, and allowed to drain its contents into the tray, wherein the paint container opening is in a vertical position above the reservoir. In some embodiments, the paint container may be placed in an inverted position (e.g., 60 degrees, 75 degrees, etc.) onto the peripheral lip 110, and allowed to drain its contents into the tray 100. Further, the peripheral lip 110 may comprise one or more paint container securing mechanisms 170, comprising notches or grooves along the sidewalls 125 (i.e., sidewalls 125-c and 125-a intersecting the corner 165 where the container is secured) for securing the container's wire handle (if any). In one example, the securing mechanism 170 may comprise one or more hooks, where the distance from a first hook to the corner 165 (or alternatively, from a front edge of a paint can) may be 131.1 mm. Further, a distance from the corner 165 to a second, third, and fourth hook may be 142.5 mm, 149.8 mm, and 161.2 mm, respectively. Additionally or alternatively, the securing mechanism 170 may comprise one or more notches. Further, a distance from the corner 165 to a notch on a sidewall (e.g., sidewall 125-a) may be 114.8 mm. In some cases, the notches may be mirrored on both sides of the corner or pour spout (e.g., if the drainage spot 120 is located on the paint tray corner). In other words, each sidewall 125 intersecting the corner 165 may comprise a notch. These notches may assist in balancing the paint tray 100 onto the paint can while pouring paint back into the can.

It should be noted that, the distances described above are merely examples and not intended to be limiting. Further, different numbers of hooks or notches are contemplated in different embodiments.

In some embodiments, at least one sidewall 125 (e.g., sidewall 125-a), may comprise a scooped section 135 extending horizontally and/or vertically outward from the sidewall 125. In some cases, the scooped section 135 may also be referred to as a scooped extension. In some cases, the scooped section may comprise a cylindrical or curved section of a pre-configured radius 150. For example, the scooped section 135 may comprise a rounded back portion 160. Further, the radius 150 of the scooped section 135 may be similar or substantially similar to the radius of the paint container (e.g., radius 750 of paint container 707 in FIG. 7). In some cases, the radius of the scooped section may be the same as or similar to the radius of commercially available paint containers (e.g., 1 quart, 1 gallon, 2-gallon, 5-gallon containers, etc.). For example, the radius of the scooped surface may be anywhere between 6.0 and 7.0 inches, such as 6.625 inches.

In some embodiments, the scooped section 135 may facilitate draining of paint from a paint container into the tray by supporting and stabilizing the paint container over the paint tray, as seen in, for example, FIG. 7 and described herein. In some aspects, the curvature of the scooped section 135 may enable the outer surface of an inverted paint container to remain flush with the curved scooped section, thus allowing the inverted paint container to be supported over the paint tray 100 during transfer of the paint container contents to the tray 100, further described in relation to FIGS. 8 and 9. In some circumstances, at least a portion of the outer surface of the paint container may be one of generally and substantially flush with at least a portion of the scooped section 135. For instance, the outer surface of the paint container may rest against the rounded back portion 160 of the scooped section 135 along the flush interface (e.g., flush interface 836 in FIG. 8). In some embodiments, the scooped section may also be utilized during transfer of paint from the paint tray 100 into the container. In one example, vertical extensions 155 of the scooped section 135 may be adapted to fix under a lip or rim of the paint container, which may allow paint tray 100 to be supported over the opening of the paint container at an angle (e.g., 45 degrees, 60 degrees, 75 degrees, 90 degrees, etc.) sufficient to permit paint flow into the container, as further described in relation to FIG. 14. For instance, paint may drain from the paint tray into the paint container upon coupling the paint tray 100 to the paint container via placement of the reservoir 130 in a vertical position above the paint containing opening.

Figure 2:
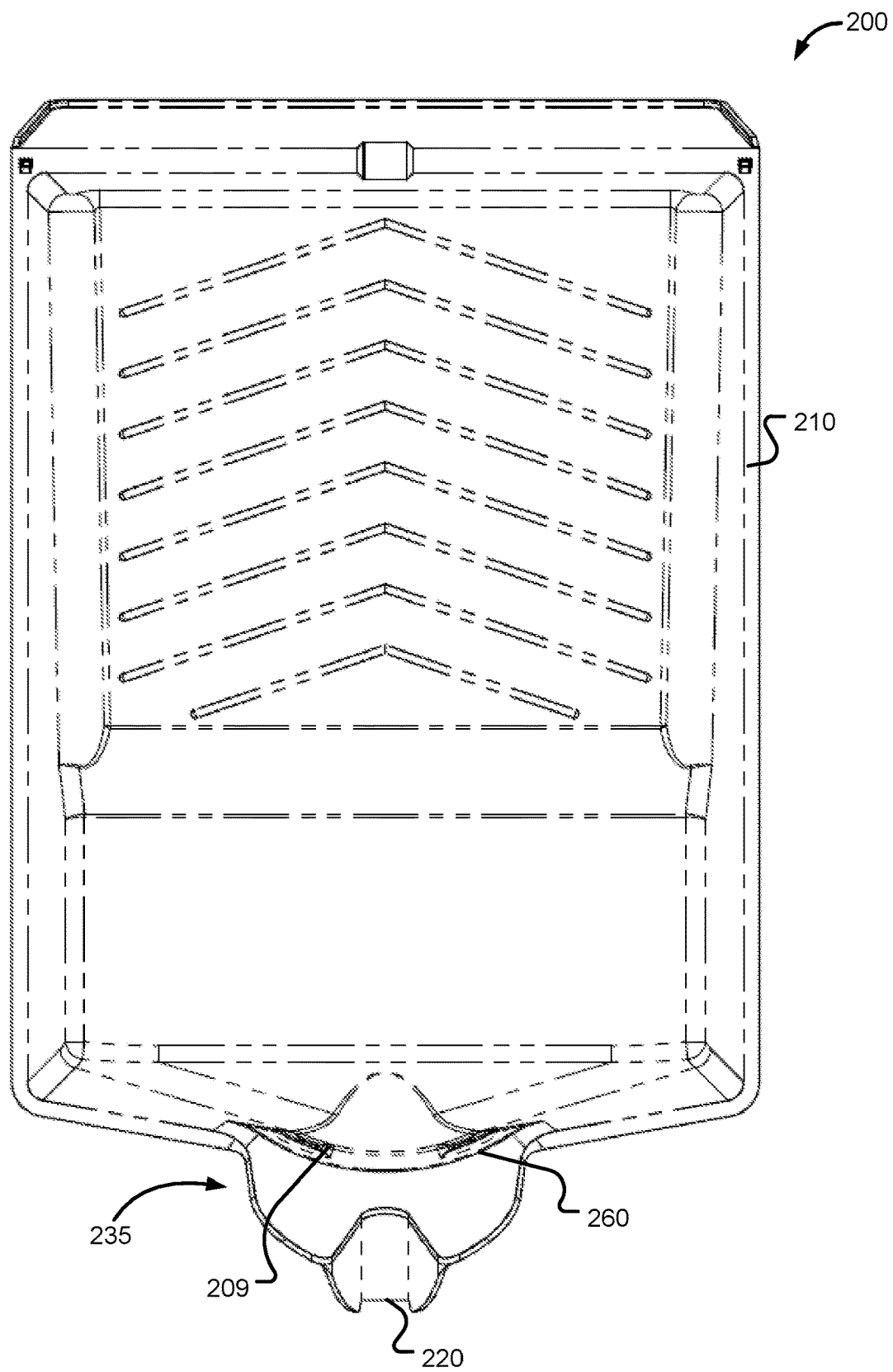
FIG. 2 is a top view of the paint tray in FIG. 1 according to an embodiment of the disclosure.

FIG. 2 illustrates a top view of a paint tray 200 according to an embodiment of the disclosure. In some examples, paint tray 200 may implement one or more aspects of paint tray 100 described in relation to FIG. 1 and other figures described herein, and may include a peripheral lip 210, also referred to herein as a lip 210, scooped section 235, and drainage spout 220. In some cases, the drainage spout may comprise a drain spout, a nozzle, a faucet, a pipe, etc. As shown, in some embodiments, peripheral lip 210 may extend along a substantial portion of the upper edge of the paint tray 200 and may be formed integrally along an upper end of the one or more tray sidewalls. The lip 210 may extend generally horizontally outwardly from the sidewalls. At least one sidewall may comprise the scooped section 235, which may extend horizontally and/or vertically outward from the sidewall. Additionally or alternatively, at least one sidewall may comprise scooped section 235, where the scooped section extends upwardly from the base and outwardly from the at least one sidewall. The scooped section may facilitate flow of paint from the paint container into the paint tray by supporting the paint container in an inverted pouring position over the paint tray. In some cases, the scooped section 135 may also be referred to as a scooped extension. In some cases, the scooped section may comprise a cylindrical or curved section of a pre-configured radius. In other words, the scooped section 135 may comprise a rounded back portion 260, also illustrated as the rounded back portion 160 in FIG. 1. Further, the radius of the scooped section 235 may be similar or substantially similar to the radius of the paint container. In some cases, the radius of the scooped section may be the same as or similar to the radius of commercially available paint containers (e.g., 1 quart, 1 gallon, 2-gallon, 5-gallon containers, etc.). In some cases, the at least one sidewall comprising the scooped section may comprise at least one tooth 209 (e.g., two teeth, four teeth, etc.), where the at least one tooth 209 may be adapted to engage with a rim or groove of the paint container. It should be noted that, in some cases, a paint container may comprise one or more grooves or rims along its upper outer edge (i.e., near the opening of the paint container), which may be used to secure a lid/cover for the paint container (e.g., to prevent paint from drying, spilling over during transport, etc.). In some cases, tooth 209 may facilitate stably supporting the paint container in an inverted pouring position over the paint tray 200, even when the paint container does not include a wire handle (e.g., wire handle 708 in FIG. 7A). In some examples, an angle (e.g., angle 365-a in FIG. 3) between the scooped section and the peripheral lip 210 (also shown as peripheral lip 310 in FIG. 3) may be altered such that the paint container may balance on the teeth 209 of the scooped section 235.

Figure 3:
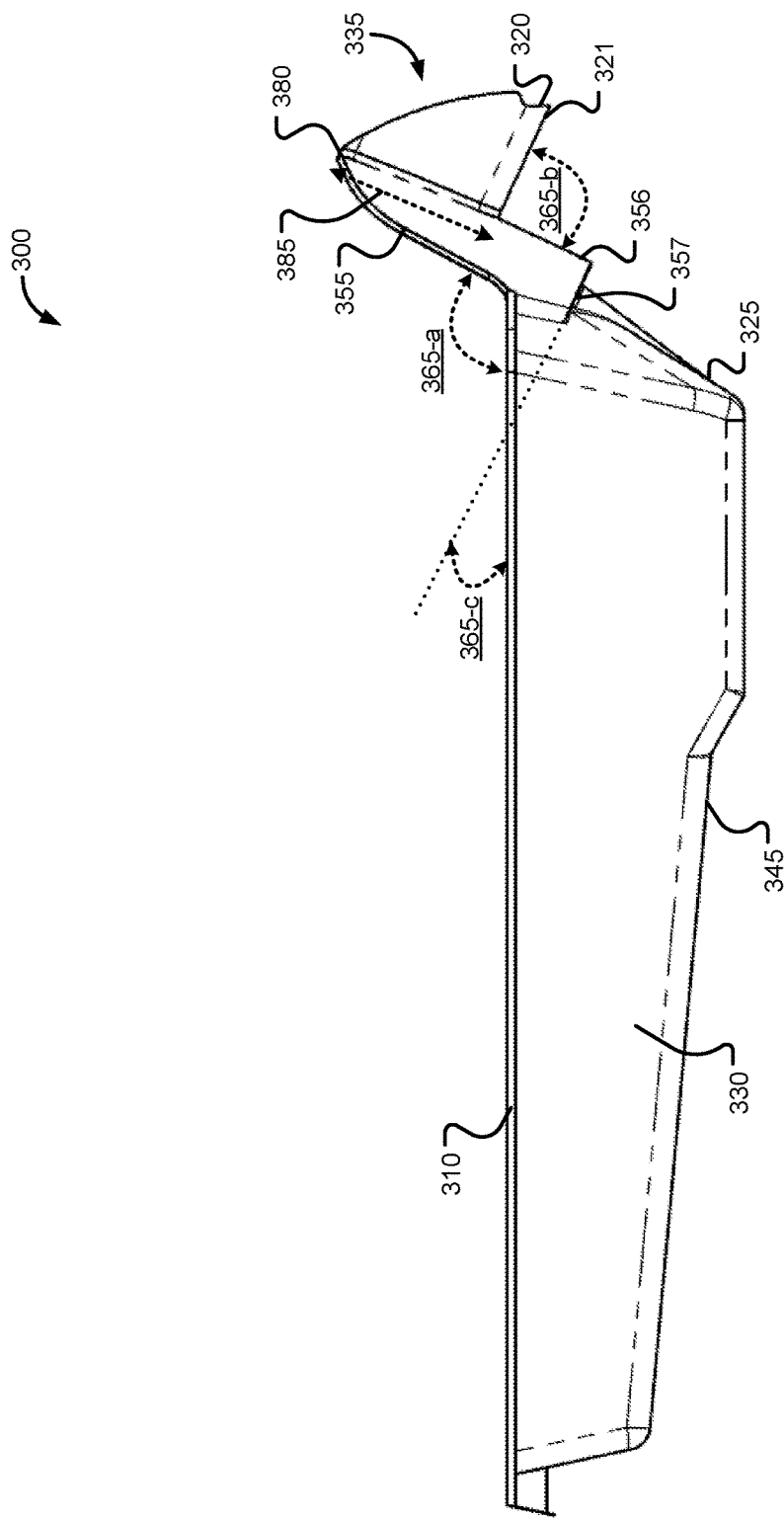
FIG. 3 is a side view of the paint tray in FIG. 1 according to an embodiment of the disclosure.

Turning now to FIG. 3, we see a side view of a paint tray 300 according to an embodiment of the disclosure. In some examples, paint tray 300 may implement one or more aspects of paint trays 100 and/or 200 described in relation to FIGS. 1 and 2, respectively, or other figures described herein. As shown, the paint tray 300 includes a base 345, a reservoir 330, a drainage spout 320, a peripheral lip 310, a scooped section 335, vertical extensions 355 of the scooped section, and one or more sidewalls 325. In some examples, the reservoir 330 may be formed by the base 345 and the one or more sidewalls 325, where the one or more sidewalls extend in an upward direction from the base 345. In some embodiments, peripheral lip 310 may extend along a substantial portion of the outer upper edge of the paint tray 300. For instance, peripheral lip 310 may be formed integrally along an upper end of the one or more sidewalls 325. Further, peripheral lip 310 may comprise one or more modified corners, where the modified corners include lips, grooves, notches, and/or other securing mechanism described above (e.g., modified corner 165 in FIG. 1). In some other cases, the peripheral lip 310 may also include a snap mechanism (e.g., snap mechanism 475 in FIG. 4) comprised of notches, teeth, and/or lips which may be used to secure paint containers without wire handles. Additionally or alternatively, the peripheral lip 310 may be utilized to secure the paint tray 300 to the paint container at a pouring angle. For instance, the paint container may be placed in an inverted position (e.g., 60 degrees, 75 degrees, etc.) onto the peripheral lip 310, and allowed to drain its contents into the tray. In some examples, an angle 365-a between the vertical extension 355 and the peripheral lip 310 may be adjustable such that the paint container may balance on teeth (e.g., tooth 209) of the scooped section 335, which may facilitate stably supporting the paint container in an inverted pouring position over the paint tray 300, even when the paint container does not include a wire handle (e.g., wire handle 708 in FIG. 7A). In some cases, the teeth themselves may be installed on top of a paint can ledge 357 (also referred to as ledge). Alternatively, the paint tray 300 may only comprise the paint can ledge 357 without any teeth. In such cases, the top of the paint container may rest on the ledge 357 (i.e., on the top of the ledge) while draining. As shown, the peripheral lip 310 and the paint can ledge 357 may be separated by an angle 365-c, which may be anywhere between 20 and 30 degrees, such as 25 degrees. It should be noted that angle 365-c may be configured to be altered and may be more or less than 25 degrees in other embodiments.

In some embodiments, the scooped section 335 may also be utilized during transfer of paint from the paint tray 300 into the container. In one example, vertical extensions 355 of the scooped section 335 may be adapted to fix under a lip or rim of the paint container, which may allow paint tray 300 to be supported over the opening of the paint container at an angle (e.g., 45 degrees, 60 degrees, 75 degrees, 90 degrees, etc.) sufficient to permit paint flow into the container, as further described in relation to FIG. 14. For instance, paint may drain from the paint tray 300 into the paint container upon coupling the paint tray to the paint container via placement of the reservoir 330 in a vertical position above the paint containing opening. Further, an angle 365-b between a lower edge 321 of the drain spout 320 and an outer edge 356 of the vertical extension 355 may be adjustable. In some cases, pour effectiveness may vary based on the angle 365-b, as well as entry points for paint on the spout 320. In other words, there may exist different angles 365-b and points of entry (i.e., for paint on the spout 320) to allow paint to flow more effectively into the container, where the angle 365-b and points of entry may be based on the type of paint used, paint viscosity, etc. In some cases, a less acute angle for angle 365-b may allow for an easier pour back into the container. In some examples, angle 365-b may be an obtuse angle (i.e., greater than 90 degrees), such as 120 degrees, although other values for angle 365-b are contemplated in different embodiments.

In some embodiments, a distance 385 between a top 380 of the vertical extension 355 and the point where the lower edge 321 intersects the outer edge 356 of the vertical extension 355 may be altered, which may also accommodate pouring of fluid or paint back into the paint container. In other words, the entrance of the spout 320 in the scooped section 335 may be adapted to be low enough to allow paint to flow into the spout 320 before it starts to pour over the scooped section 335, for instance, when the paint tray 300 is balanced on the paint container. In some cases, adjustment of distance 385 may also serve to ensure that the paint tray 300 is of sufficient depth to hold an adequate volume of fluid (or paint). In some examples, the distance 385 may be at least 2.375 inches, although other distances (e.g., 2 inches) are contemplated in different embodiments.

Figure 4:
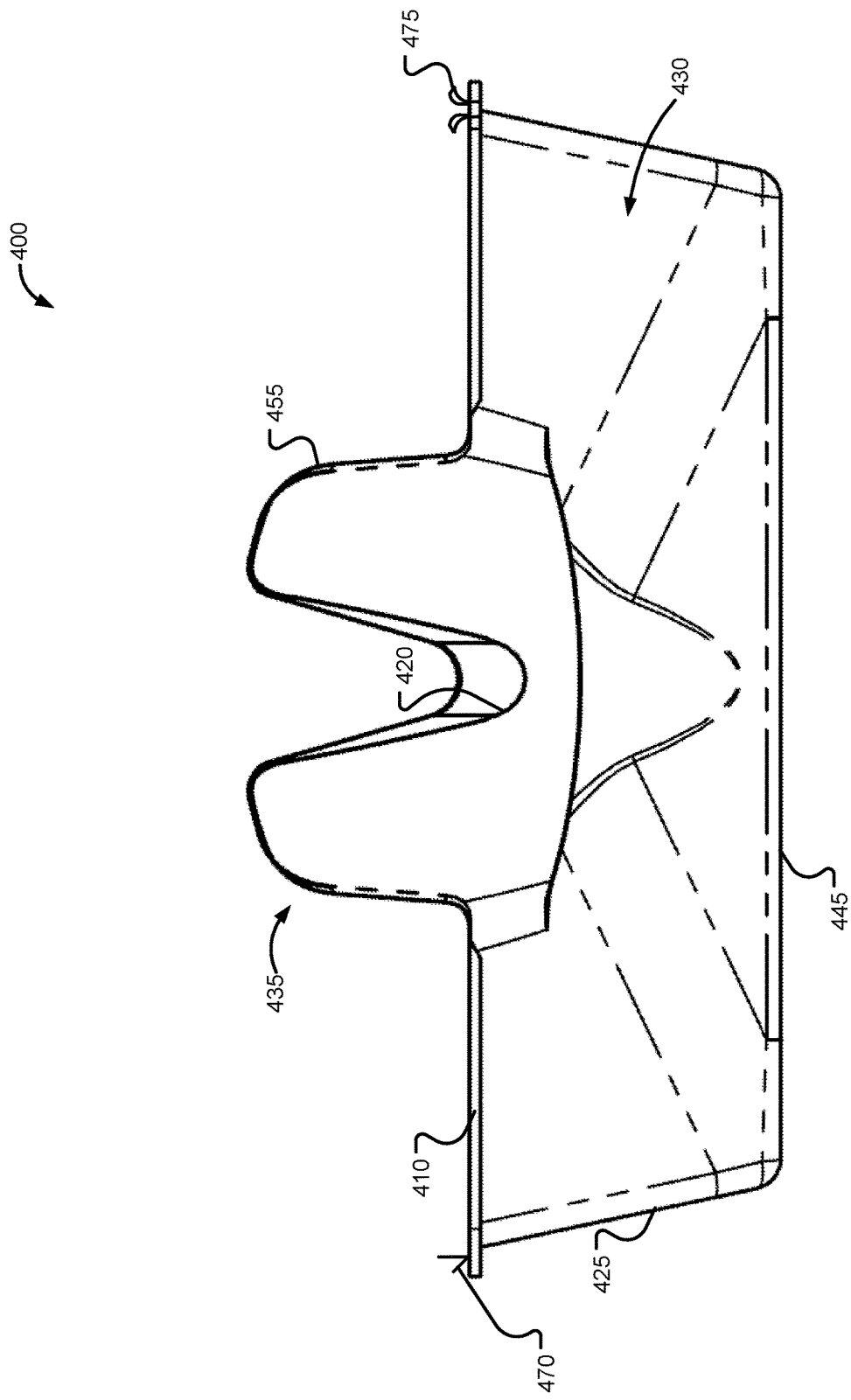
FIG. 4 is a front view of the paint tray in FIG. 1 according to an embodiment of the disclosure.

Turning now to FIG. 4, which illustrates a front view of a paint tray 400 according to an embodiment of the disclosure. In some examples, paint tray 400 may implement one or more aspects of paint trays 100, 200, and/or 300 described in relation to FIGS. 1, 2, and 3 respectively, or any other figure described herein.

As shown, the paint tray 400 includes a base 445, a reservoir 430, drainage spout 420, a peripheral lip 410, a scooped section 435, vertical extensions 455 of the scooped section, and one or more sidewalls 425. In some examples, the reservoir 430 may be formed by the base 445 and the one or more sidewalls 425, where the one or more sidewalls extend in an upward direction from the base 445. In some embodiments, peripheral lip 410 may extend outwardly from the reservoir 430 along a substantial portion of the outer upper edge of the paint tray 400. For instance, peripheral lip 410 may be formed integrally along an upper end of the one or more sidewalls 425. Further, peripheral lip 410 may comprise one or more modified corners, where at least one modified corner include a paint container securing mechanism 470, such as a lip, a groove, a notch, and/or another securing mechanism described above. In some other cases, the peripheral lip 410 may also include a snap mechanism 475 on one or more of its corners, where the snap mechanism 475 comprises one or more notches, teeth, and/or lips, which may be used to secure paint containers without wire handles.

Additionally or alternatively, the peripheral lip 410 may itself be utilized to secure the paint container onto the tray at an adequate pouring angle. In some embodiments, the paint container may be placed in an inverted position (e.g., 60 degrees, 75 degrees, etc.) onto the peripheral lip 410, and allowed to drain its contents into the tray 400. Further, the peripheral lip 410 may comprise one or more notches or grooves (e.g., paint container securing mechanism 470) along the sidewalls 425 (i.e., sidewalls intersecting the corner where the container is secured) for securing the container's wire handle (if any).

Figure 5:
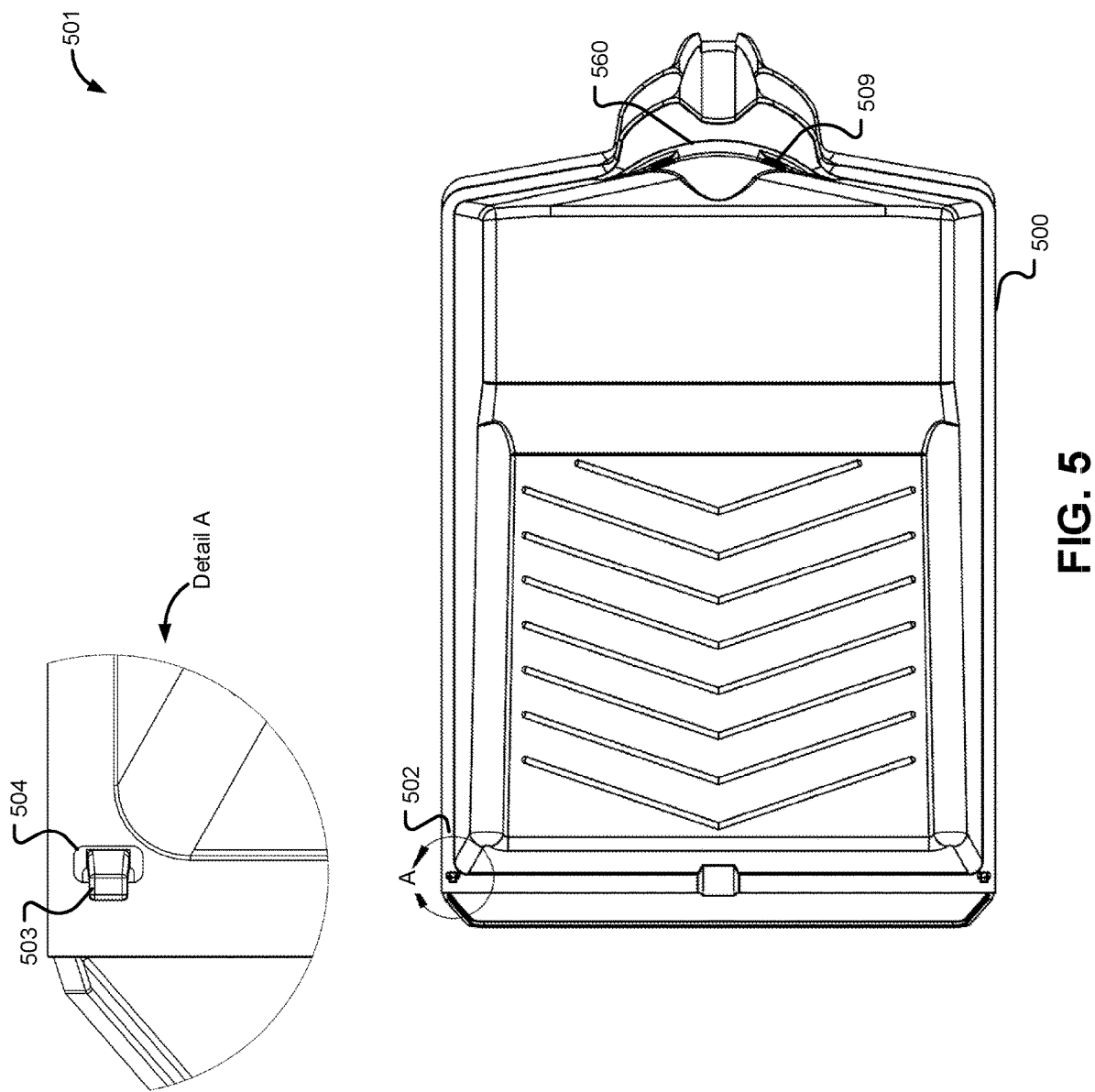

FIG. 5 illustrates a top view of a paint tray system 501 according to an embodiment of the disclosure. In some examples, paint tray system 501 include a paint tray 505. Further, paint tray 500 may implement one or more aspects of paint trays 100-400 described in relation to FIGS. 1-4 and other figures described herein. As shown, paint tray 505 may comprise a rounded back portion 560 and one or more teeth 509 adapted to engage with a rim or groove of a paint container. The rounded back portion 560 and one or more teeth 509 may be examples of the rounded back portion 260 and teeth 209 described in relation to FIG. 2.

In some embodiments, a liner 502 may be installed in paint tray 500, which may facilitate in the cleaning of paint tray 500 after use. In some cases, liner 502 may be shaped to cover a substantial portion of the base or paint reservoir of the tray 500. In some other cases, liner 502 may be similar or substantially similar in dimensions to the paint tray 500. In some embodiments, and as shown in detail A, paint tray 500 may include one or more hooks 503 along its edges. Further, hooks 503 may be designed to be received in one or more through holes 504 of the liner 502, further explained in FIG. 6 below. In some cases, the hooks 503 may be installed on top of the peripheral lip (e.g., peripheral lip 110 in FIG. 1). Alternatively, hooks 503 may be installed on top of the sidewalls (e.g., sidewalls 125 in FIG. 1).

Figure 6:
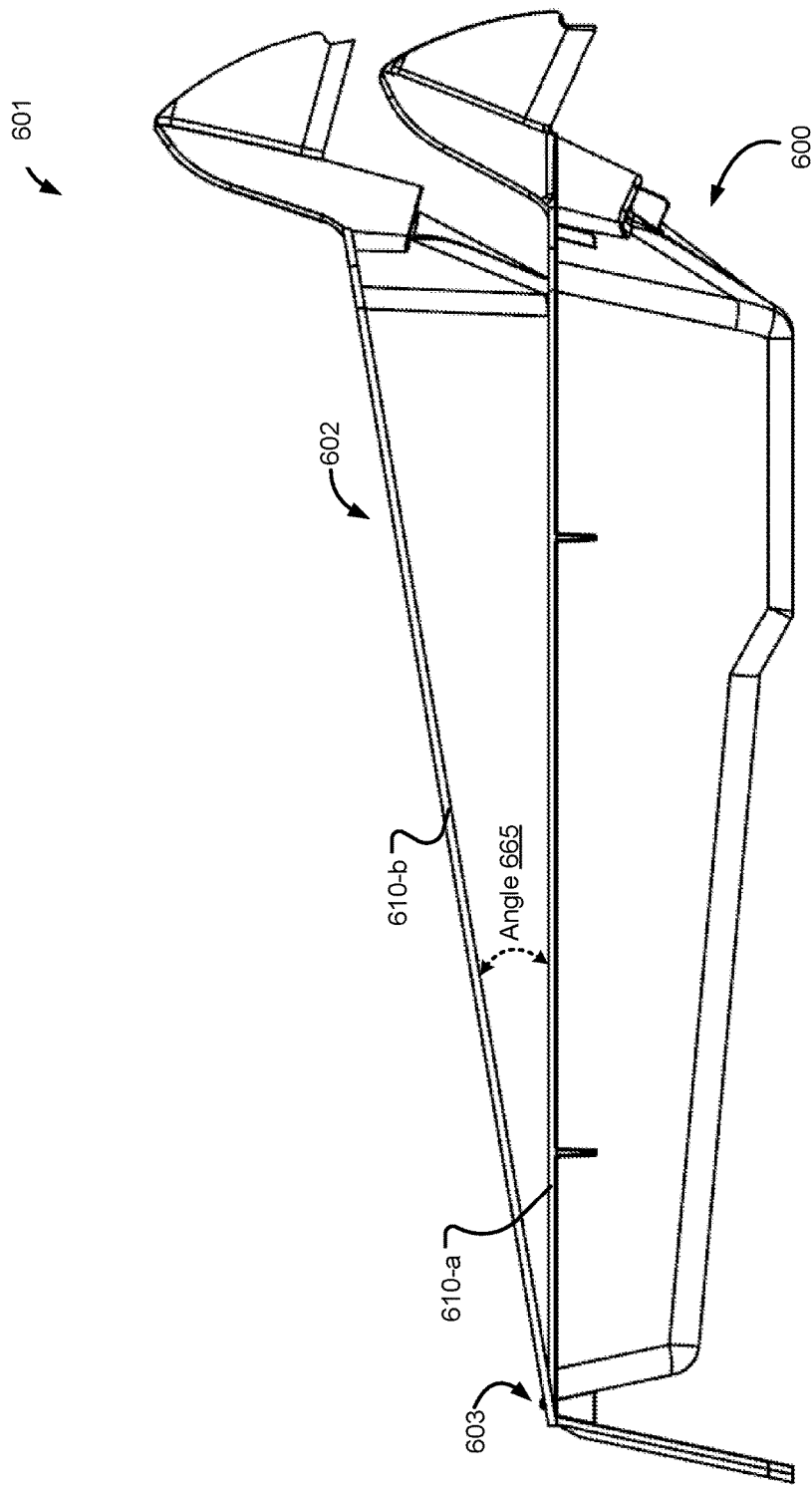
FIG. 6 is a side view of the paint tray from FIG. 5 depicting the installation of a liner into the paint tray according to an embodiment of the disclosure.

FIG. 6 illustrates a side view of a paint tray system 601 according to an embodiment of the disclosure. In some examples, paint tray system 601 may implement one or more aspects of paint tray system 501 described in relation to FIG. 5 and other figures described herein. In some embodiments, paint tray system 601 may include a paint tray 600, which may be an example of paint tray 500 described in relation to FIG. 5 and other figures described herein. Furthermore, paint tray 600 may implement one or more aspects of paint trays 100-400 described in relation to FIGS. 1-4 and other figures herein.

In some circumstances, a user may wish to install a liner 602 in paint tray 600, for instance, to ease in cleanup after use. During installation, the user may place the through holes of the liner 602 over hooks 603 in the tray 600 such that the hooks 603 extend into the through holes, as described in relation to FIG. 5. As illustrated, in some cases, the liner 602 may initially be positioned at an angle 665 (e.g., 30 degrees) with respect to the paint tray 600, such that the liner's through holes are aligned with the hooks 603. After the hooks 603 have been received in the through holes of the liner 602, the liner 602 may be rotated down so that a lip 610-b of the liner 602 is proximal to a lip 610-a of the tray 600.

Figure 7A:
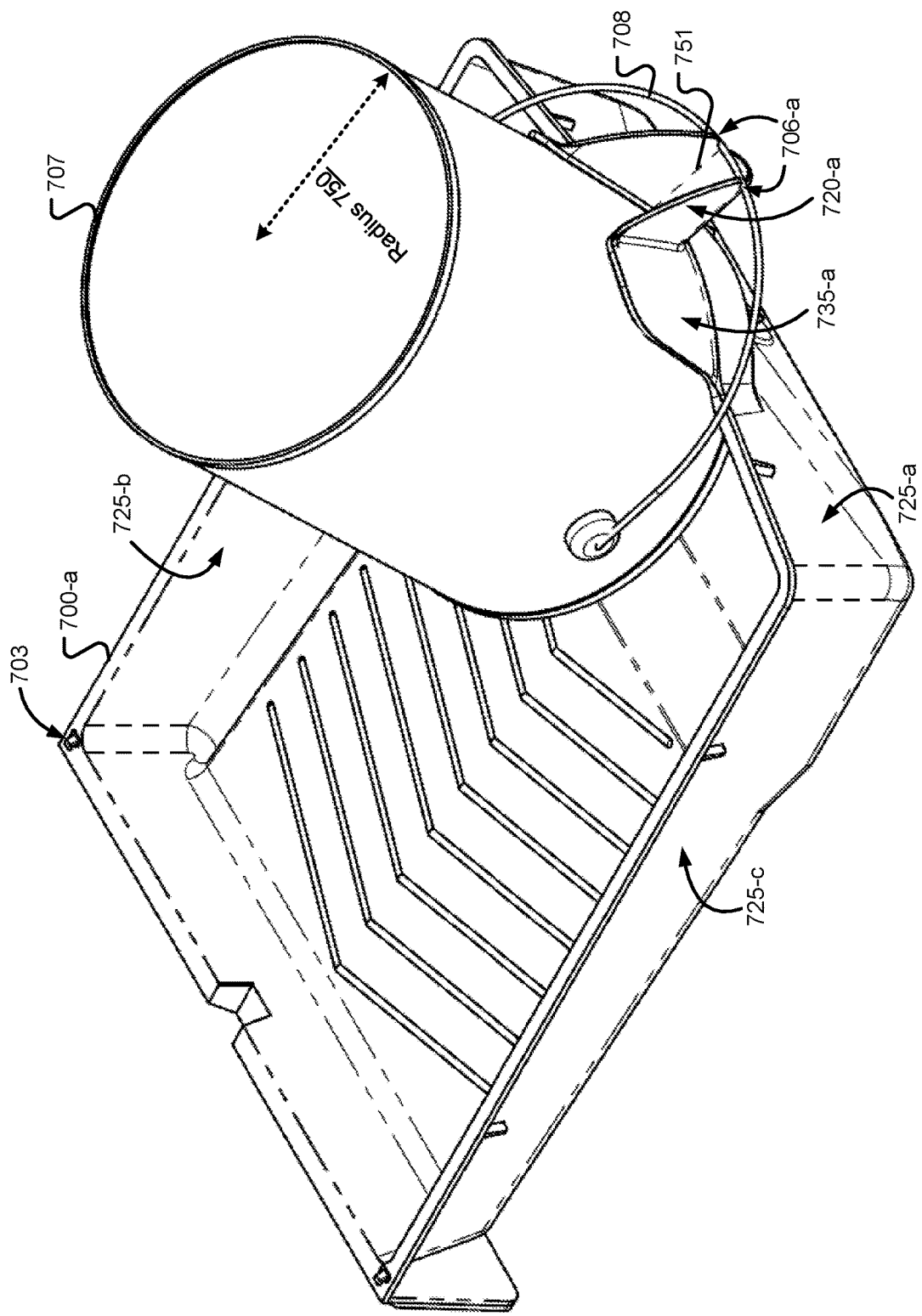
FIG. 7A is a perspective view of a paint container balancing on the paint tray in FIG. 1 and draining into it, according to an embodiment of the disclosure.
Figure 8:
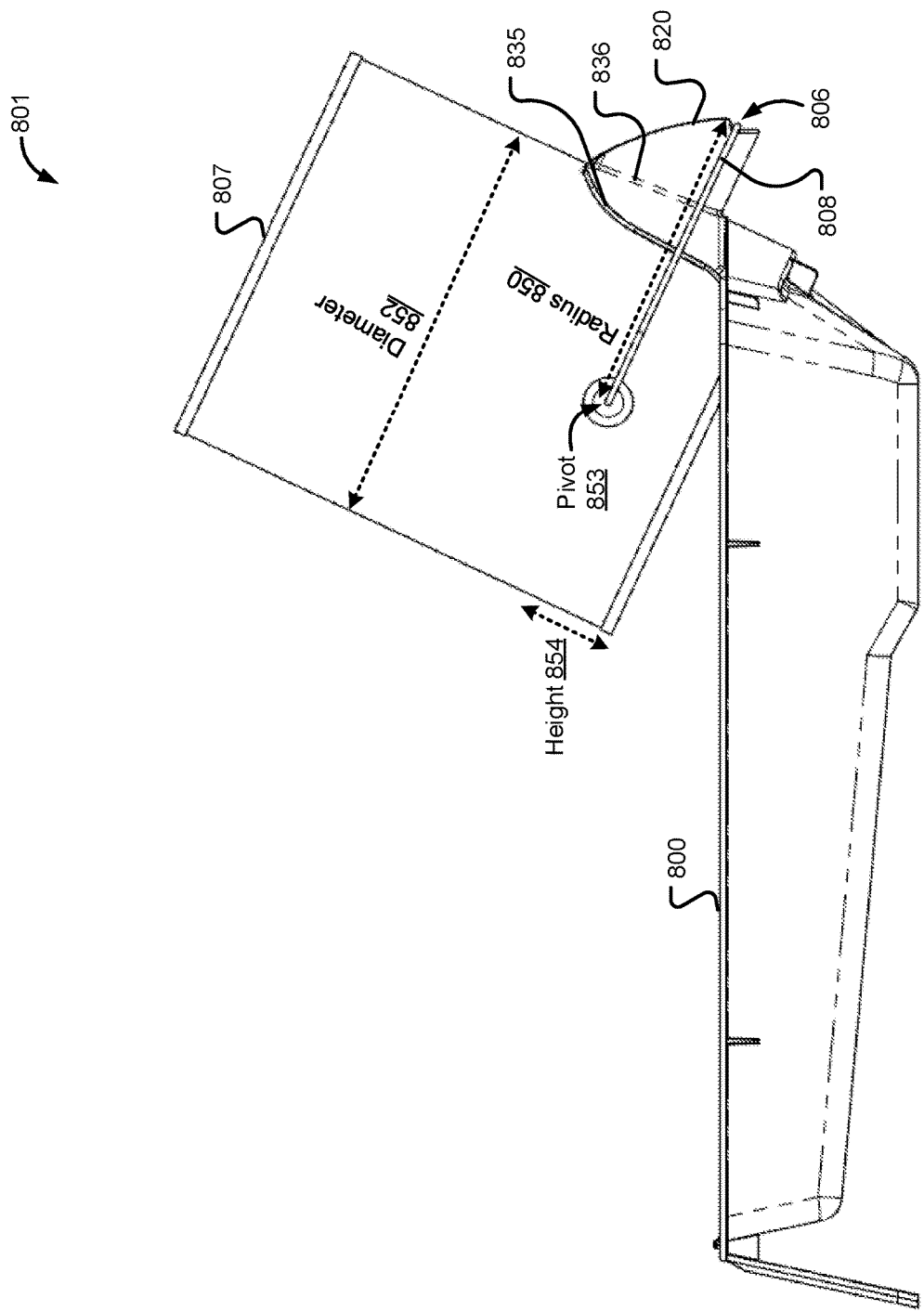
FIG. 8 is a side view of the paint container balancing on the paint tray as shown in FIG. 7 according to an embodiment of the disclosure.

FIG. 7A illustrates a perspective view of a paint tray system 701-a according to an embodiment of the disclosure. As shown, paint tray system 701-a may include a paint tray 700-a and a paint container 707. Further, paint tray 700-a may be similar or substantially similar to the paint tray 100 in FIG. 1 and other figures herein, comprising one or more sidewalls 725 (e.g., sidewall 725-a, sidewall 725-b, sidewall 725-c, etc.), at least one hook 703 for installing a liner (e.g., liner 602 in FIG. 6), a scooped section 735-a along at least one sidewall 725 (e.g., sidewall 725-a), drainage spout 720-a (e.g., a drain spout, spout, or nozzle), and one or more notches 706-a (notches 806 are also seen in FIG. 8) in the drainage spout 720-a for engaging with a wire handle 708 (also referred to herein as a handle) of the paint container 707.

In some cases, the paint container 707 may be secured to the paint tray 700-a by using the tension in the handle 708 to create a snug fit between the container and the scooped section 735-a. For instance, the wire handle 708 may be pressed down along an outer surface and/or edge of the curved spout 720-a to produce tension. The tension in the wire handle 708 may then be used to secure the handle 708 into the notches, snapping (or locking) the handle 708 in place within the one or more notches 706-a on the spout 720-a. In some cases, a distance 751 between the rounded back portion (e.g., rounded back portion 160 in FIG. 1) of scooped section 735-a and the notches 706-a that hold the wire handle 708 in place on the spout 720 may be predefined, and based in part on the distance of the wire handle to the outer edge of the container 707. In some circumstances, the distance 751 may be selected to allow any standard paint container, such as a 1-gallon container with a wire handle, to be coupled to the tray 700-a. In some other cases, the distance 751 may be configured to be adjustable, which may allow paint containers with non-standard dimensions to also be secured to the paint tray 700-a.

In some embodiments, the scooped section 735-a may be adapted to support the paint container 707 in an upright pouring position. The scooped section 735-a may also comprise one or more teeth or lips adapted to engage with a rim or groove of the paint container 707, which may serve to secure the paint container 707 in place and prevent it from sliding or tipping over. The scooped section 735-a may comprise a cylindrical or curved cross section, where the radius of the scooped section may be similar or substantially similar to radius 750 of the paint container 707. In some circumstances, the radius of the scooped section may be shaped to interface with a commercially available paint containers (e.g., 1 quart, 1 gallon, 2 gallon, etc.), which may allow the outer surface of the paint container 707 to remain flush with the scooped section. Thus, in some aspects, the scooped section may aid in pouring or transferring the paint from the paint container 707 into the reservoir of the paint tray 700-a.

Figure 7B:
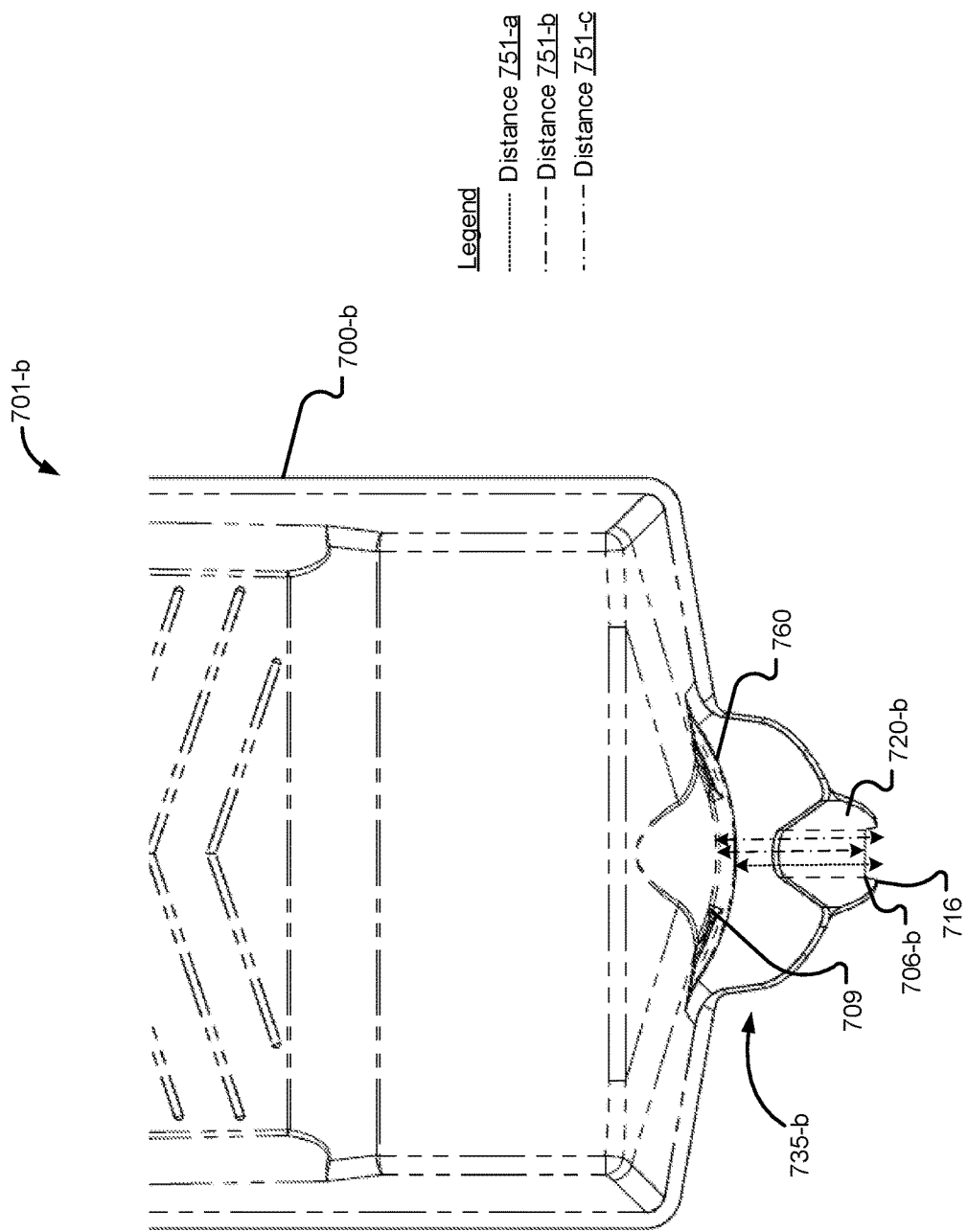
FIG. 7B is a top view of the paint tray in FIG. 7A depicting example dimensions that allow the paint container to fit securely over the paint tray.

FIG. 7B illustrates a top view of a paint tray system 701-b according to an embodiment of the disclosure. As shown, paint tray system 701-b includes at least a paint tray 700-b, which may be similar or substantially similar to the paint tray 700-a as described in relation to FIG. 7A. Paint tray 700-b may include a scooped section 735-b, one or more teeth 709 in the scooped section, where the teeth 709 may implement one or more aspects of teeth 209 as described in relation to FIG. 2. Further, scooped section 735-b may also include a rounded back portion 760 (also shown as rounded back portion 160 in FIG. 1), and a drainage spout 720-b (also shown as drainage spout 720-a in FIG. 7A).

In some cases, one or more distances 751 (e.g., distance 751-a, distance 751-b, distance 751-c) may be preconfigured and designed to allow a paint container to fit securely with teeth 709 while upside down, and while pouring paint into the tray 700-b. In some cases, distance 751-a (depicted by the dotted line in the figure) may represent a distance from a theoretical scoop surface of scooped section 735-b to a theoretical center point of a hook or notch feature (e.g., notch 806 in FIG. 8) in the spout 720-b. In some embodiments, the distance 751-a may be between 1.56 and 1.57 inches, such as 1.563 inches. In some examples, distance 751-a may represent a distance from a theoretical center of the scooped surface of scooped section 735-b, for instance, at an outer extent of the paint can ledge of paint tray 700-b, to a theoretical center of the hook or notch feature. In one example, this distance 751-a may be between 2.0 to 2.20 inches, such as 2.092 inches. In some cases, the distance from a theoretical scoop surface of scooped section 735-*b* to a theoretical edge of a hook or notch feature, such as notch 806 in FIG. 8, may be between 1.40 and 1.50 inches, for instance, 1.469 inches.

Distance 751-*b* (depicted by the two dashes-one dot line) may represent a distance from an actual last point of the curved surface of the scooped section 735-*b* (e.g., from a center of an inner edge of the paint can ledge, such as paint can ledge 357 in FIG. 3) to a vertical wall of the notch that engages with the wire handle of the paint container (e.g., a final edge of the hook or notch feature), and may be between 1.53 and 1.55 inches, such as 1.54 inches. Alternatively, the distance 751-*b* may be between 1.90 and 2.30 inches, such as 1.960 or 2.228 inches.

Furthermore, distance 751-*c* (depicted by the one dash-one dot line) may represent a distance from the actual last point of the curved surface of the scooped section 735-*b* (e.g., from a center of an inner edge of the paint can ledge, such as paint can ledge 357 in FIG. 3) to an end wall 716 of the notches 706-*b* (e.g., a theoretical center of the hook or notch feature), and may be anywhere between 1.65 and 1.66 inches, such as 1.655 inches. Alternatively, the distance 751-*c* may be between 1.80 to 2.40 inches, such as 1.834 or 2.338 inches. In some cases, the end wall 716 of the notches 706-*b* may also represent a theoretical center of the wire handle of the paint container.

It should be noted that the distances described above and throughout the remainder of this disclosure are merely examples, and not intended to be limiting. Different radii, distances, and angles are contemplated in different embodiments.

FIG. 8 illustrates a side view of a paint tray system 801 according to an embodiment of the disclosure. The paint tray system 801 may implement one or more aspects of paint tray system 701-*a* and/or 701-*b* described in FIGS. 7A and B, respectively, and other figures as described herein. In some embodiments, the paint tray system 801 may comprise a paint tray 800, and a paint container 807 with an outer diameter 852. In some cases, the outer diameter 852 may be anywhere between 6.5 and 7 inches, such as 6.625 inches. This diameter 852 may be similar or substantially similar to the diameter of scooped section 835. Further, paint tray 800 may be similar or substantially similar to the paint tray 100 in FIG. 1 and other figures herein, comprising one or more sidewalls, at least one hook for installing a liner (e.g., liner 602 in FIG. 6), the scooped section 835 along at least one sidewall, a drainage spout 820 (e.g., a drain spout, spout, or nozzle) integrated to one of the one or more sidewalls, and one or more notches 806 in the drainage spout 820 for engaging with a wire handle 808 (also referred to herein as a handle) of the paint container 807. As shown, radius 850 may represent a distance from pivot 853 of the wire handle-paint container connection to the end of the wire handle 808, and may be anywhere between 4.5 and 5 inches, such as 4.875 inches. In other words, a diameter of a theoretical center point of the revolved hook cut (i.e., theoretical centerline of revolved hook cut) may be anywhere between 9 and 10 inches, such as 9.75 inches. The vertical distance between the top of the paint container 807 and the pivot 853, shown as height 854, may be between 1.5 and 2 inches, such as 1.60 inches.

In some cases, the wire handle 808 may be pressed down on to the notches 806 or a portion of the spout 820 to force the handle 808 along an outer surface and/or edge of the spout and into the notches, snapping (or locking) the handle in place within the one or more notches 806. For example, the paint container 807 may secure to the tray 800 via tension in the wire handle 808, allowing for a snug fit between the container and the scooped section 835. In some cases, the wire handle 808 may be pulled down along the curved spout 820 to produce tension and secure the handle into the notches 806 on the spout. In some cases, the one or more notches 806 may be revolve-cut to create a hook feature, where a dimension of the revolve-cut may be based in part on a diameter of the wire handle 808. The diameter of the paint container's wire handle may be anywhere between 0.12 and 0.13 inches, such as 0.125 inches. In some other cases, a diameter of the revolved-cut or revolved hook cut in the curved spout 820 may be shaped and sized to match the diameter of the paint container's wire handle. In one example, the diameter of the revolved hook cut may be anywhere between 0.18 and 0.19 inches, such as 0.188 inches. In some cases, a distance from a theoretical center point of the scooped section 835 (also shown as scooped section 735-*b* in FIG. 7B) to a theoretical edge of the revolved hook cut of notch 806 may be anywhere between 1.40 and 1.50 inches, such as 1.469 inches.

Figure 9A:
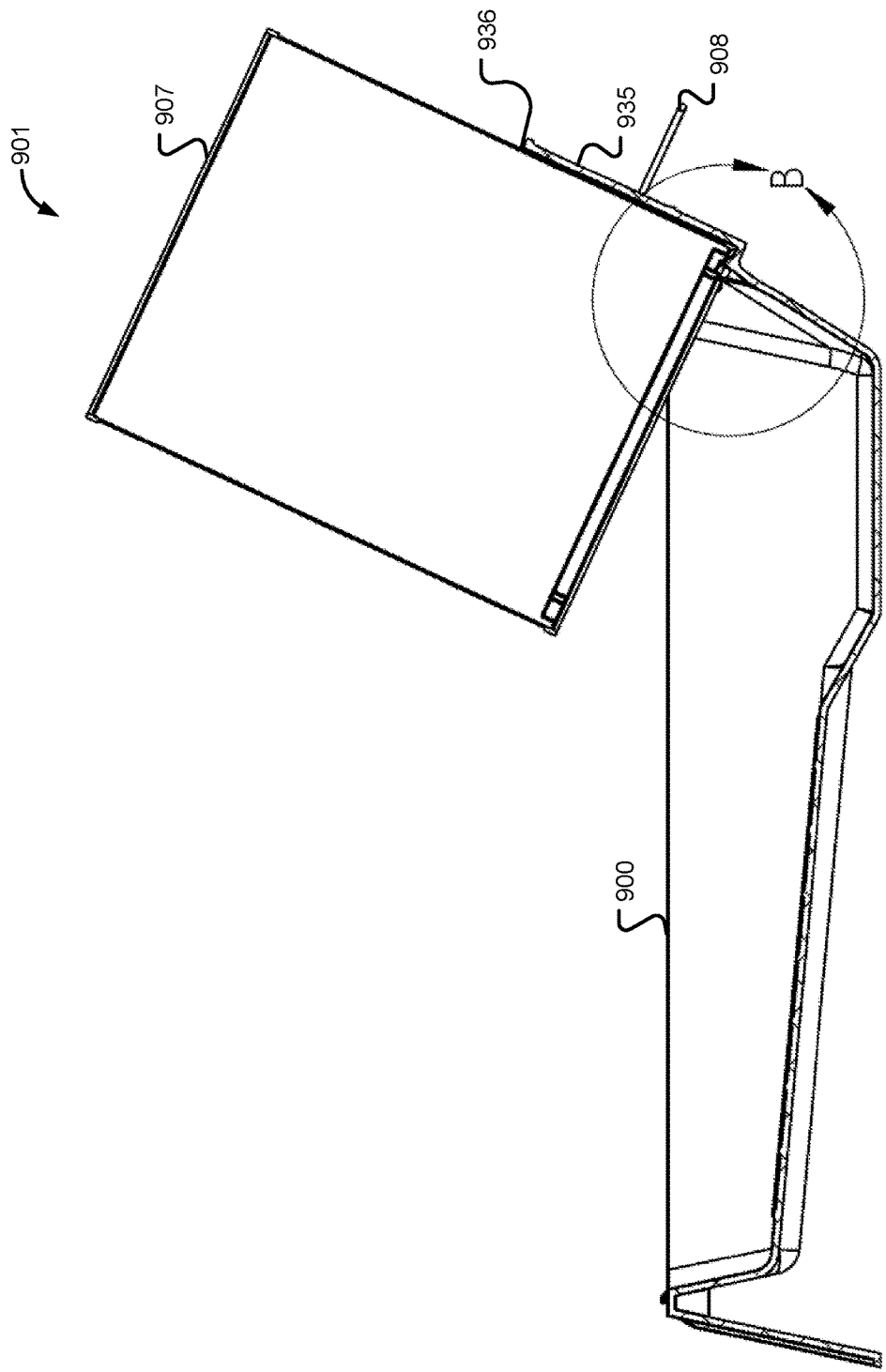
FIGS. 9A and 9B illustrate a cross-sectional side view and detailed cross-sectional side view, respectively, of a paint container balancing on a paint tray according to an embodiment of the disclosure.

FIG. 9A illustrates a cross-sectional side view of a paint tray system 901 according to an embodiment of the disclosure. In some embodiments, the paint tray system 901-*a* may implement one or more aspects of paint tray systems 701 and/or 801 described in relation to FIGS. 7 and 8, respectively, and any other figure as described herein. In some embodiments, the paint tray system 901 may comprise a paint tray 900 and a paint container 907. Further, paint tray 900 may be similar or substantially similar to the paint tray 100 in FIG. 1 and other figures herein, and may comprise at least a scooped section 935 along at least one sidewall, and one or more notches in the drainage spout for engaging with a wire handle 908 (also referred to herein as a handle) of the paint container 907. In some cases, the wire handle 908 may be pressed down on to the notches or a portion of the spout to force the handle 908 along an outer surface and/or edge of the spout and into the notches, snapping (or locking) the handle in place within the one or more notches. In some embodiments, the scooped section 935 may comprise a radius (e.g., radius 150 in FIG. 1). Further, the radius may be of a size for receiving the paint container, such that a portion of the outer surface of the paint container 907 is one of generally (e.g., maximum gap between outer surface of container and rounded back portion of scooped section is within a first threshold) and substantially flush (e.g., maximum gap between outer surface of container and rounded back portion of scooped section is within a second threshold, where second threshold is less than the first threshold) with at least a portion of the scooped section 935, as shown by flush interface 936.

Figure 9B:
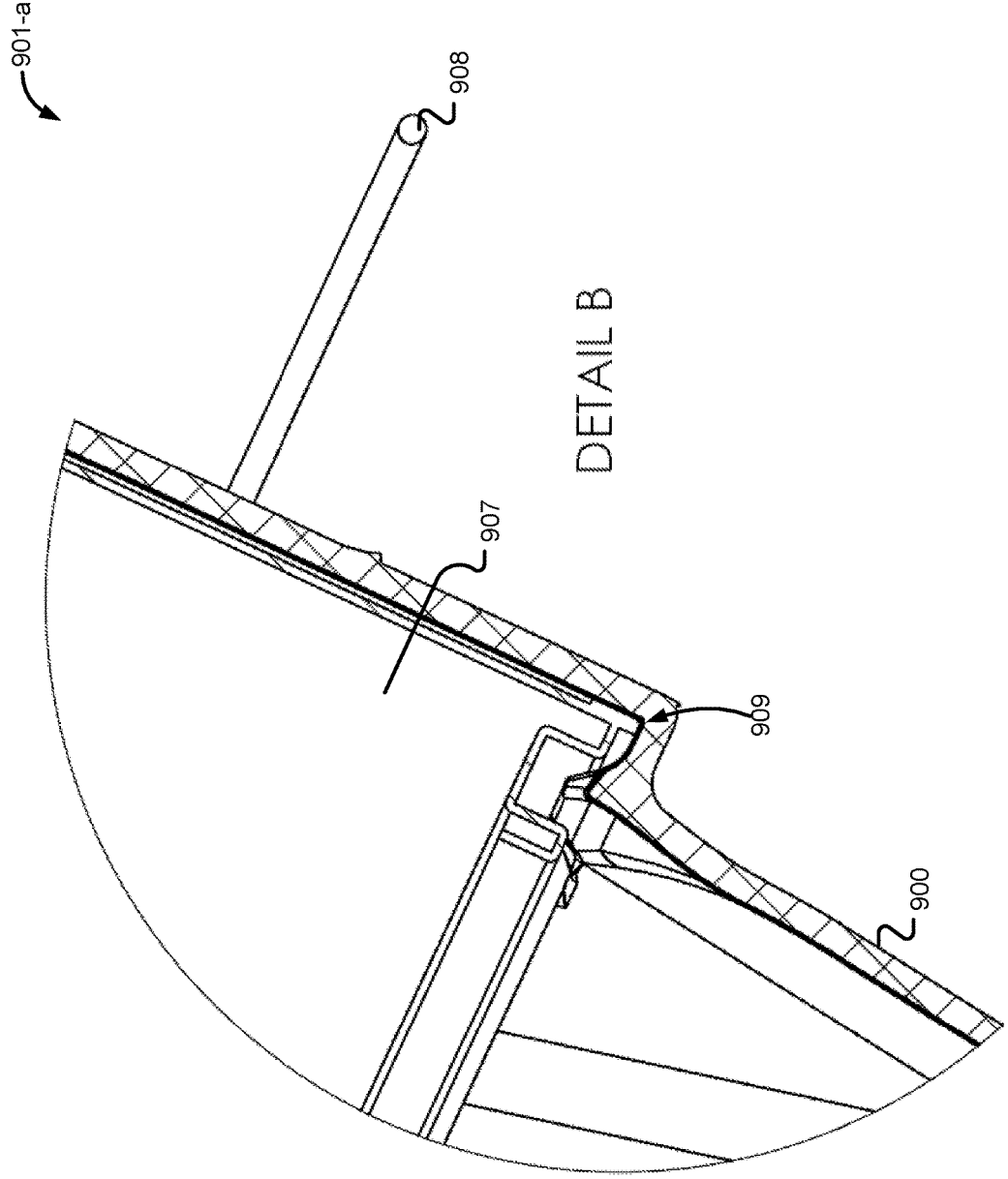

As shown, paint tray system 901 highlights detail B, further described in relation to FIG. 9B. FIG. 9B illustrates a zoomed in view of detail B of the paint tray system 901 shown in FIG. 9A. Detail B depicts the engagement of the paint container 907 with securement features, such as teeth 909, of paint tray 900. As described above, paint tray 900 may comprise a scooped section 935 (i.e., shown in FIG. 9A) along at least one of its sidewalls for supporting and stabilizing the paint container during transfer of its contents to the paint tray. It is further contemplated that the scooped section 935 may comprise one or more securement features, such as protrusions (e.g., teeth 909 or lips) along its inner surface, where the one or more teeth or lips are adapted to engage with the rim or groove, or alternatively, lips of the paint container 907. As shown in detail B, the securement features, which may comprise protrusions of the paint tray 900, may hook the rim or lip of the paint container 907 when the container opening is placed in a vertical and inverted position above the reservoir, thus securing the container in place.

Figure 10:
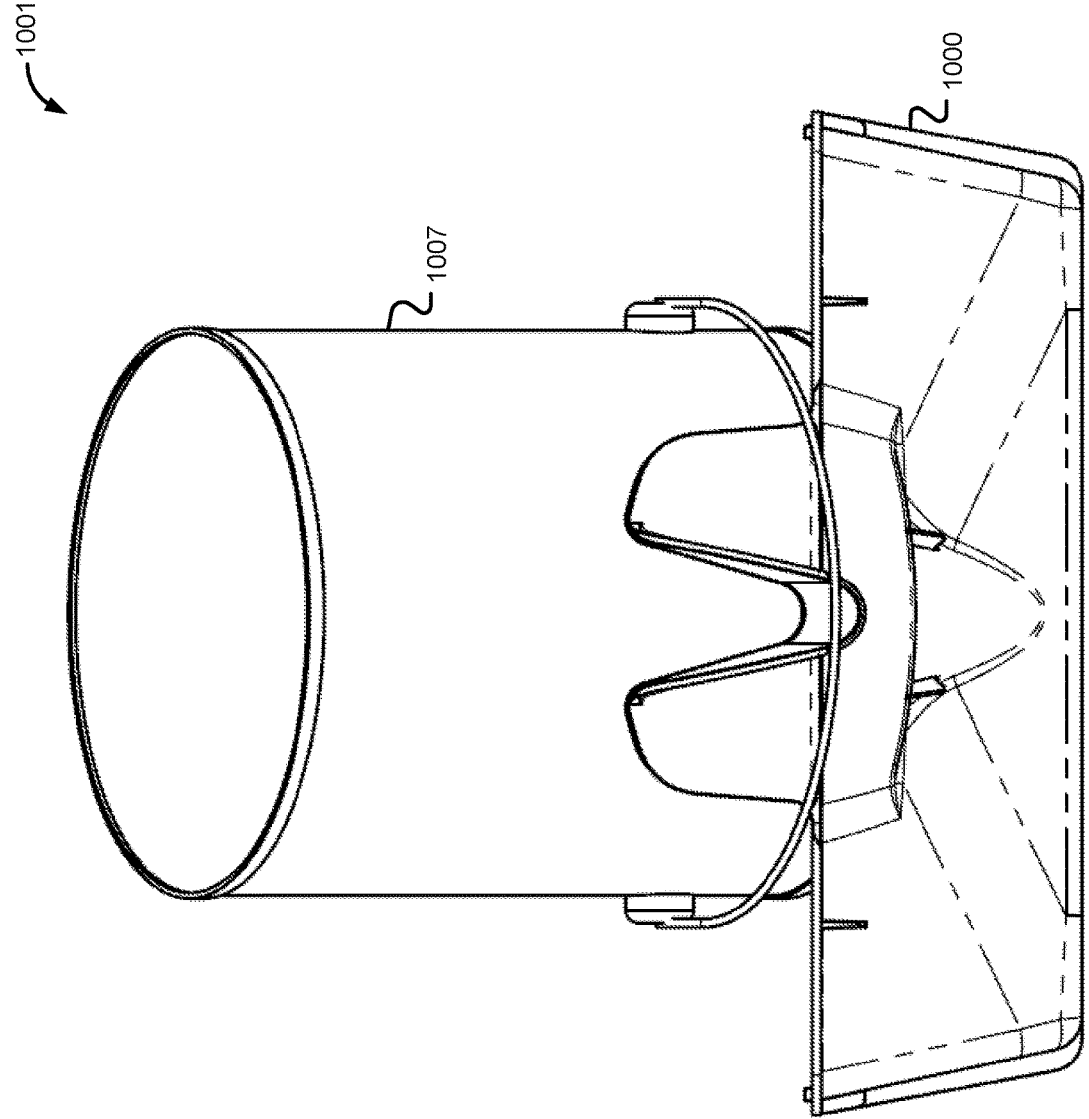
FIG. 10 is a front view of the paint container balancing on the paint tray as shown in FIG. 7 according to an embodiment of the disclosure.

FIG. 10 illustrates a front view of a paint tray system 1001 comprising at least a paint tray 1000 and a paint container 1007, according to an embodiment of the disclosure. The paint tray 1000 and paint container 1007 may be coupled together using a paint container securing mechanism of the paint tray, as previously described. In some embodiments, the paint tray system 1001 may implement one or more aspects of paint tray systems 701-901 described in relation to FIGS. 7-9, respectively, and any other paint trays and paint tray systems as described herein.

Figure 11:
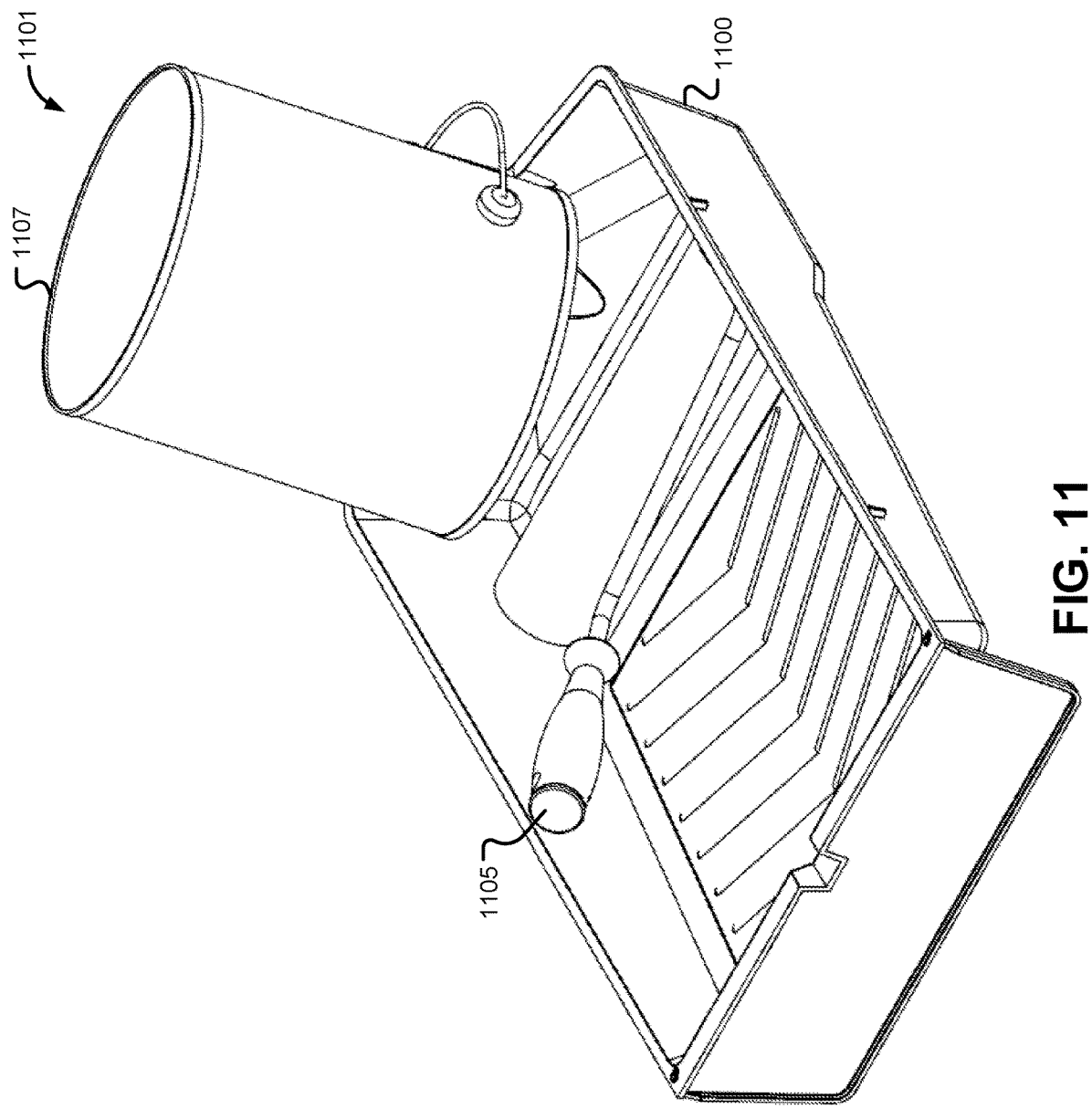
FIG. 11 is a rear perspective view of a paint container balancing on the paint tray in FIG. 1 and draining into it, according to an alternate embodiment of the disclosure.
Figure 12:
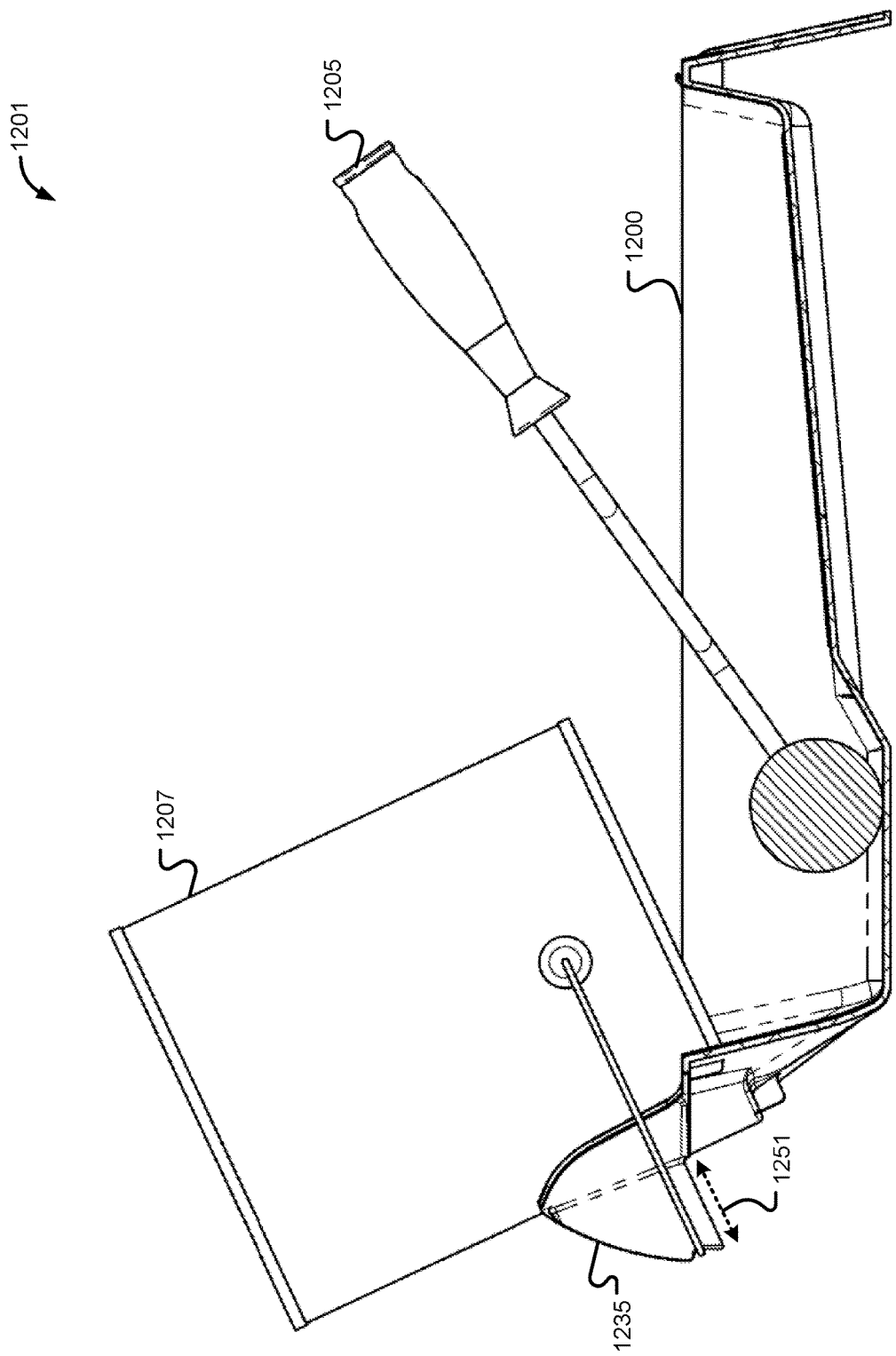
FIG. 12 is a side view of the paint container balancing on the paint tray in FIG. 11 according to an alternate embodiment of the disclosure.

FIG. 11 illustrates a rear view of a paint tray system 1101 according to an embodiment of the disclosure. In some embodiments, the paint tray system 1101 may implement one or more aspects of paint tray systems 701-1001 and paint trays described in relation to FIGS. 7-10, respectively, and any other figure herein. Further, the paint tray system 1101 may include a roller 1105, which may be an example of the roller 105 described in FIG. 1. As shown, in some circumstances, the roller 1105 may have access to the reservoir in the paint tray 1107 when the paint container 1100 is installed over the tray (i.e., paint container opening is placed in a vertical position above the reservoir of the paint tray) and actively draining into it. FIG. 12 illustrates a side view of a paint tray system 1201 according to an embodiment of the disclosure. In some embodiments, the paint tray system 1201 may implement one or more aspects of paint tray systems 701-1101 and trays described in relation to FIGS. 7-11 and any other figure, respectively. As shown, paint tray system 120 may comprise at least a paint tray 1200, a roller 1205, and a paint container 1207 coupled to the paint tray using a securing mechanism. Furthermore, the paint tray 1200 may comprise a scooped section 1235, which may be an example of scooped section 135 in FIG. 1. Scooped section 1235 may comprise a paint container securing mechanism, wherein the paint container securing mechanism further comprises a bendable tab for engaging with a wire handle of the paint container 1207. In some cases, the wire handle may be pressed down on to the bendable tab to force the handle along an outer surface and/or edge of the tab and into the notches of the bendable tab, snapping (or locking) the handle in place within the one or more notches. In some cases, the notches of the bendable tab may be similar to the notches 806 described in FIG. 8. The bendable tab may be composed of any applicable flexible material, such as rubber, plastic, silicone, etc.

Figure 13:
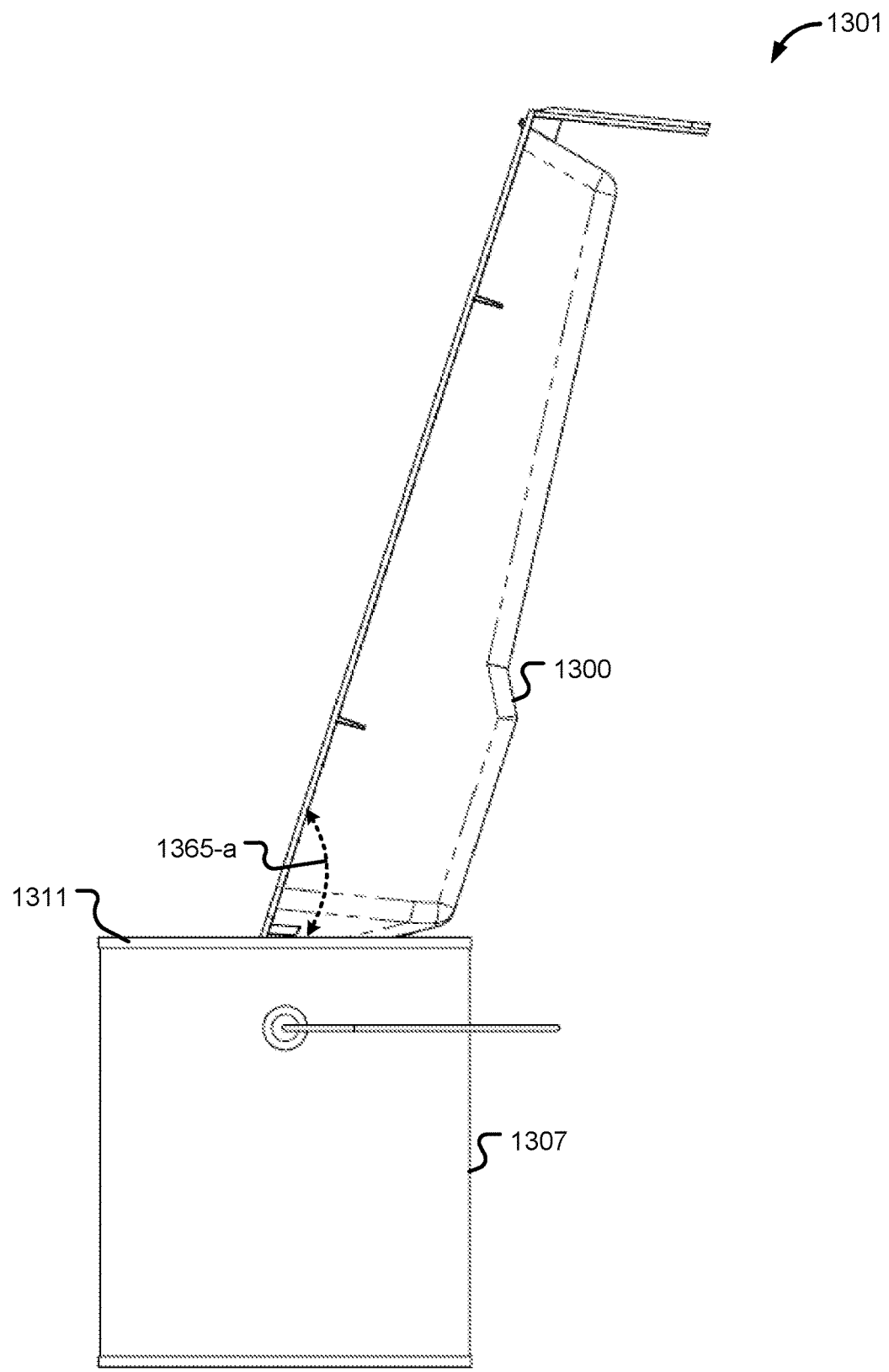
FIG. 13 is a side view of the paint tray in FIG. 1 balancing on a paint container and draining excess paint into it, according to an alternate embodiment of the disclosure.

FIG. 13 illustrates a side view of a paint tray system 1301 according to an embodiment of the disclosure. In some embodiments, the paint tray system 1301 may implement one or more aspects of paint tray systems 701-1201 and trays described in relation to FIGS. 7-12 and/or another figure. As shown, paint tray system 1301 may comprise a paint tray 1300 and a paint container 1307. Paint tray 1300 may be similar or substantially similar to paint tray 100 shown in FIG. 1. In some embodiments, paint may be poured into a reservoir of paint tray 1300, for instance, prior to painting. Following painting, excess paint may be transferred from the paint tray 1300 into the paint container 1307 for later use. In some embodiments, paint tray 1300 may be adapted to balance over an opening of the paint container 1307 to enable paint from the tray to flow into the container 1307 under gravity. For instance, the paint securing mechanism and drainage spout of the paint tray may operate to drain paint from the paint tray 1300 into the paint container 1307 upon coupling the paint tray 1300 to the paint container 1307 via placement of the reservoir in a vertical position above the paint container opening.

In some examples, the paint tray 1305 may be designed to allow hands-free transfer of paint from the paint tray into the container. As described above, in some cases, the paint tray may comprise one or more sidewalls and a scooped section extending in an upward and outward direction from at least one sidewall. Besides facilitating transfer of paint from the can into the paint try, the extended scooped section may also allow excess paint to be transferred from the tray into the container. In some cases, at least a portion of the extended scooped section may be adapted to fix under an overhanging portion 1311 of the container or can, where the overhanging portion 1311 (or lip) partially extends over an opening of the can, further described in relation to FIG. 14. In some cases, the paint from the tray may flow over the scooped extension into the container, for instance, upon placement of the paint tray 1300 at an angle 1365-a (e.g., 45 degrees, 60 degrees, 75 degrees, etc.) sufficient to permit paint flow. In some aspects, the scooped extension may be utilized as a pouring surface while draining paint from the tray into the container. In some cases, the angle 1365-a may be adjustable, since the angle sufficient to permit flow of paint may vary.

Figure 14:
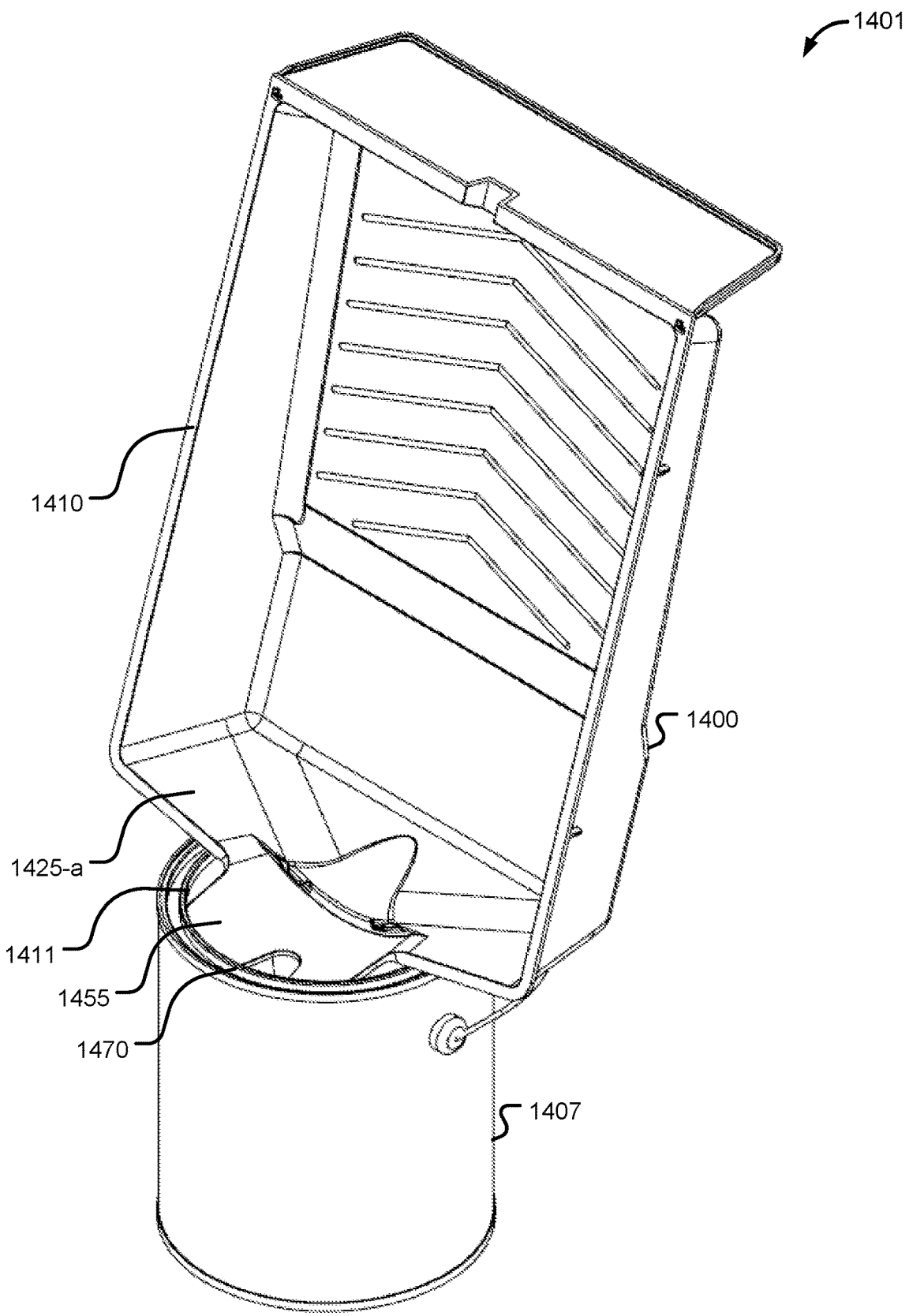
FIG. 14 is a perspective view of the paint tray in FIG. 12 balancing on the paint container and draining excess paint into it, according to an alternate embodiment of the disclosure.

FIG. 14 illustrates a perspective view of a paint tray system 1401 according to an embodiment of the disclosure. In some embodiments, the paint tray system 1401 may implement one or more aspects of paint tray systems 701-1301 described in relation to FIGS. 7-13. As shown, paint tray system 1401 may comprise a paint tray 1400 and a paint container 1407. Paint tray 1400 may be similar or substantially similar to paint tray 100 shown in FIG. 1 and other figures herein. As shown, paint tray 1400 may comprise a scooped section (e.g., scooped section 135 in FIG. 1) comprising a vertical extension 1455, which may be an example of vertical extension 155 described in relation to FIG. 1. As previously described, the scooped section may extend in an upward and outward direction from a sidewall 1425-a of the paint tray 1400. In some other cases, at least one sidewall 1425 may comprise the scooped section, where the scooped section extends upwardly from the base and outwardly from the at least one sidewall 1425.

During transfer of paint or another fluid from the paint tray 1400 into the paint container 1407, the paint tray may be positioned such that the vertical extension 1455 slips and fixes under overhanging portion 1411 (or lip), thus securing the paint tray 1400 over the opening of the paint container. Further, the scooped section and vertical extension 1455 may assist in guiding the flowing paint into the can, while also minimizing spillage. In some cases, the curved inner surface of the scooped section may comprise one or more grooves, notches, teeth or prongs adapted to clasp a rim 1470 or groove of the paint container, which may provide additional stability and support for the paint tray while in the upright position, as displayed in FIG. 14. Similar grooves, notches, teeth, or prongs may be included in one or more locations on the tray lip 1410, enabling coupling of the tray to the can in the upright position. It is also contemplated that the scooped section or tray sidewall may comprise a removeable and/or replaceable filter or sieve for trapping bristles and other debris introduced into the reservoir during painting. In this way, any excess paint poured back into a container may be of the same or similar quality to the original paint.

Figure 15:
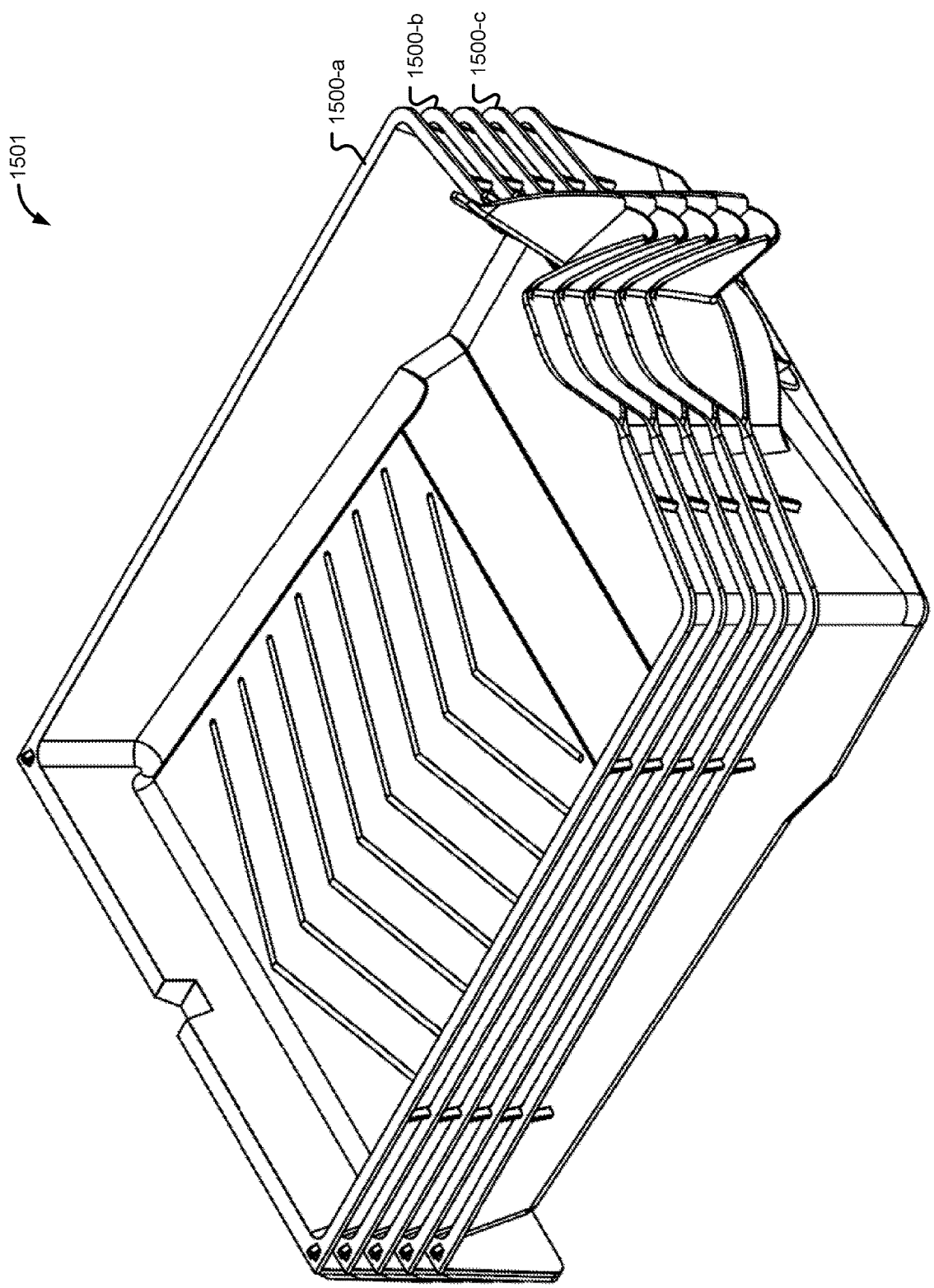
FIG. 15 is a perspective view of a plurality of paint trays stacked within each other, according to an alternate embodiment of the disclosure.
Figure 16:
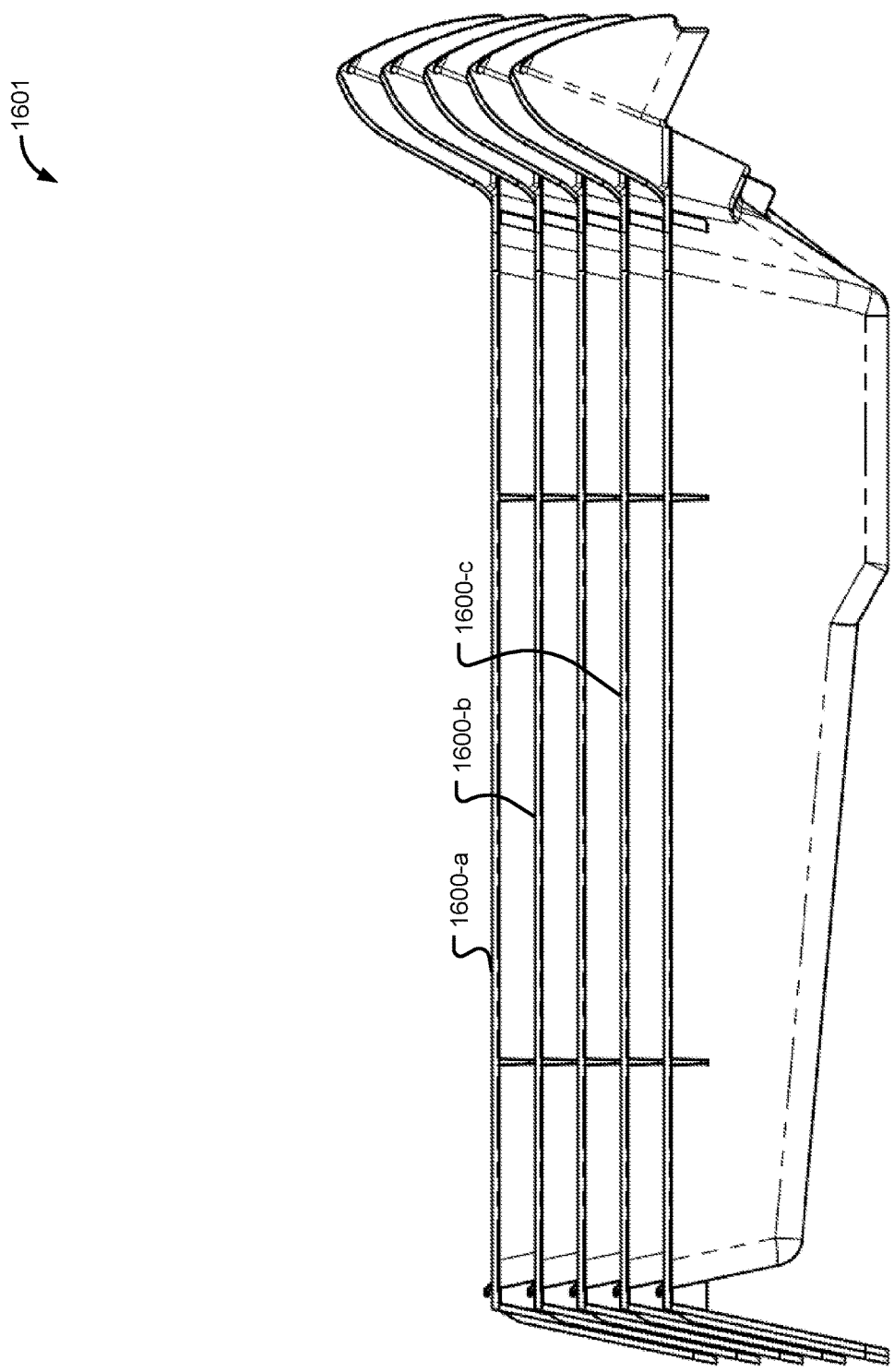
FIG. 16 is a side view of the plurality of paint trays stacked within each other, as shown in FIG. 15, according to an alternate embodiment of the disclosure.

FIG. 15 illustrates a perspective view of a paint tray system 1501 according to an embodiment of the disclosure. In some embodiments, the paint tray system 1501 may comprise one or more paint trays 1500 (e.g., paint tray 1500-*a*, paint tray 1500-*b*, paint tray 1500-*c*, etc.), where the paint trays 1500 may be stacked on top of or within each other. In some circumstances, one or more paint trays 1500 may be stacked within each other during transport or storage, for instance, to conserve physical space. FIG. 16 illustrates a side view of a paint tray system 1601 according to an embodiment of the disclosure. In some cases, paint tray system 1601 may be similar or substantially similar to the paint tray system 1501 in FIG. 15. As shown, paint tray system 1601 may comprise one or more paint trays 1600 (e.g., paint tray 1600-*a*, paint tray 1600-*b*, paint tray 1600-*c*) stacked within each other.

Figure 17:
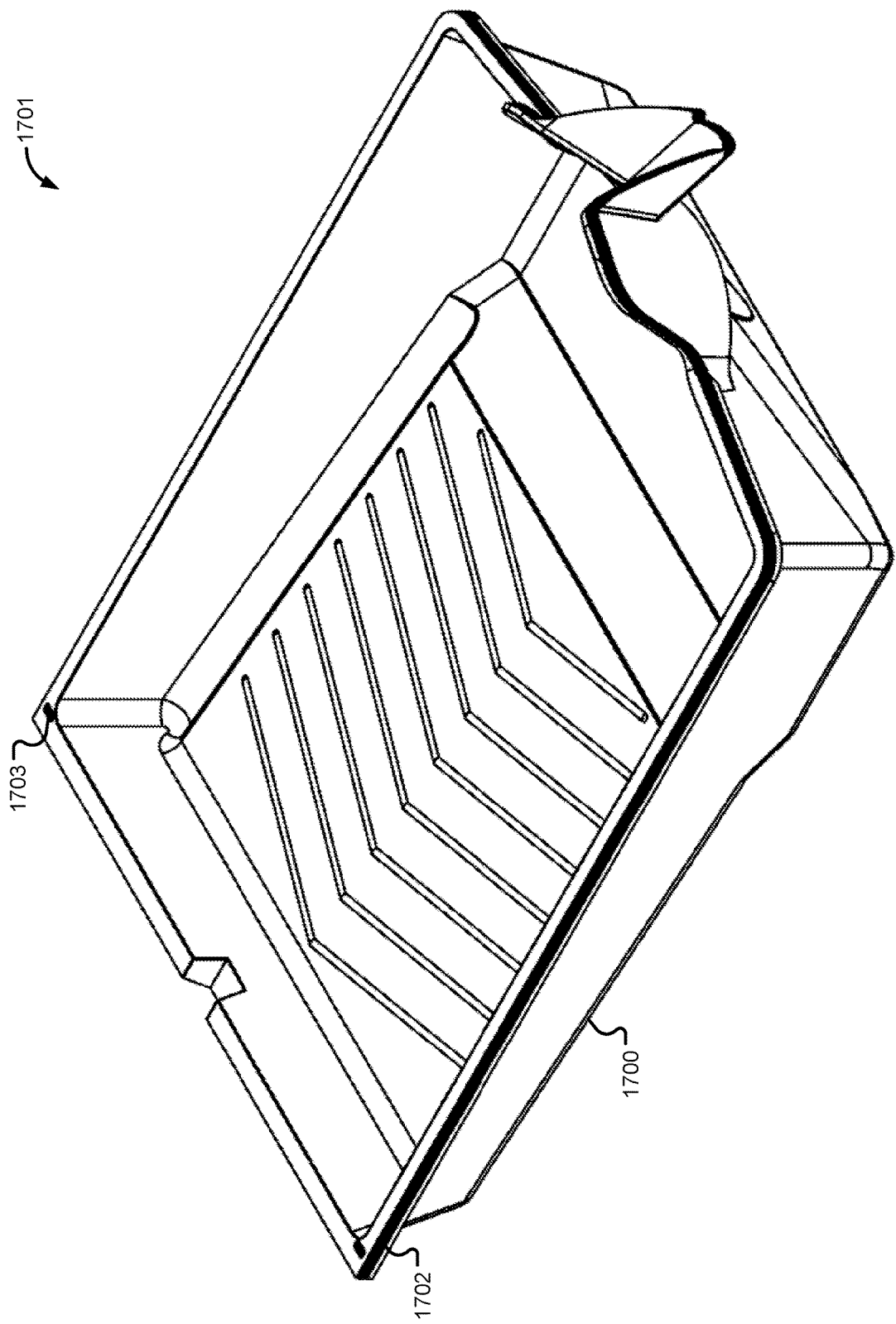
FIG. 17 is a perspective view of a plurality of liners stacked within each other, according to an alternate embodiment of the disclosure.
Figure 18:
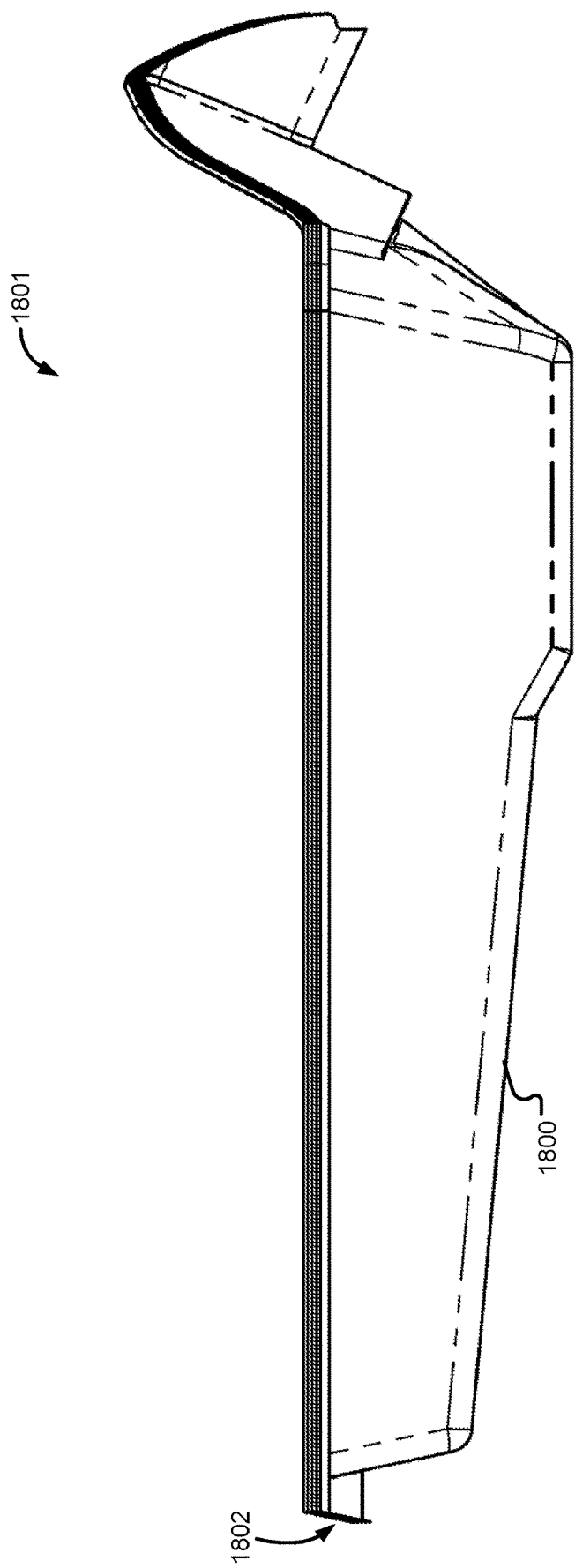
FIG. 18 is a side view of the plurality of liners stacked within each other, as shown in FIG. 17, according to an alternate embodiment of the disclosure.

FIG. 17 illustrates a perspective view of a paint tray system 1701 according to an embodiment of the disclosure. In some embodiments, the paint tray system 1701 may comprise a paint tray 1700, previously described in relation to FIG. 1 or any other figure herein. Further, paint tray 1700 may comprise one or more removeable and/or replaceable liners 1702 installed within it, as previously described in relation to FIG. 6. In some cases, the plurality of liners 1702 may be stacked on top of or within each other prior to placement in the paint tray 1700. In other cases, a first liner 1702 may be installed within the paint tray 1700. Further, one or more additional liners 1702 may be installed on top of the first liner and secured in place by passing hooks 1703 of tray 1700 through the holes in the liner, as described above in relation to FIGS. 5 and 6. In some cases, the liners 1702 may be made of any suitable material, such as plastic. FIG. 18 illustrates a side view of a paint tray system 1801 according to an embodiment of the disclosure. In some cases, paint tray system 1801 may be similar or substantially similar to the paint tray system 1701 in FIG. 17. As shown, paint tray system 1801 may comprise at least one paint tray 1800 and one or more liners 1802 installed within it.

Figure 19:
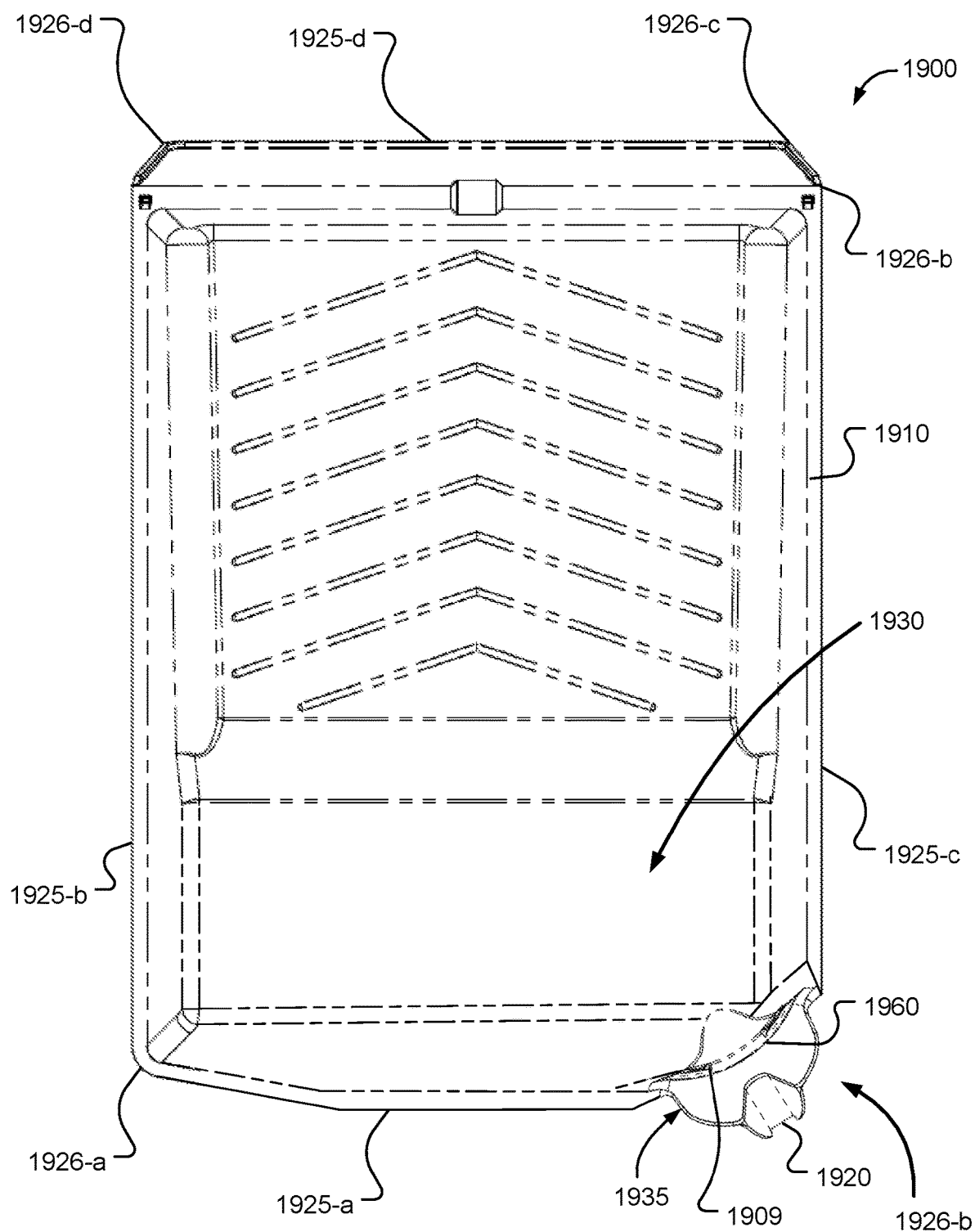
FIG. 19 illustrates a top view of a fluid tray, according to various aspects of the disclosure.

FIG. 19 illustrates a top view of a fluid tray 1900, according to various aspects of the disclosure. The fluid tray 1900 implements one or more aspects of any of the paint trays described herein, including at least paint tray 100 described in relation to FIG. 1. As shown, the fluid tray 1900 includes a plurality of sidewalls 1925 (e.g., sidewall 1925-*a*, sidewall 1925-*b*, sidewall 1925-*c*, sidewall 1925-*d*), a base (e.g., shown as base 145 in FIG. 1), a reservoir 1930 formed by the base and the plurality of sidewalls 1925, a peripheral lip 1910 (also referred to as rim 1910), and a plurality of corners 1926 (e.g., corners 1926-*a*, 1926-*b*, 1926-*c*, 1926-*d*). In some cases, each of the plurality of corners 1926 is formed by an intersection of two adjacent sidewalls of the plurality of sidewalls. For example, corner 1926-*a* is formed by the intersection of sidewalls 1925-*a* and 1925-*b*, while corner 1926-*b* is formed by the intersection of sidewalls 1925-*a* and 1925-*c*. Similarly, corner 1926-*c* is formed by the intersection of adjacent sidewalls 1925-*c* and 1925-*d*, and corner 1926-*d* is formed by the intersection of adjacent sidewalls 1925-*d* and 1925-*b*.

In some embodiments, the fluid tray 1900 further comprises at least one scooped section 1935 (or scooped extension 1935), where the scooped section 1935 is similar or substantially similar to the scooped section 135 described above in relation to FIG. 1. In this example, the scooped section 1935 is positioned on or near one of the corners of the fluid tray, for instance, the corner 1926-*b* formed by the intersection of the two adjacent sidewalls 1925-*a* and 1925-*c*. The scooped section 1935 is one of integrated and coupled to the corner 1926-*b* of the fluid tray, e.g., on or below the rim 1910. Alternatively, the scooped section 1935 is one of integrated and coupled to one of the sidewalls 1925-*a* or 1925-*c*.

In some embodiments, the scooped section 1935 comprises a drainage spout 1920, which may be similar or substantially similar to any of the drainage spouts described herein, including at least in relation to FIGS. 1-18. Furthermore, the scooped section 1935 may comprise at least one tooth 1909, where the at least one tooth 1909 is shaped and sized to engage with a rim or groove of a fluid container. As shown in FIG. 19, the scooped section 1935 may extend horizontally and/or vertically outward from one of the at least one sidewall (e.g., sidewall 1925-*a* and/or sidewall 1925-*c*) or the corner 1926-*b*.

Figure 22:
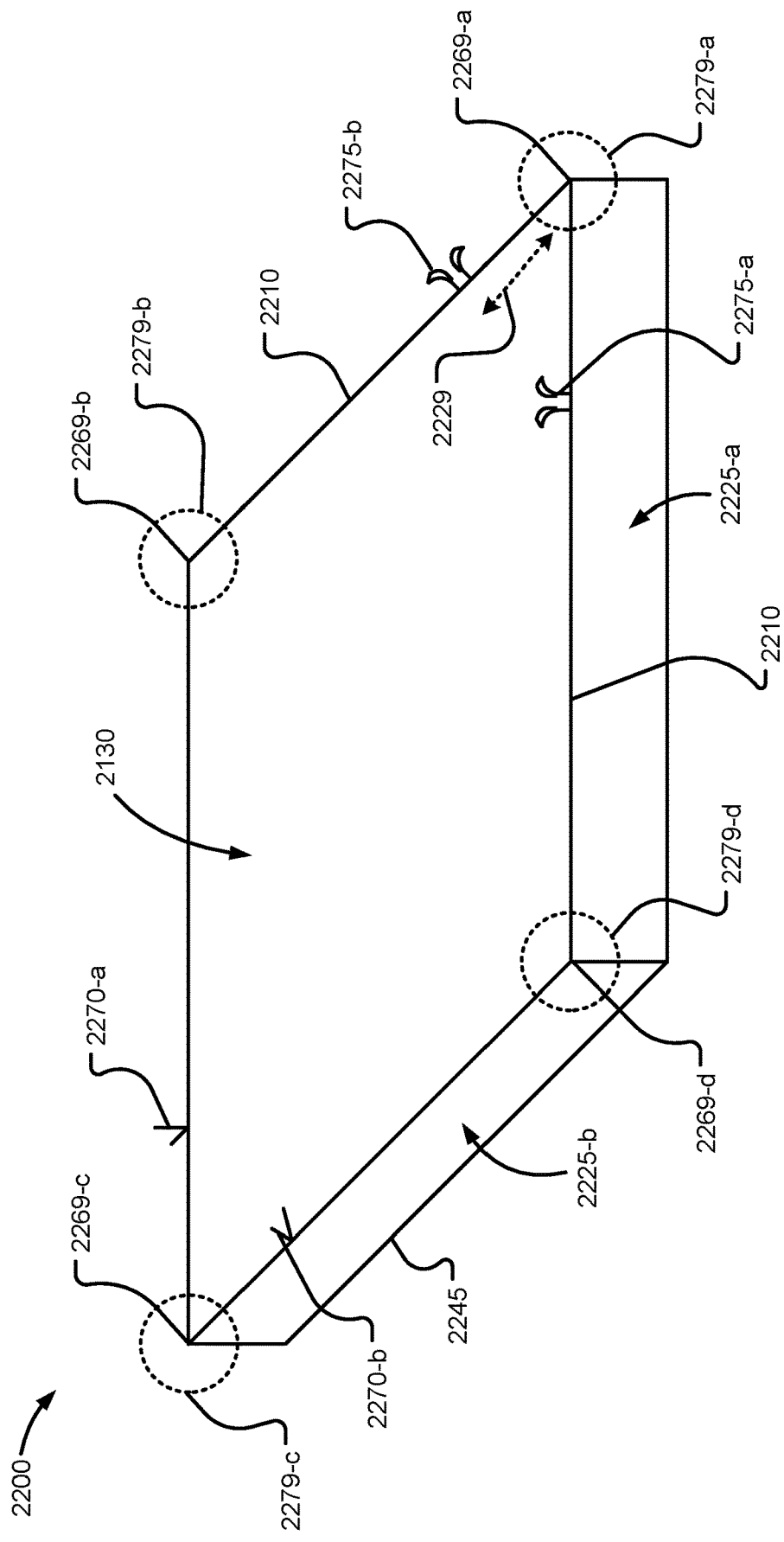
FIG. 22 illustrates a schematic view of a fluid tray, according to various aspects of the disclosure.

In some cases, the fluid tray may comprise a plurality of scooped sections and/or drainage spouts, where the scooped sections and drainage spouts may be integrated and/or coupled to one or more of the corners, the sidewalls, and the rim or peripheral lip. FIG. 22 depicts some examples of locations 2279 where the scooped sections and/or drainage spout may be arranged, in accordance with aspects of the present disclosure. As described above, the scooped section and drainage spout may not only facilitate draining of a fluid (e.g., paint, epoxy or resin, or any other applicable fluid) from a container into the tray, but also allow unused fluids to be transferred back into the container, which can help reduce waste. In some cases, the fluid tray may comprise a plurality of scooped sections and/or drainage spouts that are shaped and sized to interface with containers of varying shapes (e.g., cylindrical, cube or cuboid), varying sizes (e.g., radius, cross-sectional area, height, width, to name a few), and/or features (e.g., with or without a carrying handle/wire handle).

In some embodiments, the fluid tray may also comprise a plurality of container securing mechanisms, such as, but not limited to, notches, hooks, grooves, and/or snap mechanisms (e.g., see snap mechanism 475 in FIG. 4, snap mechanism 2275 in FIG. 22). The container securing mechanism(s) may be positioned on or along at least one sidewall, at least one corner, anywhere along the rim or peripheral lip, or a combination thereof.

Figure 20:
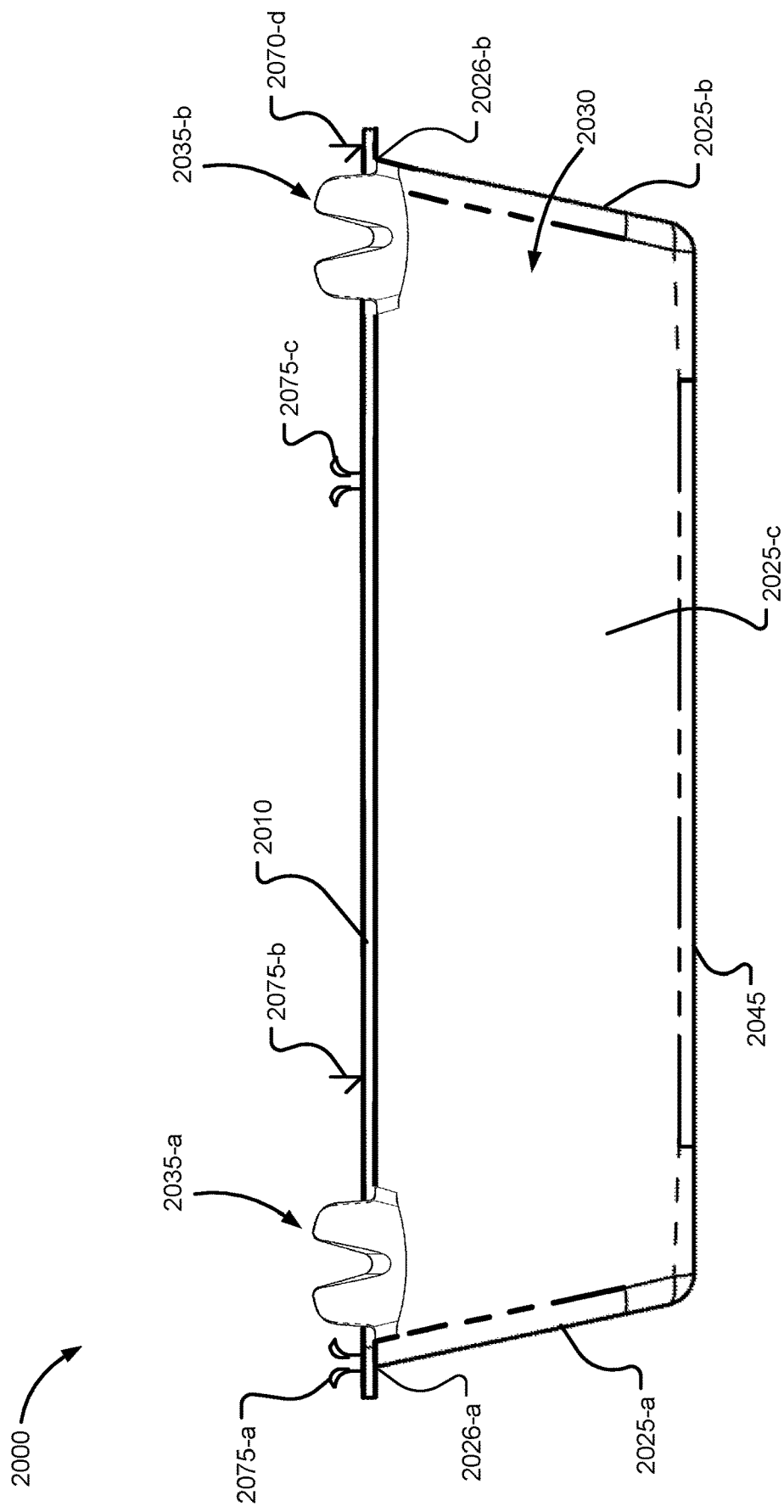
FIG. 20 illustrates a side view of a fluid tray, according to various aspects of the disclosure.

Turning now to FIG. 20, which illustrates a side view of a fluid tray 2000, according to various aspects of the present disclosure. The fluid tray 2000 may be similar or substantially similar to any of the fluid trays (or paint trays) described herein, including at least in relation to FIGS. 1-19. As seen, the fluid tray 2000 comprises a base 2045, a plurality of sidewalls 2025, a rim or peripheral lip 2010 positioned above the plurality of sidewalls 2025, a reservoir 2030, and a plurality of corners 2026 (e.g., corner 2026-*a*, corner 2026-*b*). In this example, the fluid tray 2000 comprises a plurality of scooped sections 2035 (e.g., scooped section 2035-*a*, scooped section 2035-*b*), where each scooped section 2035 is positioned at or near one of the corners 2026 of the rim 2010. For example, a first scooped section 2035-*a* is positioned at or near the first corner 2026-*a*, and a second scooped section 2035-*b* is positioned at or near the second corner 2026-*b*. In some cases, the first corner 2026-*a* is formed by the intersection of the first sidewall 2025-*a* and a third sidewall 2025-*c*. Similarly, the second corner 2026-*b* is formed by the intersection of the second sidewall 2025-*b* and the third sidewall 2025-*c*.

In some embodiments, the fluid tray 2000 further comprises a plurality of container securing mechanisms that are positioned on or along at least one of the sidewalls and/or the rim 2010. For example, the fluid tray 2000 comprises a first container securing mechanism 2075-*a*, a second container securing mechanism 2075-*b*, a third container securing mechanism 2075-*c*, and a fourth container securing mechanism 2075-*d*. In this example, the second and third container securing mechanisms 2075-*b* and 2075-*c*, respectively, may be positioned on the same sidewall (e.g., sidewall 2025-*c*) and/or along the same edge of the rim 2010. Additionally, the first and fourth container securing mechanisms 2075-*a* and 2075-*d*, respectively, may be positioned on opposing/parallel edges of the rim 2010. Furthermore, the first container securing mechanism 2075-*a* and the second container securing mechanism 2075-*b* may be positioned on different sidewalls (or different edges of the rim 2010). Similarly, the third container securing mechanism 2075-*c* and the fourth container securing mechanism 2075-*d* may be positioned on different sidewalls (or different edges of the rim 2010). In some cases, the container securing mechanisms 2075 may implement one or more aspects of the container securing mechanisms described in this disclosure, including at least container securing mechanisms 170, container securing mechanisms 470, and/or snap mechanisms 475.

In some aspects, the fluid tray 2000 comprising the plurality of scooped sections 2035 and container securing mechanisms 2075 allows a user to simultaneously transfer fluid (e.g., paint, epoxy, or other applicable chemicals or fluids) from a plurality of containers into the fluid tray. In some embodiments, the scooped sections 2035-*a* and 2035-*a* may have different dimensions (e.g., a different radius, a different height, to name two non-limiting examples), which allows a user to secure different types of containers to the fluid tray 2000 with minimal to no modifications to the fluid tray. Additionally, or alternatively, the container securing mechanisms 2075-*a* through 2075-*d* may be positioned at different distances from the respective corners 2026-*a* and 2026-*b*, which also allows the fluid tray 2000 to be used with fluid containers having different dimensions. In some cases, one or more of the container securing mechanisms 2075-*a* through 2075-*d* may be adjustable by the user (e.g., moved closer or further away from the scooped sections 2035-*a* or 2035-*b*, moved closer or further away from the corners 2026-*a* or 2026-*b*), which also allows the fluid tray 2000 to be used with fluid containers having different dimensions. In yet other cases, one or more of the scooped sections 2035 may be removable and replaceable by another scooped section having different dimensions, different features (e.g., different type of drainage spout), etc. In this way, the fluid tray 2000 can be dynamically modified by the user depending on the task (e.g., transferring fluid into the fluid tray, transferring fluid from the fluid tray into a container, to name two non-limiting examples) and/or type of container(s) being used.

In some embodiments, the disclosed fluid tray is configured to be used with different types of containers, including those without a carrying or wire handle.

Figure 21:
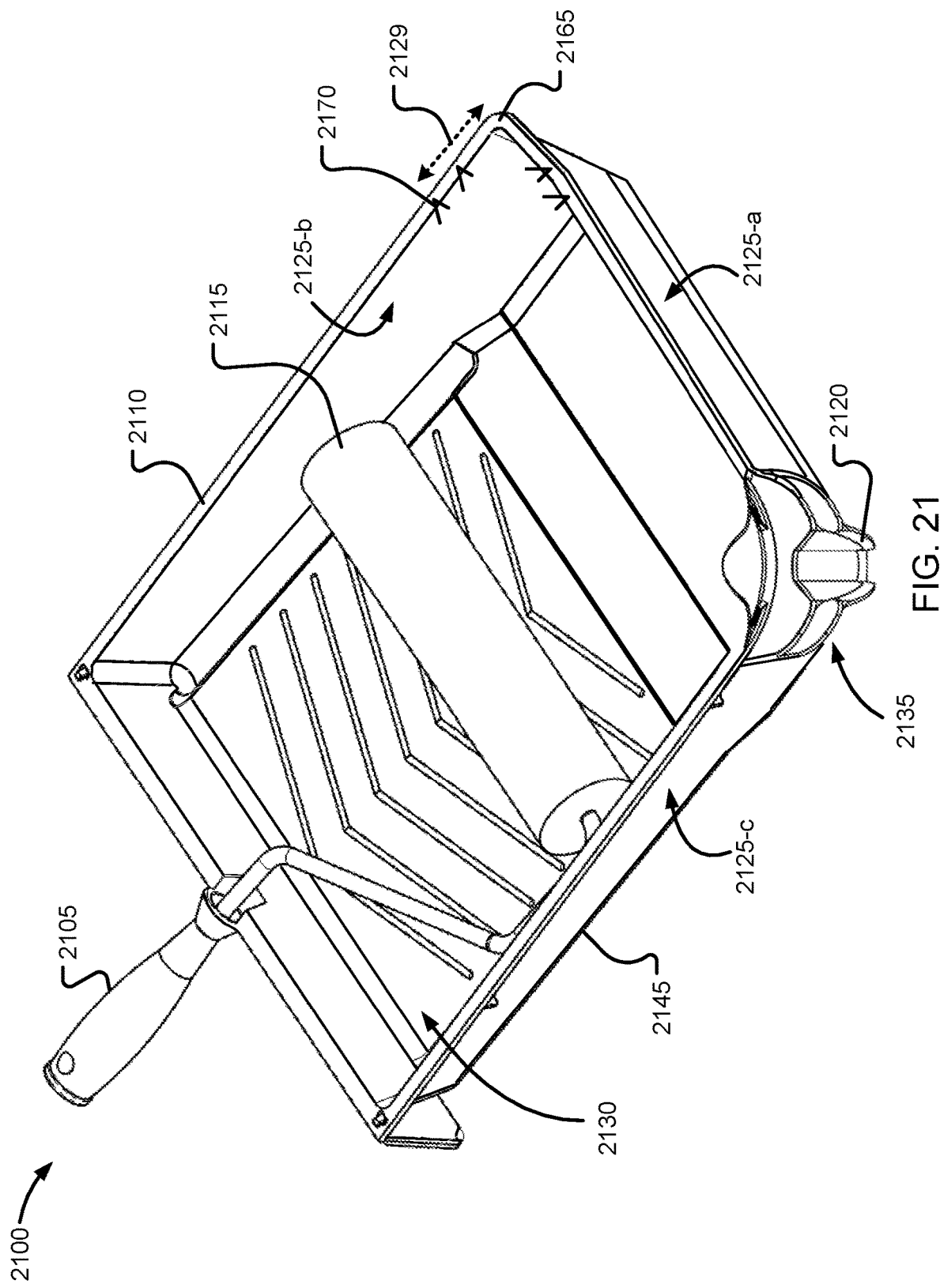
FIG. 21 illustrates a top perspective view of a fluid tray, according to various aspects of the disclosure.

FIG. 21 illustrates a top perspective view of a fluid tray 2100, according to various aspects of the present disclosure. The fluid tray 2100 implements one or more aspects of the fluid trays described herein, including at least fluid tray 1900 and/or 2000. As shown, the fluid tray 2100 includes one or more sidewalls 2125 (e.g., sidewall 2125-*a*, sidewall 2125-*b*, sidewall 2125-*c*), a base 2145, a reservoir 2130, a roller 2105, a scooped section 2135, a drainage spout 2120, and a peripheral lip 2110. In some examples, the reservoir 2130 may be formed by the base 2145 and the one or more sidewalls 2125, where the one or more sidewalls 2125 extend in an upward direction from the base 2145. The one or more sidewalls may extend away from at least a portion of the base 145 at around (within at least 2-3 degrees of, within at least 10 degrees of) a 90-degree angle. In some cases, the paint tray 2100 may comprise a plurality of container securing mechanisms 2170 which may be one of integrated and coupled to at least one sidewall of the one or more sidewalls 2125, the peripheral lip or rim 2110, and/or at or near at least one of the corners 2165, to name a few non-limiting examples. The container securing mechanisms 2170 may be similar or substantially similar to any of the container securing mechanisms described herein, such as, but not limited to, container securing mechanism 170. In some embodiments, a distance 2129 between one or more of the container securing mechanisms 2170 and the corner 2165 may be adjustable by a user, which allows the fluid tray 2100 to be used with containers having different volumes, different features (e.g., with or without a wire handle), etc.

As seen, in some embodiments, the scooped section 2135 and drainage spout 2120 can be integrated and/or coupled to one of the corners 2165, i.e., in addition to or in lieu of the configuration shown in FIG. 1, where the scooped section 135 is integrated to one of the sidewalls 125. It should be noted that the fluid tray can comprise one or more other scooped sections and drainage spouts, e.g., as shown in FIG. 20, which allows multiple containers to be drained into the fluid tray. As an example, a user may position two containers in an inverted pouring position over the fluid tray by supporting each container over the fluid tray 2100 using one of the plurality of scooped sections 2135 and/or drainage spouts 2120. In such cases, the user can drain fluid from a first container followed by the second container. Alternatively, the user can simultaneously drain fluid from the first and the second containers into the fluid tray 2100. In some embodiments, the reservoir 2130 and/or fluid tray 2100 may be shaped and sized to allow the roller 2115 (e.g., paint roller, or another applicable tool, such as a brush, a tool for stirring/mixing the fluids, etc.) access to the reservoir 2130 when multiple containers are draining into the fluid tray 2100.

FIG. 22 illustrates a schematic view of a fluid tray 2200, according to various aspects of the present disclosure. The fluid tray 2200 implements one or more aspects of the fluid trays described herein, including at least fluid trays 100, 200, 400, 1900, 2000, and/or 2100. As seen, the fluid tray 2200 includes a plurality of sidewalls 2225 (e.g., sidewall 2225-*a*, sidewall 2225-*b*), a base 2245, a reservoir 2230, and a peripheral lip 2110. In some examples, the reservoir 2130 may be formed by the base 2245 and the plurality of sidewalls 2225, where each of the plurality of sidewalls 2225 extend in an upward direction from the base 2245. The one or more sidewalls may extend away from at least a portion of the base 2245 at around (e.g., within at least 2-3 degrees of, within at least 10 degrees of, to name two non-limiting examples) a 90-degree angle. As shown, two adjacent sidewalls of the plurality of sidewalls 2225 may intersect at a corner 2269. For example, a first sidewall 2225-*a* and another sidewall (not visible from this angle) intersect at a corner 2269-*a*. Furthermore, the first sidewall 2225-*a* and the second sidewall 2225-*b* intersect at a corner 2269-*d*. The fluid tray additionally includes corners 2269-*c* and 2269-*b* that are formed by the intersection of other sidewalls of the fluid tray 2200.

FIG. 22 also depicts potential locations 2279 (e.g., location 2279-*a*, location 2279-*b*, location 2279-*c*, and/or location 2279-*d*) for the scooped sections (e.g., scooped section 135 in FIG. 1, scooped section 235 in FIG. 2, scooped section 1935 in FIG. 19, etc.) drainage spouts (e.g., drainage spout 120, drainage spout 220, drainage spout 1920, etc.), and/or container securing mechanisms (e.g., container securing mechanism 170, snap mechanism 475, snap mechanism 2075, container securing mechanisms 2070, 2170, etc.) in accordance with various aspects of the present disclosure. In this way, aspects of the present disclosure may allow one or more of (1) draining fluids from multiple containers connected or secured to multiple corners 2269 of the fluid tray, (2) draining fluids from containers coupled to any of the corners 2269 of the fluid tray 2200, (3) coupling containers having different dimensions (e.g., volume, radius, etc.), storing fluids having different viscosities, etc., to different scooped sections or drainage spouts positioned at different corners or sidewalls, or (4) a combination thereof.

In one non-limiting example, the fluid tray 2200 may comprise a first scooped section at location 2279-a that is shaped and sized to receive containers within a first size range (e.g., a radius between 10-20 inches), a second scooped section at location 2279-b that is shaped and sized to receive containers within a second size range (e.g., radius between 5-10 inches), a third scooped section at location 2279-c that is shaped and sized to receive containers within a third size range (e.g., radius between 5-10 inches), and/or a fourth scooped section at location 2279-d that is shaped and sized to receive containers within a fourth size range (e.g., radius between 10-20 inches). In this example, the fluid tray 2200 comprises snap mechanisms 2275-a, 2275-b that are positioned adjacent the corner 2269-a, and container securing mechanisms 2270-a, 2270-b that are positioned adjacent the corner 2269-c. The snap mechanisms 2275-a and 2275-b may be similar or substantially similar to the snap mechanisms 475 described in relation to FIG. 4. Furthermore, the container securing mechanisms 2270-a and 2270-b may be similar or substantially similar to the container securing mechanisms 170 and/or 470 described in relation to FIGS. 1 and/or 4, respectively. In this way, the fluid tray 2200 is adapted to support containers of different sizes, including those without wire handles, further described below.

As an example, a first container without wire handles can be positioned in an inverted pouring position over the fluid tray by coupling the first container with the fluid tray 2200 at or near the first location 2279-a. In this case, the first container can be secured to the fluid tray 2200 using the one or more snap mechanisms 2275, e.g., the first container can be positioned such that its rim or groove is secured between the snap mechanisms 2275 (e.g., snap mechanisms 2275-a and 2275-b) and the rim 2210. Furthermore, an outer surface of the first container can be flush or substantially flush against the scooped section and/or drainage spout at the corner 2269-a such that the first container is at an angle sufficient to permit flow of a fluid (e.g., paint, epoxy, or another applicable chemical, fluid, solvent, etc.) from the container into the reservoir 2200. In some cases, a second container with wire handles can be positioned in an inverted pouring position over the fluid tray 2200 by coupling the second container with the fluid tray 2200 at or near the second location 2279-b. In this case, the second location 2279-b may comprise a scooped section and/or drainage spout that is similar to the scooped section 835 and/or drainage spout 820, respectively, described in relation to FIG. 8. As previously described, the drainage spout 820 comprises one or more notches (e.g., notches 806) that are adapted to engage with a wire handle (e.g., wire handle 808) of the fluid container. In such cases, the wire handle of the second container can be pressed down on to the notches or a portion of the drainage spout (i.e., at corner 2269-b) to force the handle along an outer surface and/or edge of the drainage spout and into the notches, thereby snapping or locking the handle in place within the one or more notches of the drainage spout.

In some cases, the fluid tray 2200 may also comprise the plurality of snap mechanisms 2275 which may be one of integrated and coupled to at least one sidewall of the one or more sidewalls 2225, the peripheral lip or rim 2210, and/or at or near at least one of the corners 2269, to name a few non-limiting examples. The snap mechanisms 2270 may be similar or substantially similar to any of the snap mechanisms and/or container securing mechanisms described herein, such as, but not limited to, snap mechanisms 475, container securing mechanisms 470, and/or container securing mechanism 170. In some embodiments, a distance 2229 between one or more of the snap mechanisms 2270 and the corner 2269 (e.g., corner 2269-a) may be adjustable by a user, which also allows the fluid tray 2200 to be used with containers having different volumes, different features (e.g., with or without a wire handle), etc. In some examples, the distance between the container securing mechanisms 2270 and the corner 2269-c may also be adjustable to facilitate use of the fluid tray 2200 with different types of fluid carrying containers.

Figure 23A:
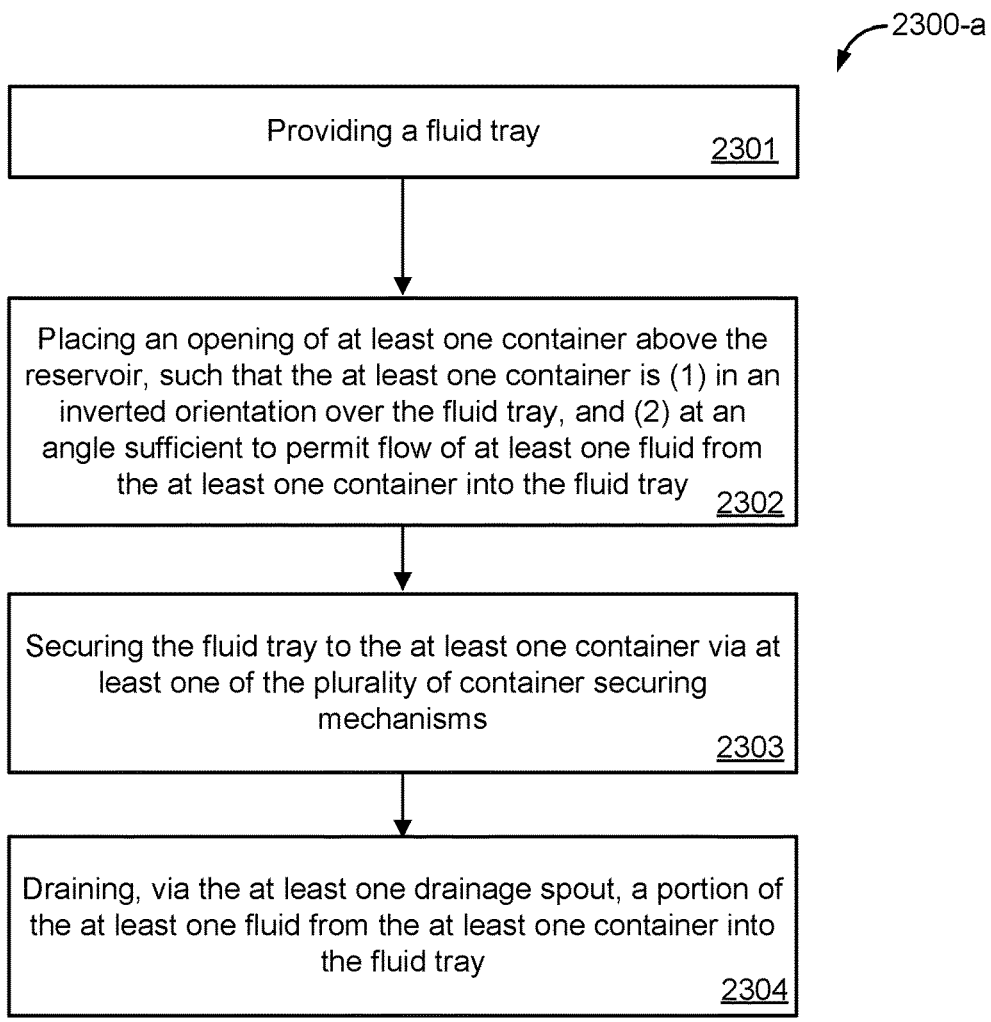
FIG. 23A illustrates an example of a method for draining a container into a fluid tray, according to various aspects of the disclosure.

FIG. 23A illustrates an example of a method 2300-a for draining a container into a fluid tray, according to various aspects of the disclosure.

A first operation 2301 comprises providing a fluid tray (e.g., fluid tray 1900 in FIG. 19), the fluid tray comprising a base, a plurality of sidewalls, a rim, a reservoir, a plurality of container securing mechanisms, and at least one drainage spout. In some cases, each sidewall of the plurality of sidewalls is arranged between an edge of the base and a rim (or peripheral lip) of the fluid tray. Furthermore, each sidewall may extend in an upward direction from the base. In some embodiments, the rim comprises a plurality of corners, each corner comprising an intersection of two adjacent sidewalls of the plurality of sidewalls. In some embodiments, the reservoir is defined by the base and the plurality of sidewalls. In some embodiments, each container securing mechanism of the plurality of container securing mechanisms is one of integrated and coupled to one of the rim, a corner, or at least one sidewall of the plurality of sidewalls.

A second operation 2302 comprises placing an opening of at least one container above the reservoir, such that the at least one container is (1) in an inverted orientation over the fluid tray, and (2) at an angle sufficient to permit flow of at least one fluid from the at least one container into the fluid tray.

A third operation 2303 comprises securing the fluid tray to the at least one container via at least one of the plurality of container securing mechanisms.

A fourth operation comprises draining, via the at least one drainage spout, a portion of the at least one fluid from the at least one container into the fluid tray (e.g., into the reservoir of the fluid tray).

Figure 23B:
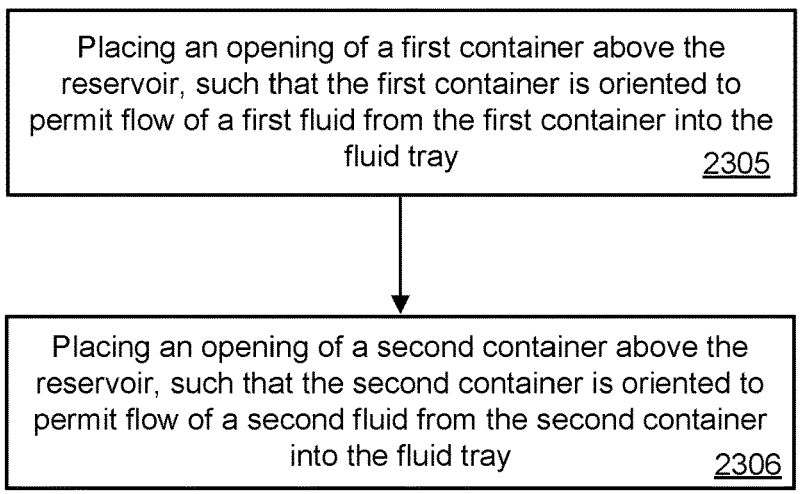
FIG. 23B illustrates an example of a method for draining a plurality of containers into a fluid tray, according to various aspects of the disclosure.

FIG. 23B illustrates an example of a method 2300-b for draining a plurality of containers into a fluid tray, according to various aspects of the disclosure. In some embodiments, the at least one drainage spout described above (e.g., in relation to method 2300-a) further comprises a plurality of drainage spouts, which allows a plurality of containers to be drained into the fluid tray.

A first operation 2305 of method 2300-b comprises placing an opening of a first container above the reservoir, such that the first container is oriented to permit flow of a first fluid from the first container into the fluid tray.

A second operation 2306 of method 2300-b comprises placing an opening of a second container above the reservoir, such that the second container is oriented to permit flow of a second fluid from the second container into the fluid tray.

In some embodiments, the first container and the second container are secured to the fluid tray using different container securing mechanisms of the plurality of container securing mechanisms. Additionally, or alternatively, the first container and the second container are drained via different drainage spouts of the plurality of drainage spouts.

Figure 24:
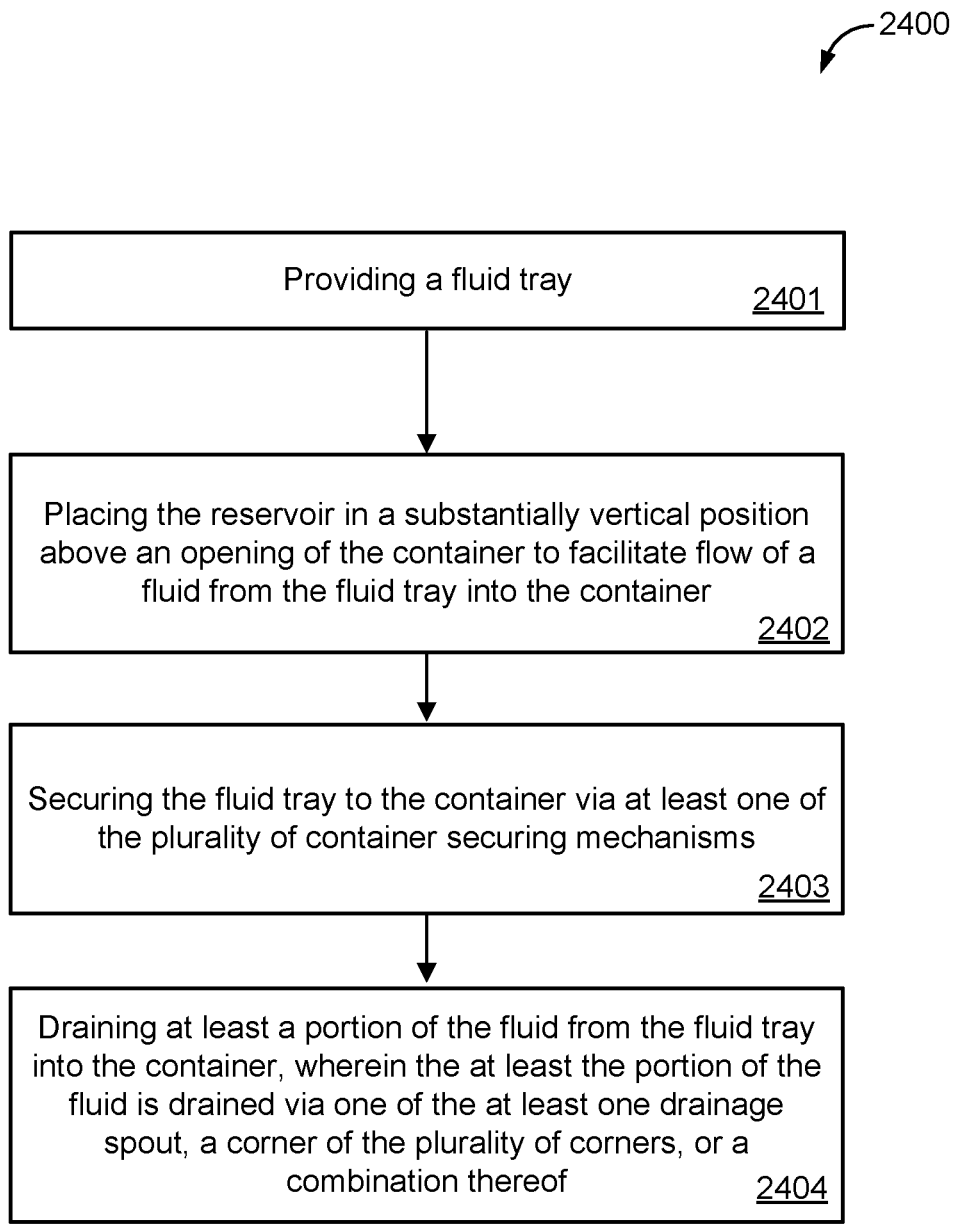
FIG. 24 illustrates an example of a method for draining a fluid from a fluid tray into a container, according to various aspects of the disclosure.

FIG. 24 illustrates an example of a method 2400 for draining a fluid from a fluid tray into a container, according to various aspects of the disclosure.

A first operation 2401 comprises providing a fluid tray (e.g., fluid tray 1900 in FIG. 19), the fluid tray comprising a base, a plurality of sidewalls, a rim, a reservoir, a plurality of container securing mechanisms, and at least one drainage spout. In some cases, each sidewall of the plurality of sidewalls is arranged between an edge of the base and a rim (or peripheral lip) of the fluid tray. Furthermore, each sidewall may extend in an upward direction from the base. In some embodiments, the rim comprises a plurality of corners, each corner comprising an intersection of two adjacent sidewalls of the plurality of sidewalls. In some embodiments, the reservoir is defined by the base and the plurality of sidewalls. In some embodiments, each container securing mechanism of the plurality of container securing mechanisms is one of integrated and coupled to one of the rim, a corner, or at least one sidewall of the plurality of sidewalls.

A second operation 2402 comprises placing the reservoir in a substantially vertical position above an opening of the container to facilitate flow of a fluid from the fluid tray into the container.

A third operation 2403 comprises securing the fluid tray to the container via at least one of the plurality of container securing mechanisms.

A fourth operation 2404 comprises draining at least a portion of the fluid from the fluid tray into the container, wherein the at least the portion of the fluid is drained via one of the at least one drainage spout, a corner of the plurality of corners, or a combination thereof.

In some embodiments, the drainage spout may be positioned at one of the corners, which may aid in draining the fluid (e.g., paint, epoxy, resin, etc.) back into the fluid container. Furthermore, the drainage spout may be shaped and sized to enable the fluid tray to be supported over the can, for instance, by allowing the fluid tray to balance using one of its corners over the opening of the fluid container. In some cases, the length/height of the drainage spout may be selected such that the fluid tray does not dip as deeply into the fluid container. In this way, the present design helps prevent the drainage spout and/or other portions of the fluid tray to dip (or come into contact) with the fluid already present in the fluid container.

Figure 25A:
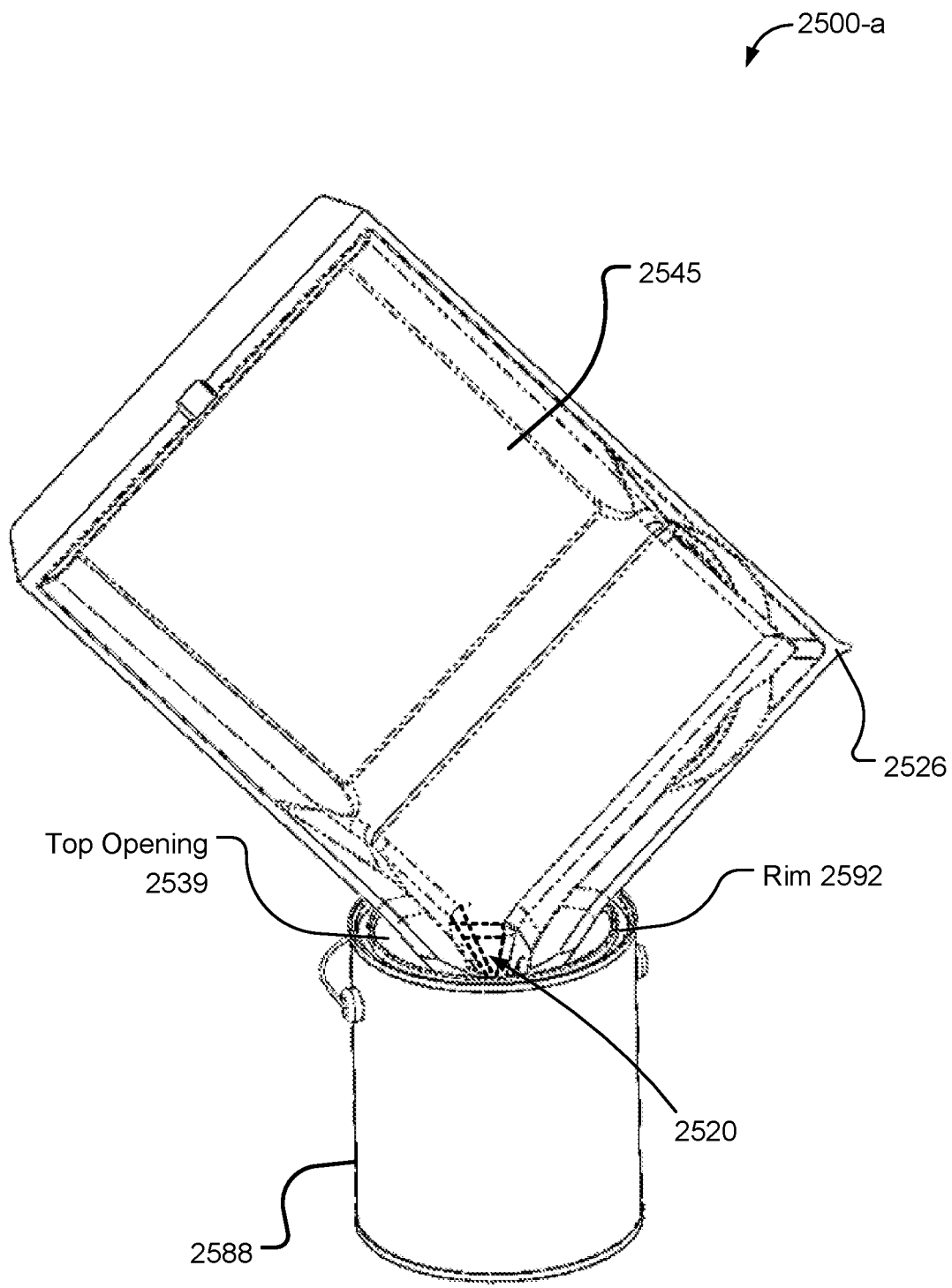
FIG. 25A illustrates a front perspective view of a fluid tray balancing on a fluid container for draining excess fluid into the container, according to various aspects of the present disclosure.

FIG. 25A illustrates a front perspective view of a fluid tray 2500-a balancing on a fluid container 2588 for draining excess fluid into the container, according to various aspects of the present disclosure. The fluid tray 2500-a may be similar or substantially similar to any of the fluid tray(s) described herein, including at least in relation to FIGS. 19-22. As seen, the fluid tray 2500-a comprises a base 2545, a plurality of corners 2526, and a drainage spout 2520, where the drainage spout 2520 is one of integrated and coupled to one of the corner(s) 2526. In this example, at least a portion of the drainage spout 2520 extends into a top opening 2539 of the fluid container 2588 and engages with an underside of the rim 2592 or groove of the fluid container 2588. In some examples, the fluid container 2588 comprises a rim or groove 2592 positioned at the top opening 2539 of the container, where the rim or groove is configured to receive a cover or lid, such as lid 3100 in FIG. 31, of the container. In some examples, the reservoir of the fluid tray 2500-a is placed in a substantially vertical position above the opening 2539 of the container 2588 to facilitate flow of fluid from the fluid tray 2500-a into the container 2588. In some cases, the fluid tray 2500-a may be secured to the container 2588 via at least one of the plurality of container securing mechanisms. Additionally, or alternatively, the fluid tray 2500-a may be secured to the container 2588 via engagement of the drainage spout 2520 with the rim 2592 of the container. In some cases, the drainage spout 2520 may comprise one or more snap mechanisms, or other container securing mechanisms that allow the fluid tray to be secured/coupled at an angle over the top opening 2539 of the container. In some examples, such a design allows at least a portion of the fluid from the fluid tray 2500-a to be drained into the container 2588, where the at least the portion of the fluid is drained via one of the at least one drainage spout 2520, a corner 2526 of the plurality of corners, or a combination thereof.

Figure 25B:
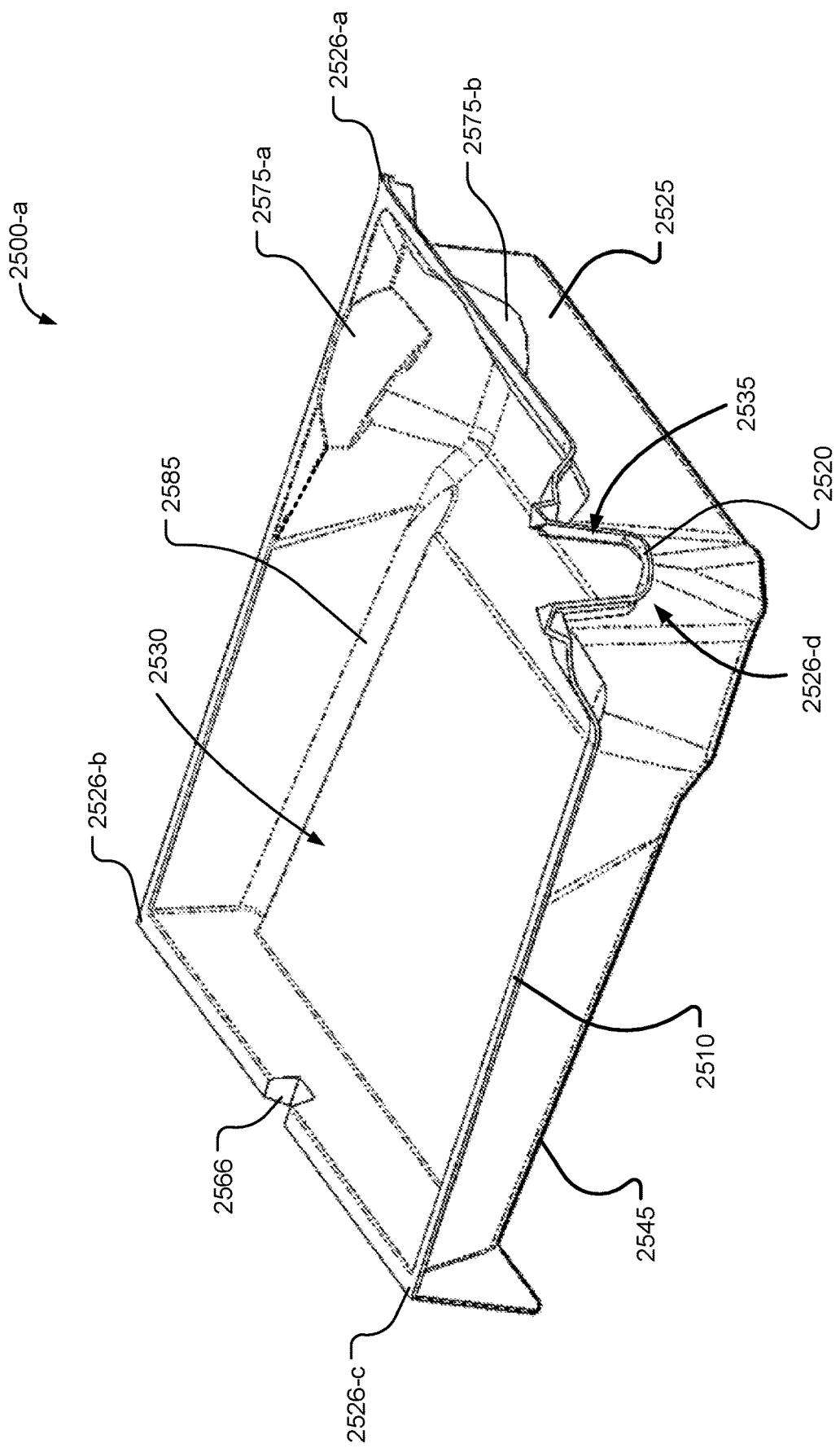
FIG. 25B illustrates a perspective view of the fluid tray in FIG. 25A, according to various aspects of the disclosure.

FIG. 25B illustrates a perspective view of the fluid tray 2500-a in FIG. 25A, according to various aspects of the disclosure. The fluid tray 2500-a comprises a base 2545, a plurality of sidewalls 2525, a scooped section 2535 (or scooped extension 2535), a plurality of corners 2526 (e.g., corners 2526-a, 2526-b, 2526-c, 2526-d), a reservoir 2530, one or more channels 2585 formed in the reservoir 2530, a drainage spout 2520 (e.g., formed at corner 2525-d), and a plurality of recesses 2575 (e.g., recess 2575-a, recess 2575-b). In this example, each of the plurality of recesses 2575 is formed on an adjacent sidewall 2525 of the plurality of sidewalls. For example, the corner 2526-a is formed by an intersection of two adjacent sidewalls 2525 of the plurality of sidewalls, and each of the plurality of recesses 2575 is formed in one of these two adjacent sidewalls. In some cases, the plurality of recesses 2575 are shaped and sized to enable a fluid container to be supported over the reservoir 2530 of the fluid tray 2500-a, for instance, to drain a fluid from the container into the tray.

The fluid tray 250-a further comprises one or more notches arranged on or near the rim 2510 or one of the sidewalls 2525. In this example, a notch 2566 is formed between two adjacent corners 2526-b and 2526-c of the fluid tray 2500-a, as shown in FIG. 25B. However, other locations for the notch 2566 are contemplated in different embodiments, and the illustration in FIG. 25B is not intended to limit the scope or spirit of this disclosure.

Figure 25C:
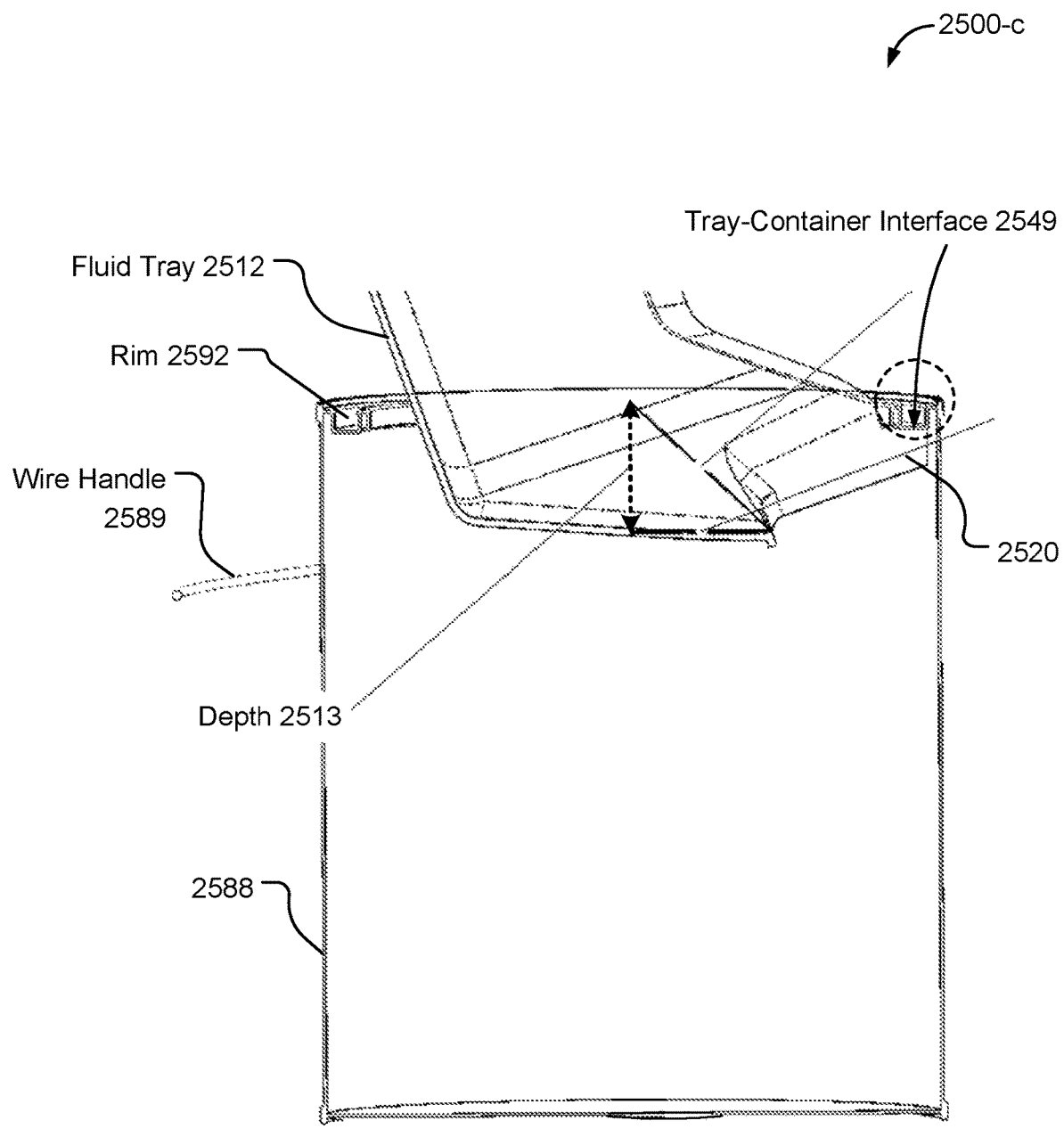
FIG. 25C illustrates a cross-sectional view of a fluid tray balancing on a fluid container for draining excess fluid into the container, according to various aspects of the present disclosure.

FIG. 25C illustrates a cross-sectional view 2500-c of a fluid tray 2512 balancing on a fluid container 2588 for draining excess fluid into the container, according to various aspects of the present disclosure. The fluid tray 2512 may be similar or substantially similar to any of the fluid trays described herein, including at least fluid tray 2500-a. As seen, the container 2588 comprises a rim 2592 and a wire handle 2589 (optional). Furthermore, at least a portion of the fluid tray 2512, for instance, the drainage spout 2520 extends into the top opening (shown as top opening 2539 in FIG. 25A) of the container 2588 and engages with the rim or groove 2592 of the container. This allows the fluid tray 2512 to balance at an angle (e.g., anywhere between 45-90 degrees) or in a substantially vertical position (e.g., within 5-10 degrees of 90 degrees) above the opening of the container to facilitate flow of a fluid from the reservoir (e.g., reservoir 2530) of the fluid tray into the container 2588. FIG. 25C also depicts the engagement of the fluid tray 2512 and the container 2588 as tray-container interface 2549.

As noted above, the scooped section (e.g., scooped section 2535) and/or the drainage spout 2520 is shaped and sized to minimize how deep into the container the fluid tray extends (while draining fluid back into the container), while also ensuring the fluid tray is securely balanced over the top opening of the container. FIG. 25C depicts this depth 2513 corresponding to how deep the fluid tray 2500-c extends into the container 2588 while it is balanced over container 2588. In some examples, this depth 2513 may be less than 1.5 inches, for instance, anywhere between 1 and 1.4 inches. In one non-limiting example, the depth 2513 may be around 1.38 inches. It should be noted that the example values of the depth 2513 listed herein are not intended to be limiting, and different values are contemplated in different embodiments.

Figure 26:
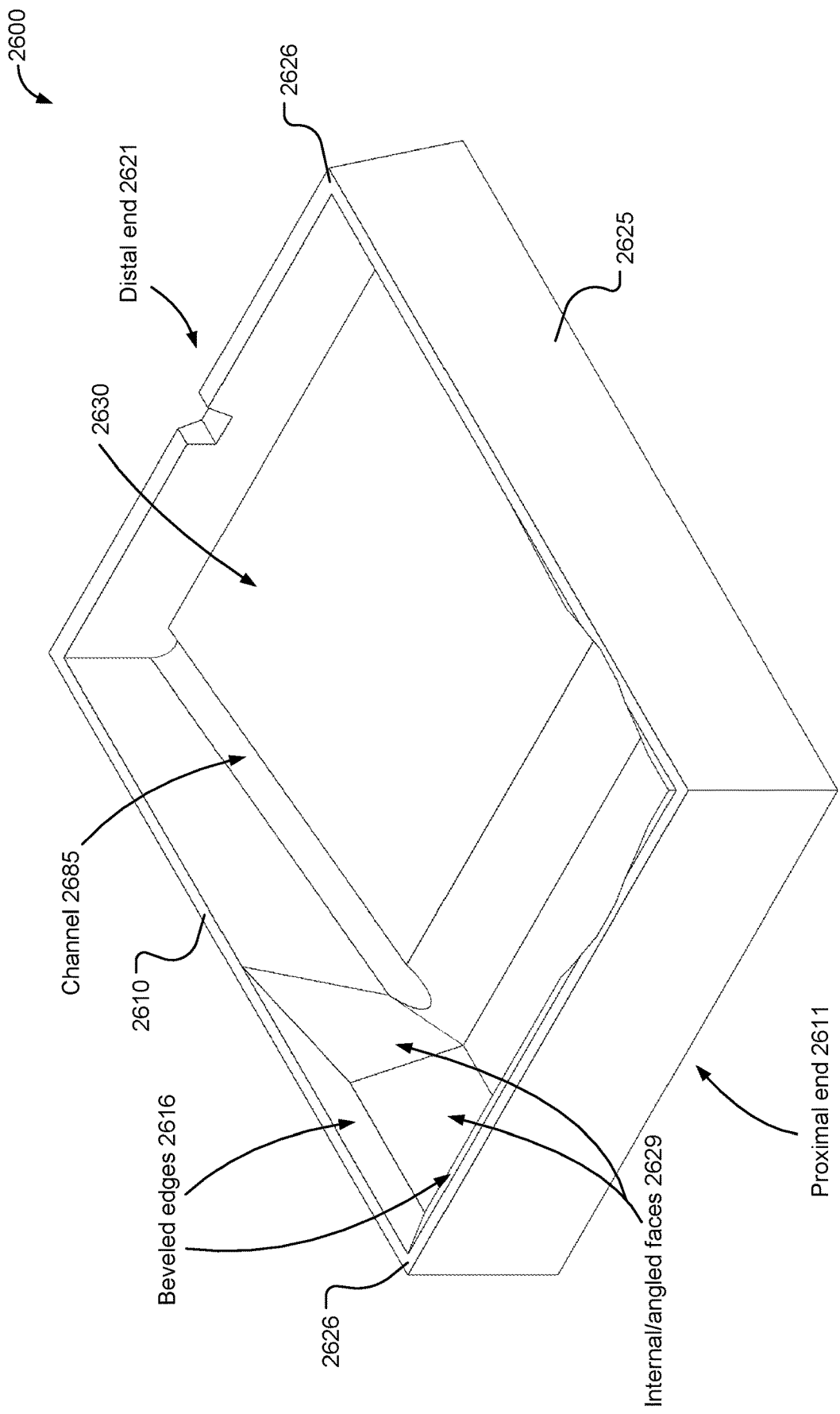
FIG. 26 illustrates another example of a fluid tray, according to various aspects of the disclosure.

FIG. 26 illustrates another example of a fluid tray 2600, according to various aspects of the disclosure. The fluid tray 2600 implements one or more aspects of the fluid trays described herein, including at least in relation to FIGS. 1-25. As seen, the fluid tray 2600 comprises a plurality of corners 2626 and a plurality of sidewalls 2625. The fluid tray 2600 also includes one or more channels 2685 in the reservoir 2630, where the channels 2685 slope down from the distal end 2621 to the proximal end 2611 of the fluid tray 2600. In some embodiments, the fluid tray 2600 also comprises a plurality of beveled edges 2616, for instance, arranged between the rim 2610 and internal/angled faces 2629 of one or more of the plurality of sidewalls 2625.

Figure 27:
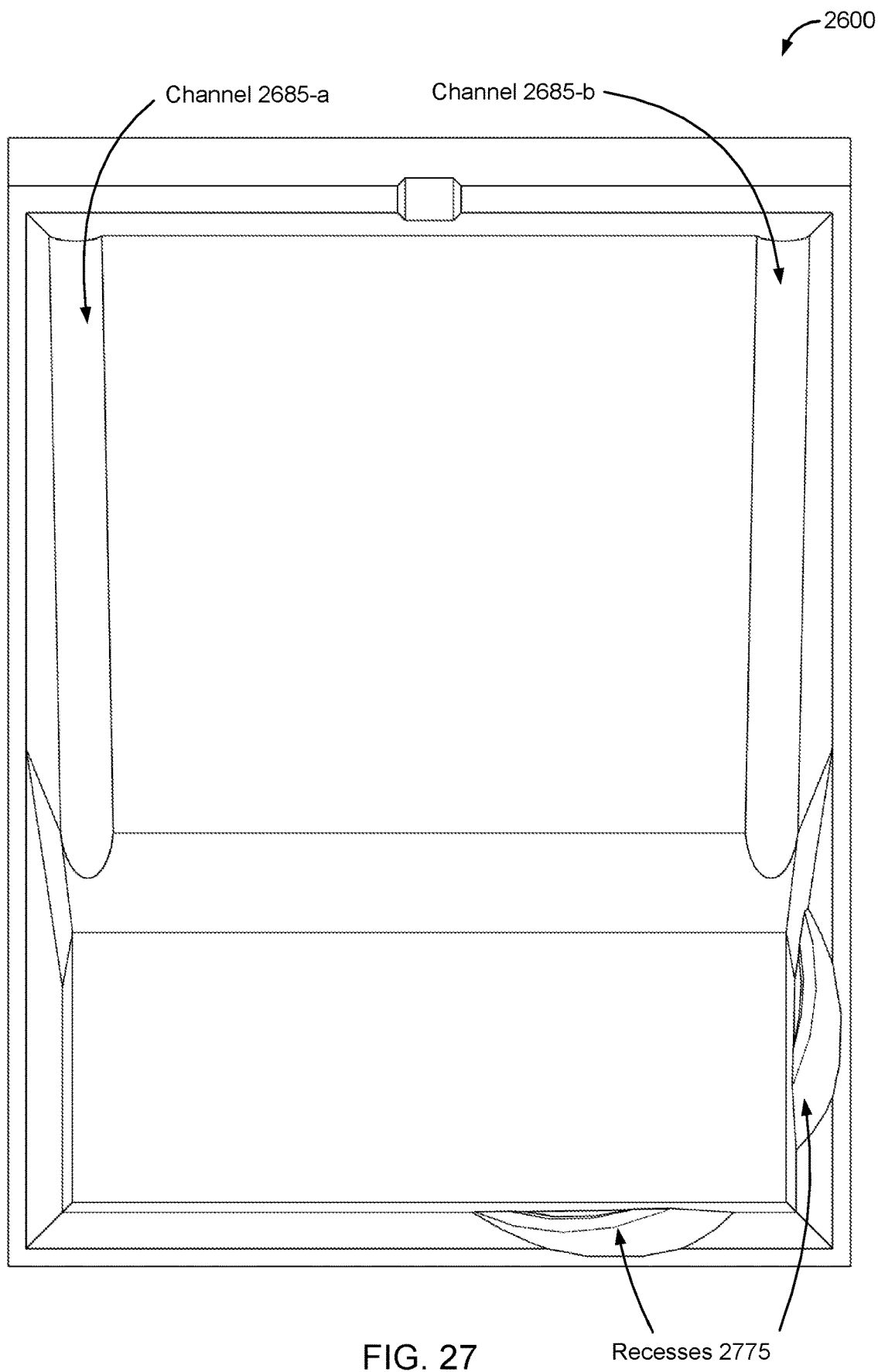
FIG. 27 illustrates a top view of the fluid tray in FIG. 26, according to various aspects of the disclosure.

FIG. 27 illustrates a top view of the fluid tray 2600 in FIG. 26, according to various aspects of the disclosure. As seen, the fluid tray 2600 comprises a plurality of channels 2685 (e.g., channel 2685-a, channel 2685-b) and a plurality of recesses 2775 (also shown as recesses 2575-a and 2575-b in FIG. 25B), where the recesses 2775 are adapted to support a fluid container (e.g., a paint can or container) over the reservoir of the fluid tray 2600 to facilitate flow of a fluid (e.g., paint) from the container into the fluid tray 2600.

Figure 28:
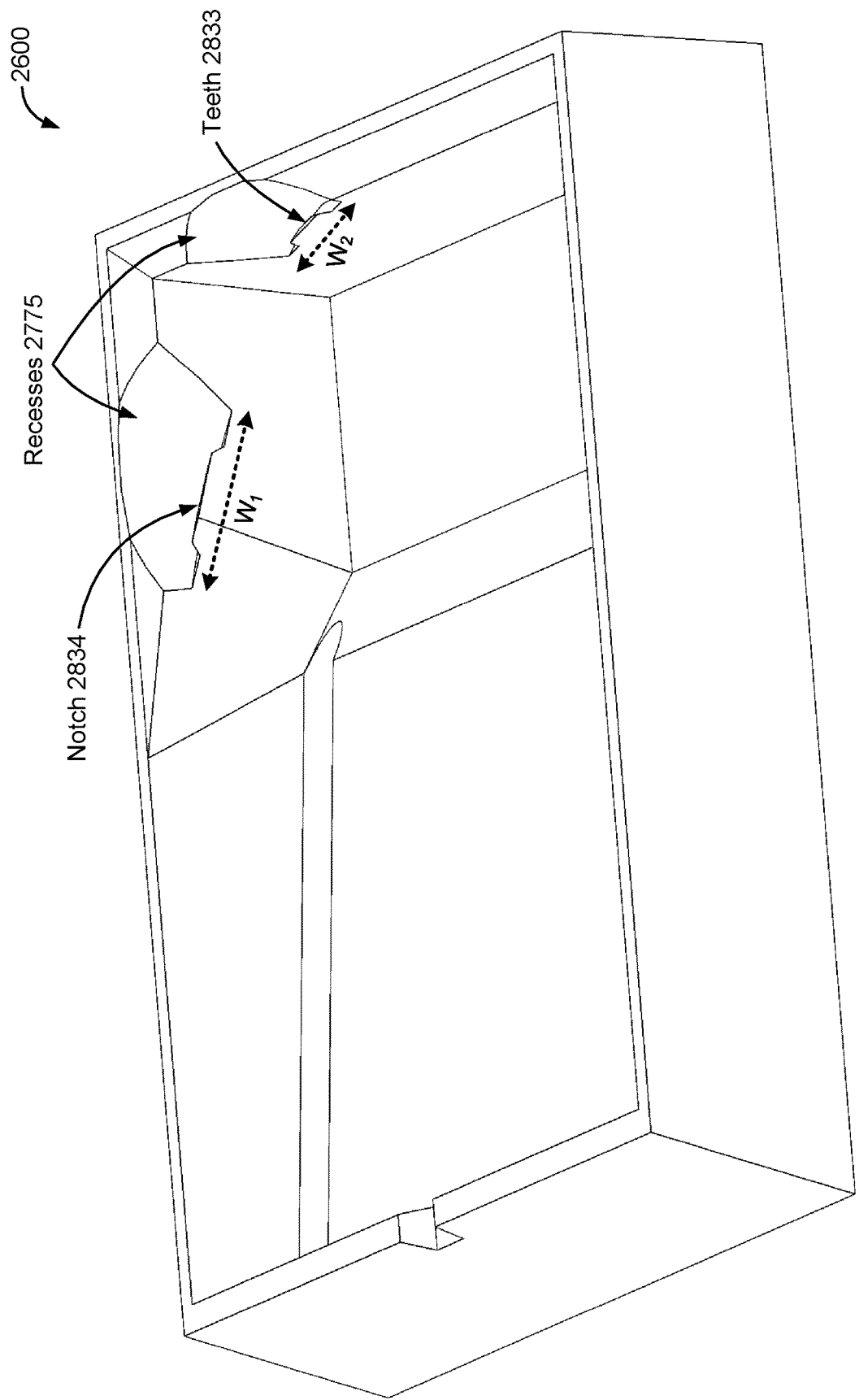
FIG. 28 illustrates a top perspective view of the fluid tray in FIGS. 26 and/or 27, according to various aspects of the disclosure.

FIG. 28 illustrates a top perspective view of the fluid tray 2600 in FIGS. 26 and/or 27, according to various aspects of the disclosure. As seen, the fluid tray 2600 comprises a plurality of recesses 2775, where each of the recesses 2775 comprises one or more of a notch (e.g., notch 2834), teeth (e.g., teeth 2833), or any other container support mechanisms to help balance the container at a sufficient angle (e.g., at least 30 degrees, at least 45 degrees) over the fluid tray to help drain fluid from the container into the tray, in accordance with aspects of the present disclosure. In some embodiments, the recesses 2775 may be the same size (e.g., width, depth, etc.) or different. If different (e.g., one of the recesses has a width $W_1$, while another of the recesses has a width $W_2$), the fluid tray 2600 may be able to support containers of different sizes (e.g., volume, radius, length, cross-sectional area, etc.). In some cases, the notch 2834 and/or the teeth 2833 may be configured to interface with one or more features (e.g., rim or groove) of the container, as previously described above.

Figure 29A:
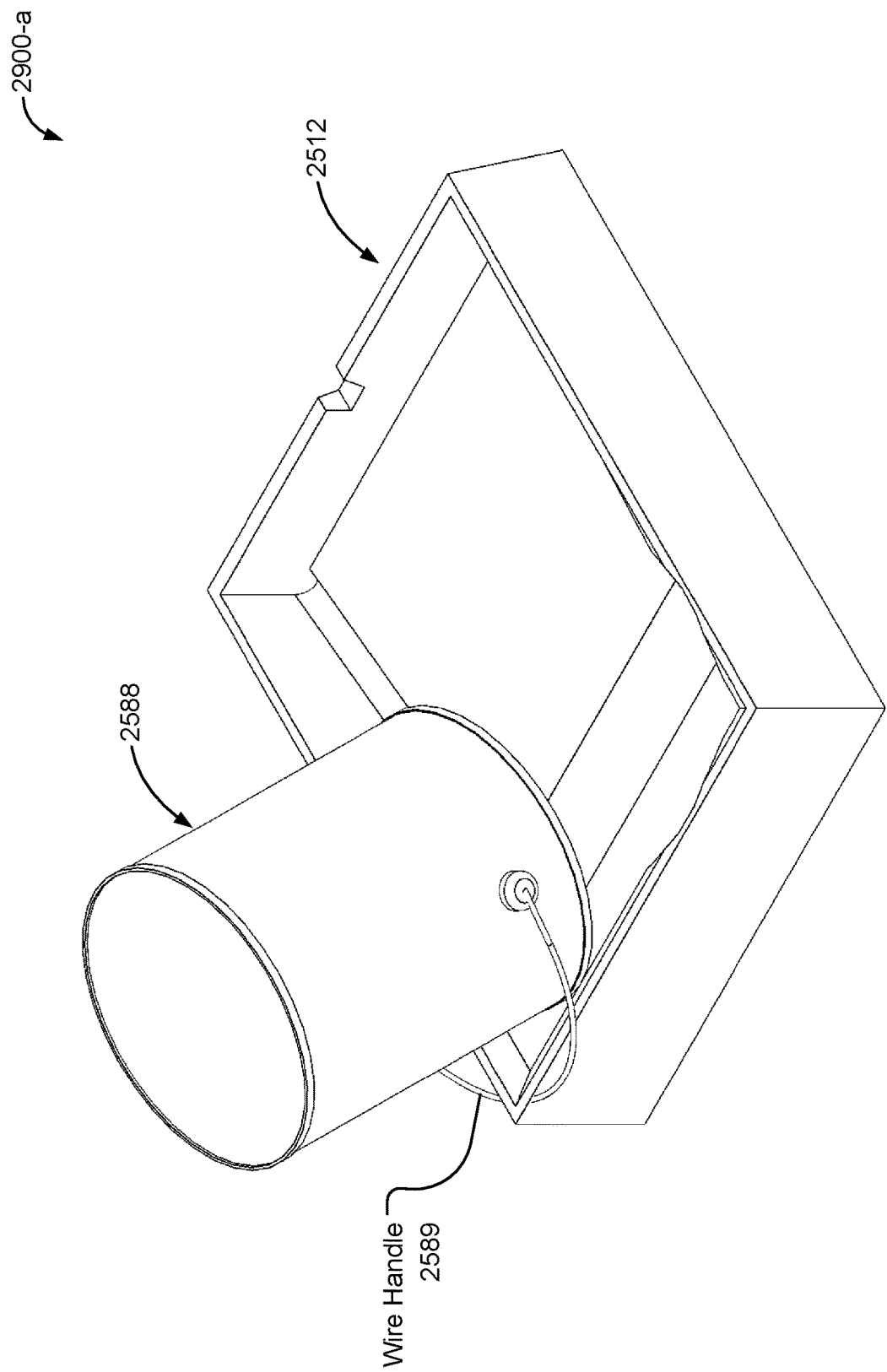
FIG. 29A illustrates a perspective view of a container balancing over a fluid tray, in accordance with various aspects of the present disclosure.

FIG. 29A illustrates a perspective view 2900-a of a container 2588 (also shown as container 2588 in FIG. 25C) balancing over a fluid tray 2512 (also shown as fluid tray 2512 in FIG. 25C), in accordance with various aspects of the present disclosure. In this example, the container 2588 comprises a wire handle 2589, where the wire handle 2589 engages with a corner of the fluid tray. However, in other cases, the fluid tray 2512 can also engage with (or support) fluid containers without a wire handle, as previously described above.

Figure 29B:
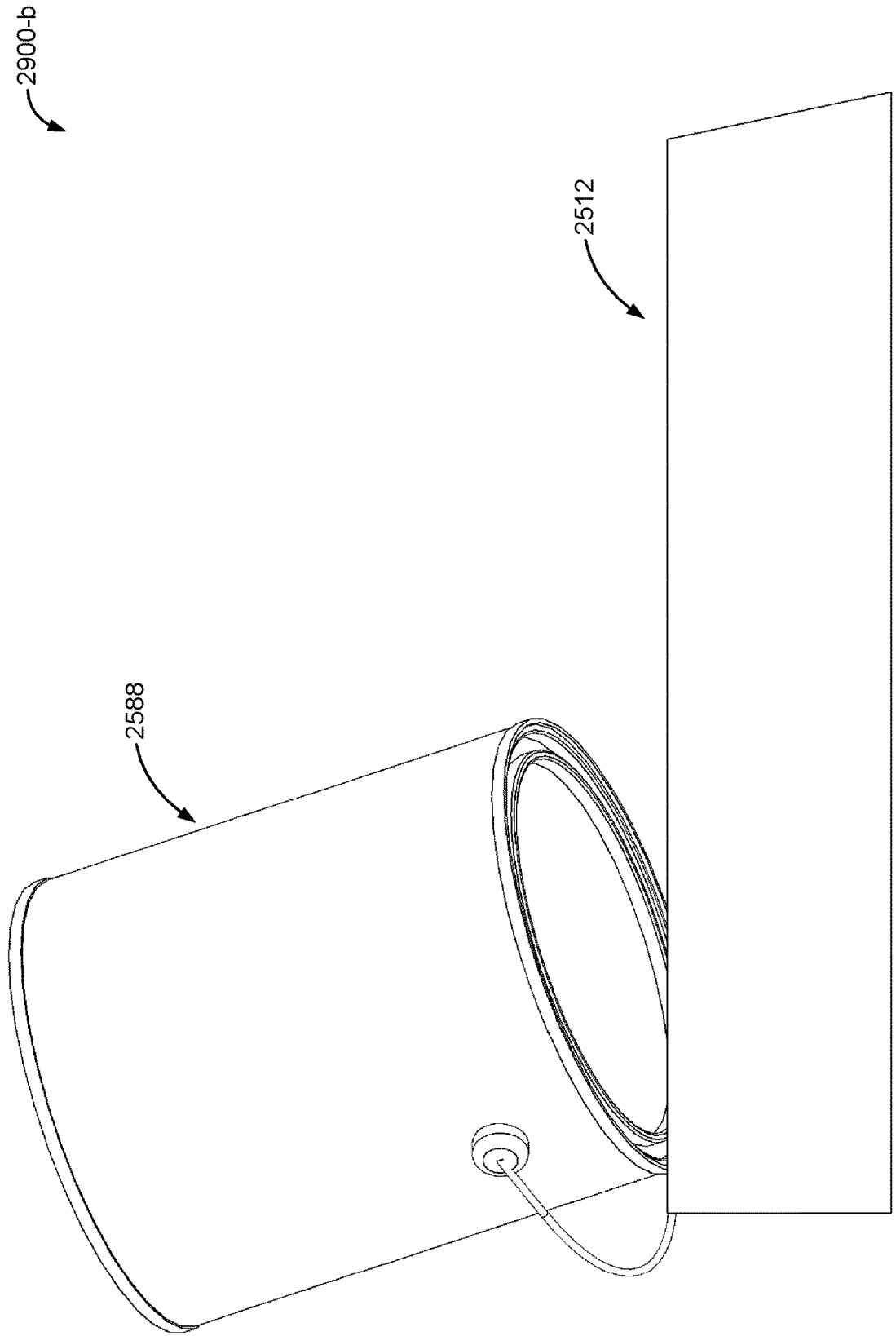
FIG. 29B illustrates a side view of the container balancing over the fluid tray in FIG. 29A, according to various aspects of the disclosure.

FIG. 29B illustrates a side view 2900-b of the container 2588 balancing over the fluid tray 2512, according to various aspects of the disclosure. In some examples, the container 2512 may have a rectangular cross-sectional shape, or alternatively, a trapezoidal cross-sectional shape.

Figure 29C:
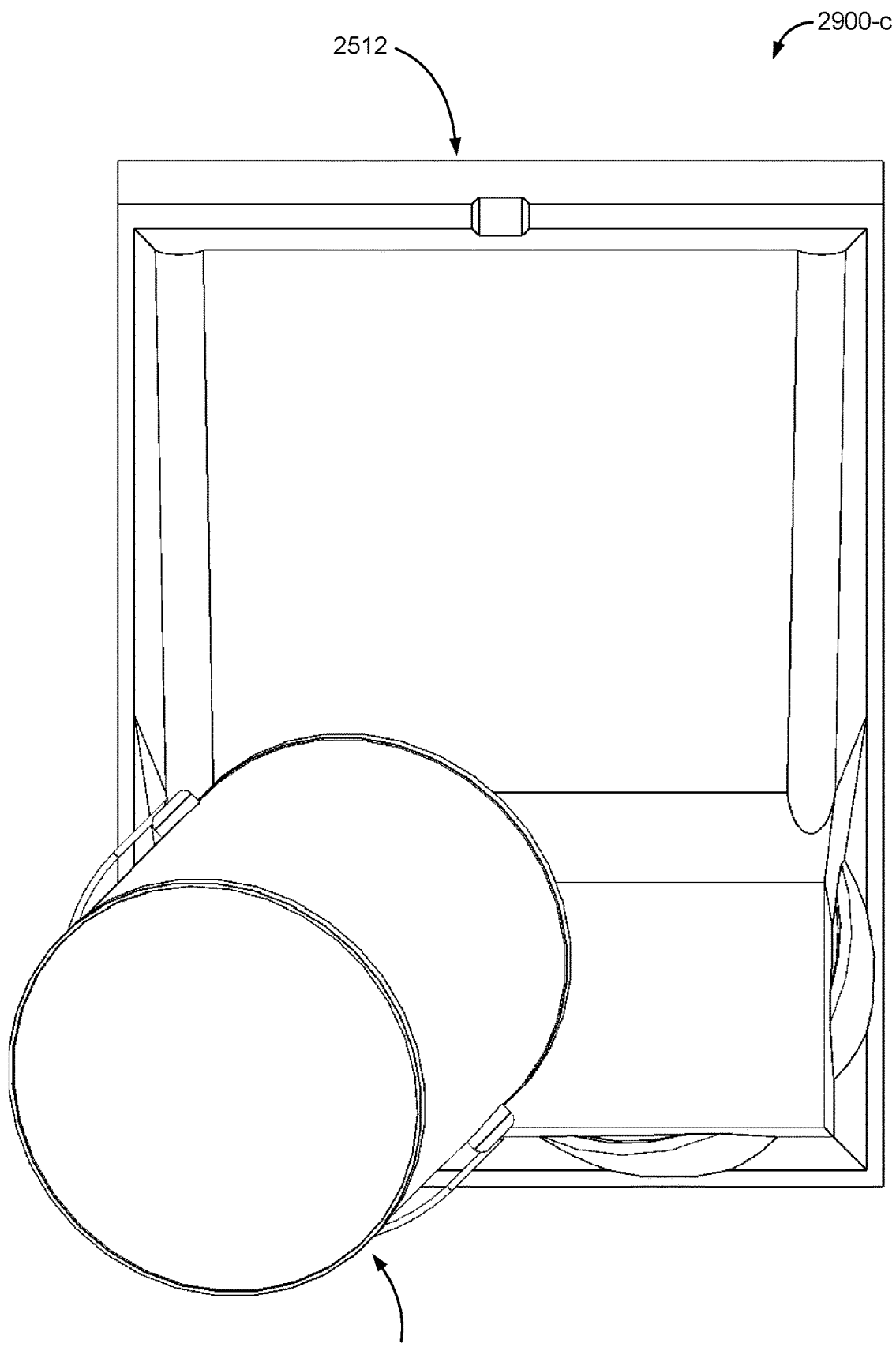
FIG. 29C illustrates a top view of the container balancing over the fluid tray in FIG. 29A, according to various aspects of the disclosure.

FIG. 29C illustrates a top view 2900-c of the container 2588 balancing over the fluid tray 2512 in FIGS. 29A and/or 29B, according to various aspects of the disclosure.

Figure 30:
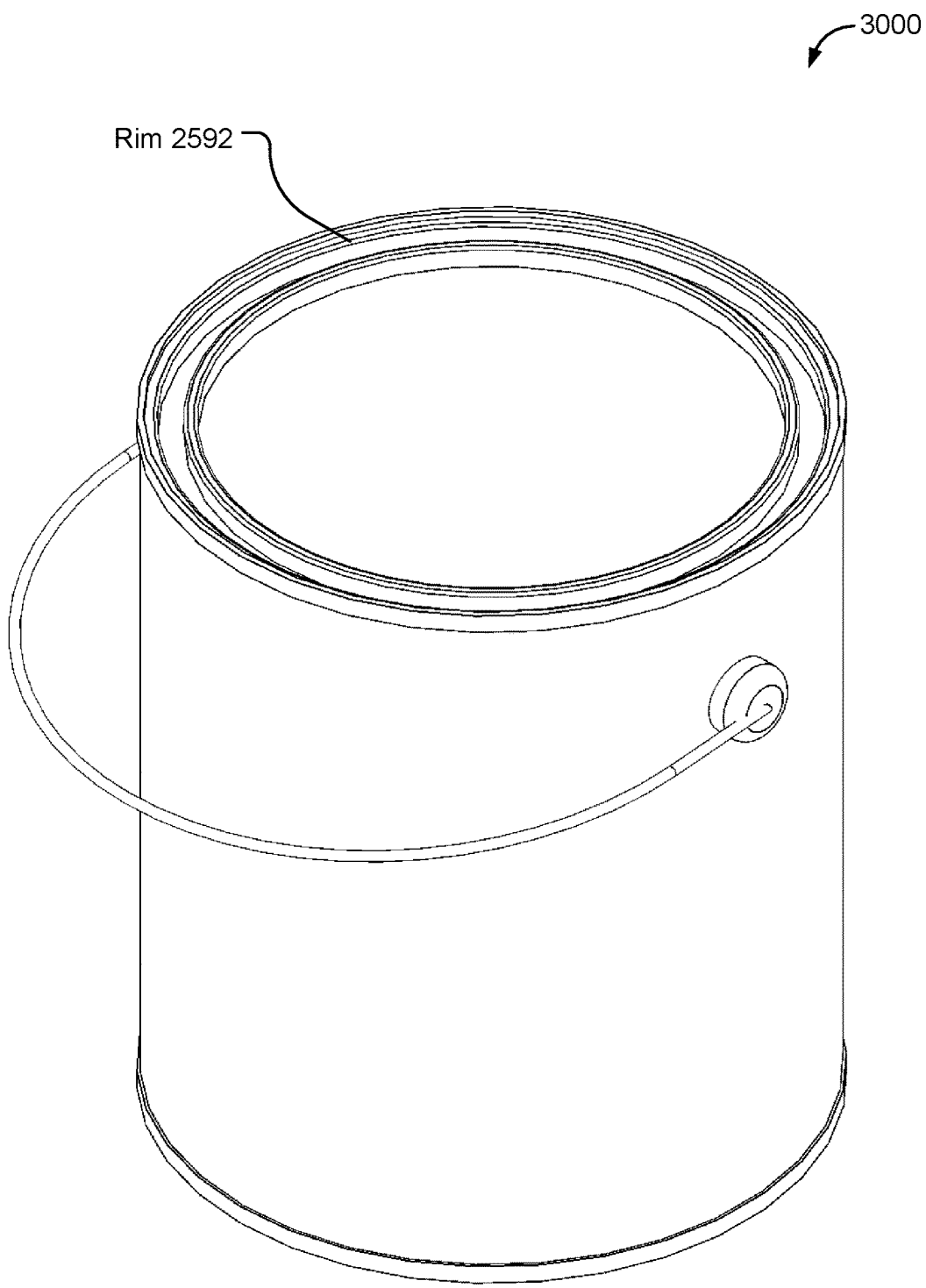
FIG. 30 illustrates a perspective view of a container, according to various aspects of the disclosure.

FIG. 30 illustrates a perspective view of a container 3000 (also shown as container 2588 in the preceding figures), according to various aspects of the present disclosure.

Figure 31A:
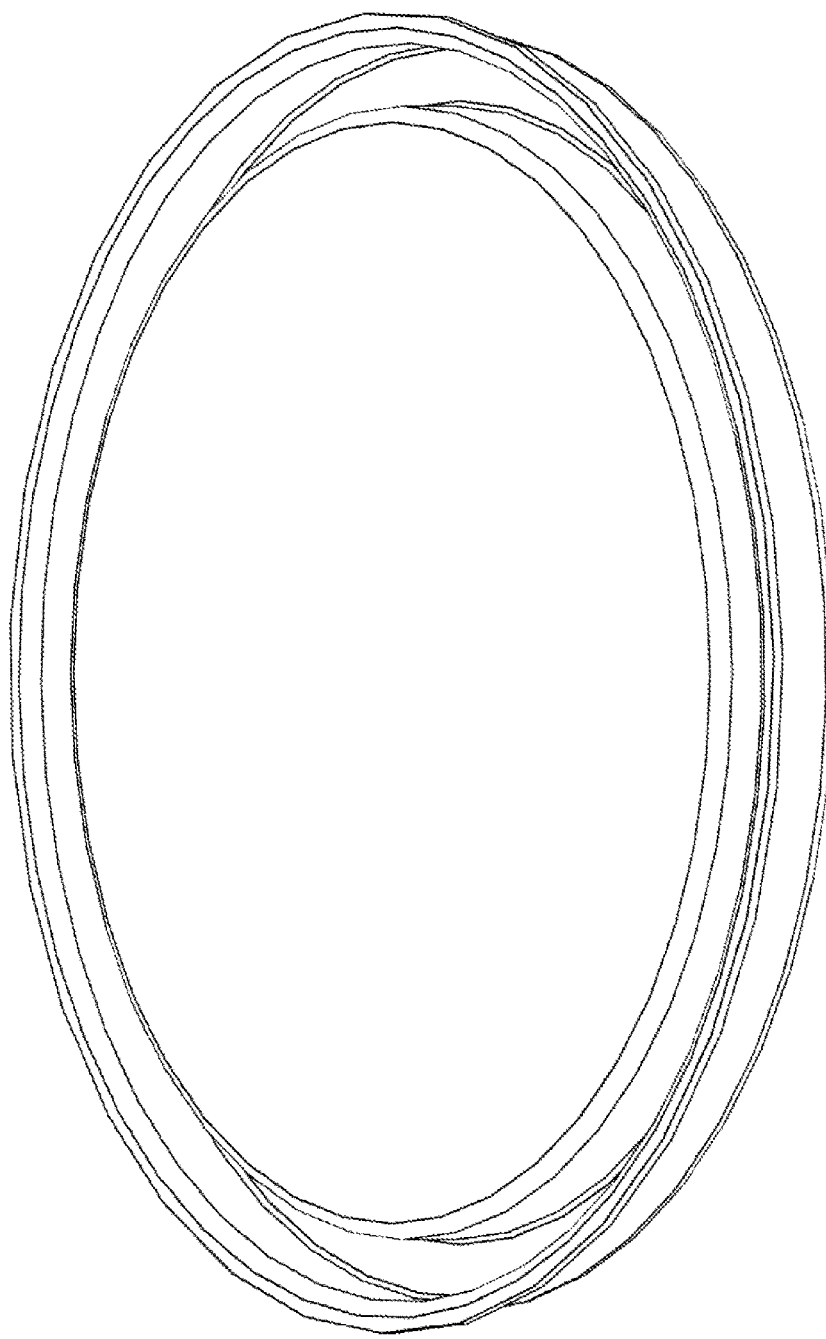
FIG. 31A illustrates a perspective view of a lid of the container in FIG. 30, according to various aspects of the disclosure.

FIG. 31A illustrates a perspective view of a lid 3100 of a container, such as container 3000 or container 2588, according to various aspects of the disclosure.

Figure 31B:
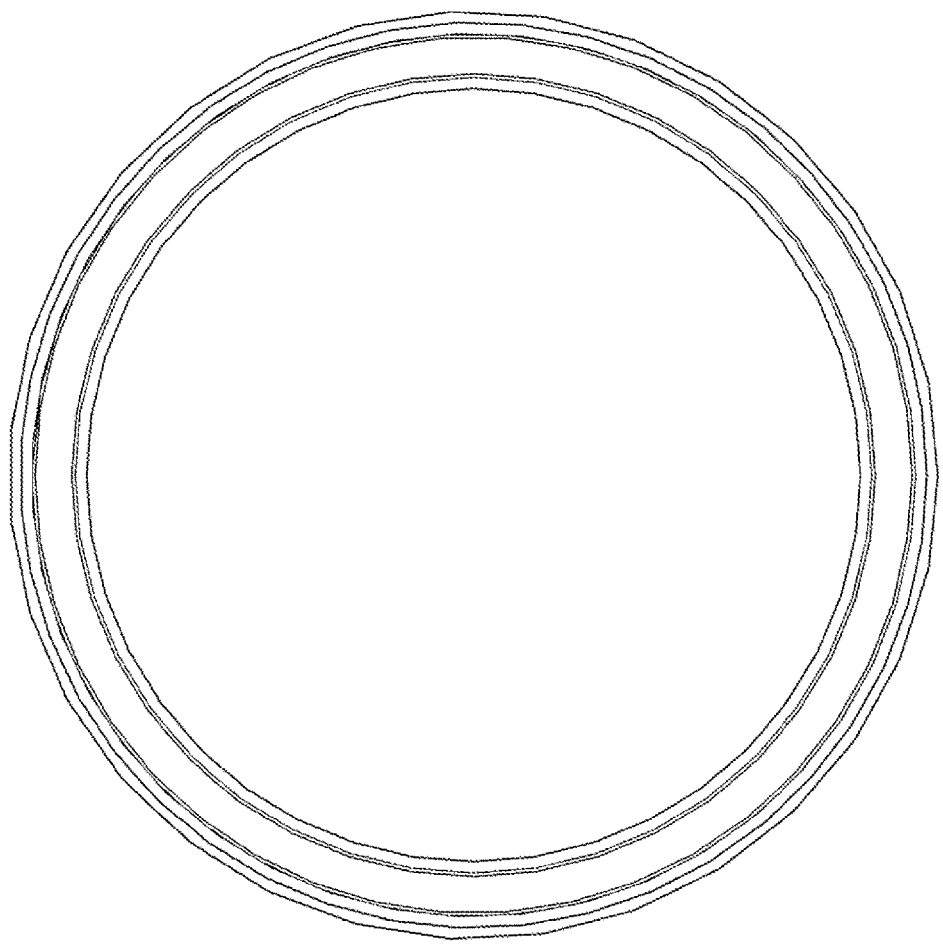
FIG. 31B illustrates a top view of the lid in FIG. 31A, according to various aspects of the disclosure.

FIG. 31B illustrates a top view of the lid 3100 in FIG. 31A, according to various aspects of the disclosure.

Figure 32:
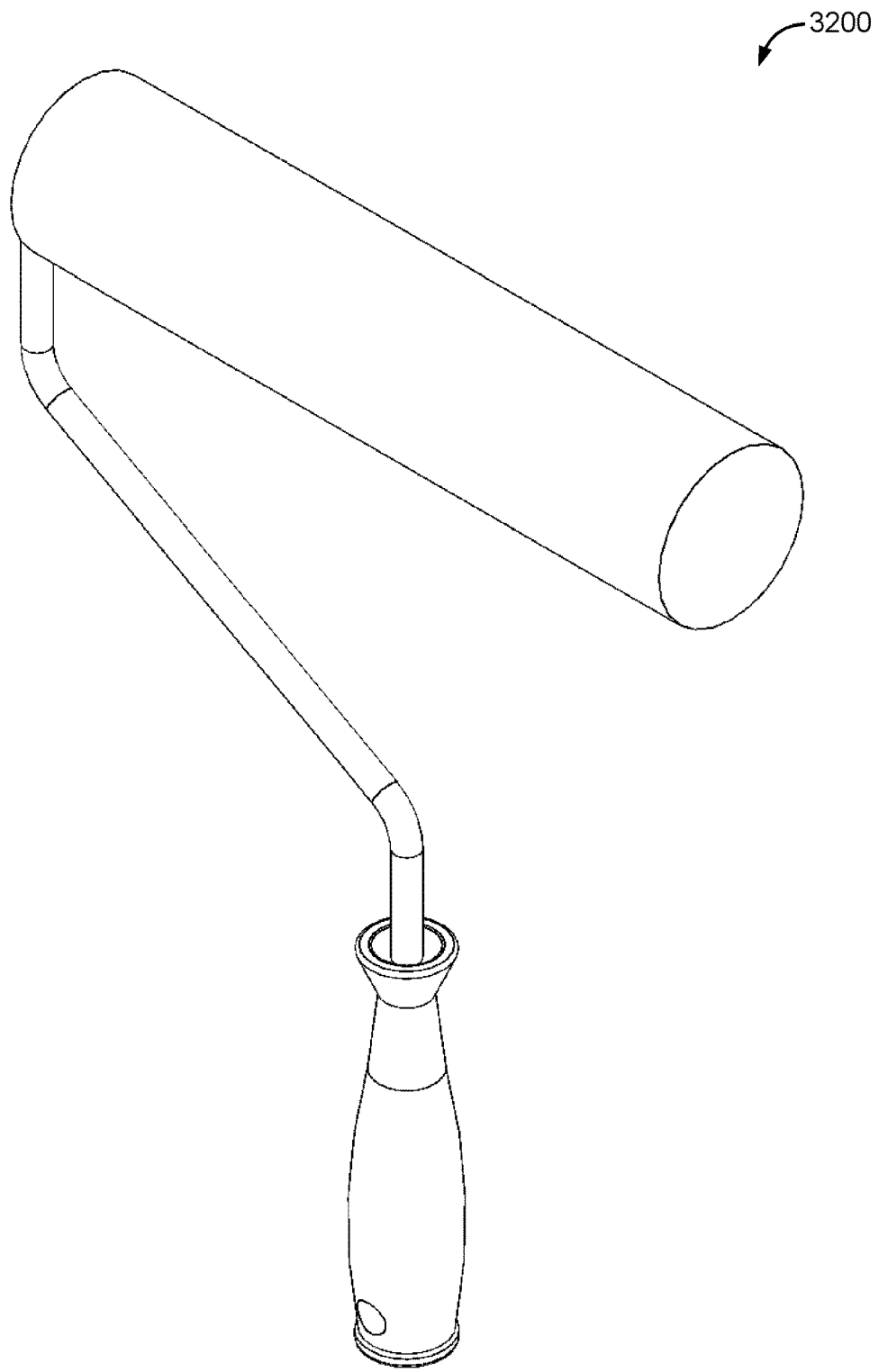
FIG. 32 illustrates a perspective view of a roller for use with a fluid tray, according to various aspects of the disclosure.

FIG. 32 illustrates a perspective view of a roller 3200 for use with any of the fluid trays described herein, according to various aspects of the disclosure.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:
1. A fluid tray comprising,
 a base;
 a rim;
 a plurality of sidewalls, wherein each sidewall of the plurality of sidewalls is arranged between an edge of the base and the rim, and wherein each sidewall of the plurality of sidewalls extends in an upward direction from the base;
 a reservoir, the reservoir defined by the base and the plurality of sidewalls;
 at least one container securing mechanism one of integrated and coupled to the rim or at least one sidewall of the plurality of sidewalls;
 at least one drainage spout; and
 wherein the at least one container securing mechanism and the at least one drainage spout operate to drain a fluid from a container into the reservoir, wherein the draining is based at least in part on, positioning the container in a vertical or substantially vertical position above the reservoir, and coupling the container to the fluid tray using one of the at least one container securing mechanism.

2. The fluid tray of claim 1, wherein the at least one container securing mechanism comprises one or more notches, notches with snap features, hooks, v-shaped notches, grooves, teeth, prongs, and lips.

3. The fluid tray of claim 2, wherein the one or more notches comprise a plurality of notches, and wherein adjacent notches are spaced apart by a pre-configured distance.

4. The fluid tray of claim 2, wherein the at least one container securing mechanism further comprises a bendable tab that is shaped and sized to engage with at least one feature on the fluid container, wherein the at least one feature comprises one or more of a wire handle, and a rim or groove on the fluid container.

5. The fluid tray of claim 1, further comprising:
at least one scooped section extending upwardly away from the base and arranged such that at least a portion of the at least one scooped section is positioned above the rim, and
wherein the at least one scooped section is configured to facilitate flow of a fluid from the container into the fluid tray by supporting the container in a substantially inverted pouring position over the fluid tray.

6. The fluid tray of claim 1, wherein one or more of:
at least one sidewall of the plurality of sidewalls comprises two or more teeth adapted to engage with a rim of the container, and wherein the two or more teeth facilitate stably supporting the container in an inverted pouring position over the fluid tray; and
the at least one drainage spout comprises one or more notches for engaging with a wire handle of the container via tension of the wire handle on the at least one drainage spout.

7. The fluid tray of claim 1, further comprising at least one snap mechanism arranged on the rim, and wherein the at least one snap mechanism is,
shaped and sized to receive a rim or groove of the container, and
adapted to provide a stable support for the fluid tray on the rim or the groove of the container, or a stable support for the container on the fluid tray.

8. The fluid tray of claim 1, further comprising:
a plurality of hooks, wherein each of the plurality of hooks is oriented towards the reservoir and arranged on the rim or at least one sidewall of the plurality of sidewalls; and
a removeable liner adapted to interface with the plurality of hooks, and wherein the removeable liner is shaped and sized to cover at least a portion of the reservoir.

9. The fluid tray of claim 1, wherein:
the fluid tray is configured to be secured to a container to drain fluid from the reservoir to the container; and
a portion of the at least one drainage spout is configured to engage an interior portion of a rim forming an opening of the container when the fluid tray is secured to the fluid container.

10. A method for draining a container into a fluid tray, comprising:
providing a fluid tray, the fluid tray comprising:
a base,
a plurality of sidewalls, wherein each sidewall is arranged between an edge of the base and a rim of the fluid tray, and wherein each sidewall extends in an upward direction from the base, the rim comprising a plurality of corners, each corner comprising an intersection of two adjacent sidewalls of the plurality of sidewalls,
a reservoir, the reservoir defined by the base and the plurality of sidewalls,
a plurality of container securing mechanisms, wherein each container securing mechanism is one of integrated and coupled to one of the rim, a corner, or at least one sidewall of the plurality of sidewalls, and
at least one drainage spout;
the method further comprising:
placing an opening of at least one container above the reservoir, such that the at least one container is (1) in an inverted orientation over the fluid tray, and (2) at an angle sufficient to permit flow of at least one fluid from the at least one container into the fluid tray;
securing the fluid tray to the at least one container via at least one of the plurality of container securing mechanisms; and
draining, via the at least one drainage spout, a portion of the at least one fluid from the at least one container into the fluid tray.

11. A fluid tray comprising:
a base;
a rim comprising a plurality of corners;
a plurality of sidewalls, wherein each sidewall is arranged between an edge of the base and the rim of the fluid tray, and wherein each sidewall extends in an upward direction from the base;
at least one container securing mechanism one of integrated and coupled to one of the rim, at least one corner of the plurality of corners, and at least one sidewall of the plurality of sidewalls;
a drainage spout located in one of the plurality of corners, wherein at least a portion of the drainage spout is configured to be received in an opening of a container when the fluid tray is secured to the container; and
a reservoir configured to contain a fluid, the reservoir at least partially surrounded by the base and the plurality of sidewalls,
wherein:
at least a portion of the fluid is configured to drain into the container when the fluid tray is secured to the container via the at least one container securing mechanism.

12. The fluid tray of claim 11, wherein at least a portion of the fluid drains into the container via the drainage spout when the fluid tray is secured to the container via the at least one container securing mechanism.

13. The fluid tray of claim 11, wherein at least a portion of the fluid tray is configured to extend into the opening of the fluid container when the fluid tray is secured to the fluid container.

14. The fluid tray of claim 11, wherein the fluid tray is configured to extend into the opening of the fluid container to a depth of less than 1.5 inches when the fluid tray is secured to the fluid container.

15. The fluid tray of claim 11, wherein the fluid tray is configured to extend into the opening of the fluid container to a depth of between 1.0 and 1.4 inches when the fluid tray is secured to the fluid container.

16. The fluid tray of claim 11, wherein the fluid tray is configured to be at an angle of between 45 and 91 degrees relative to the opening of fluid container when the fluid tray is secured to the fluid container.

17. The fluid tray of claim 11, wherein the fluid tray is configured to be at an angle of between 5 and 10 degrees of vertical relative to the opening of fluid container when the fluid tray is secured to the fluid container.

18. The fluid tray of claim 11, wherein a portion of the drainage spout is configured to engage an interior portion of a rim forming the opening of the container when the fluid tray is secured to the fluid container.

19. The fluid tray of claim 11, wherein the drainage spout comprises at least one extension configured to engage an interior portion of a rim forming the opening of the container when the fluid tray is secured to the fluid container.

20. The fluid tray of claim 19, wherein the fluid tray is configured to extend into the opening of the fluid container to a depth of less than 1.5 inches when the fluid tray is secured to the fluid container.

21. The fluid tray of claim 11, wherein the fluid tray is configured to extend into the opening of the fluid container to a depth of between 1.0 and 1.4 inches when the fluid tray is secured to the fluid container.

\* \* \* \* \*